United States Patent
Sato et al.

(10) Patent No.: US 9,779,477 B2
(45) Date of Patent: Oct. 3, 2017

(54) IMAGE ENLARGING APPARATUS, IMAGE ENLARGING METHOD, SURVEILLANCE CAMERA, PROGRAM AND RECORDING MEDIUM

(71) Applicant: Mitsubishi Electric Corporation, Chiyoda-ku (JP)

(72) Inventors: Hidenori Sato, Chiyoda-ku (JP); Yoshitaka Toyoda, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/323,684

(22) PCT Filed: Nov. 26, 2014

(86) PCT No.: PCT/JP2014/081210
§ 371 (c)(1),
(2) Date: Jan. 3, 2017

(87) PCT Pub. No.: WO2016/002099
PCT Pub. Date: Jan. 7, 2016

(65) Prior Publication Data
US 2017/0140506 A1    May 18, 2017

(30) Foreign Application Priority Data

Jul. 4, 2014    (WO) .................. PCT/JP2014/067912

(51) Int. Cl.
*H04N 7/01*    (2006.01)
*H04N 7/18*    (2006.01)
(Continued)

(52) U.S. Cl.
CPC .......... *G06T 3/4053* (2013.01); *G06T 3/4007* (2013.01); *H04N 5/23293* (2013.01); *H04N 7/0135* (2013.01); *H04N 7/183* (2013.01)

(58) Field of Classification Search
CPC .. H04N 5/23293; H04N 7/0135; H04N 7/183; G06T 3/4053; G06T 3/4007
(Continued)

(56) References Cited

U.S. PATENT DOCUMENTS

2002/0172434 A1    11/2002    Freeman et al.
2005/0052541 A1*    3/2005    Kondo .................. H04N 9/045
348/222.1
(Continued)

FOREIGN PATENT DOCUMENTS

JP    2003-18398 A    1/2003
JP    2007-280284 A    10/2007
(Continued)

OTHER PUBLICATIONS

International Search Report issued Feb. 24, 2015 in PCT/JP2014/081210 filed Nov. 26, 2014.

Primary Examiner — Michael Lee
(74) Attorney, Agent, or Firm — Oblon, McClelland, Maier & Neustadt, L.L.P.

(57) ABSTRACT

In enlarging an image by a super-resolution process using learned data, a reference value obtained from each patch and the pixel values of peripheral pixels in the patch are compared to generate binary or ternary comparison codes, and a patch of a high-resolution component corresponding to a binary pattern code or a ternary pattern code generated from the comparison codes is read. When a high-frequency component is contained the binary pattern code may be used; otherwise the ternary pattern code may be used. It is possible to reduce the storage capacity of the coefficient data storage unit and to improve the sense of high resolution.

20 Claims, 45 Drawing Sheets

(51) Int. Cl.
*H04N 5/232* (2006.01)
*G06T 3/40* (2006.01)

(58) Field of Classification Search
USPC .......................................................... 348/441
See application file for complete search history.

(56) References Cited

U.S. PATENT DOCUMENTS

| | | |
|---|---|---|
| 2006/0038891 A1 | 2/2006 | Okutomi et al. |
| 2007/0237425 A1 | 10/2007 | Taguchi et al. |
| 2009/0208106 A1* | 8/2009 | Dunlop .............. G06K 9/00664 382/173 |
| 2010/0158122 A1* | 6/2010 | Fernandez ............. H04N 5/147 375/240.16 |
| 2013/0016920 A1 | 1/2013 | Matsuda et al. |
| 2016/0247259 A1* | 8/2016 | Toyoda ..................... G06T 3/40 |

FOREIGN PATENT DOCUMENTS

| | | |
|---|---|---|
| JP | 4214409 B2 | 1/2009 |
| JP | 2013-21635 A | 1/2013 |
| JP | 2013-127718 A | 6/2013 |
| WO | 2004/068862 A1 | 8/2004 |
| WO | 2013/089260 A1 | 6/2013 |

\* cited by examiner

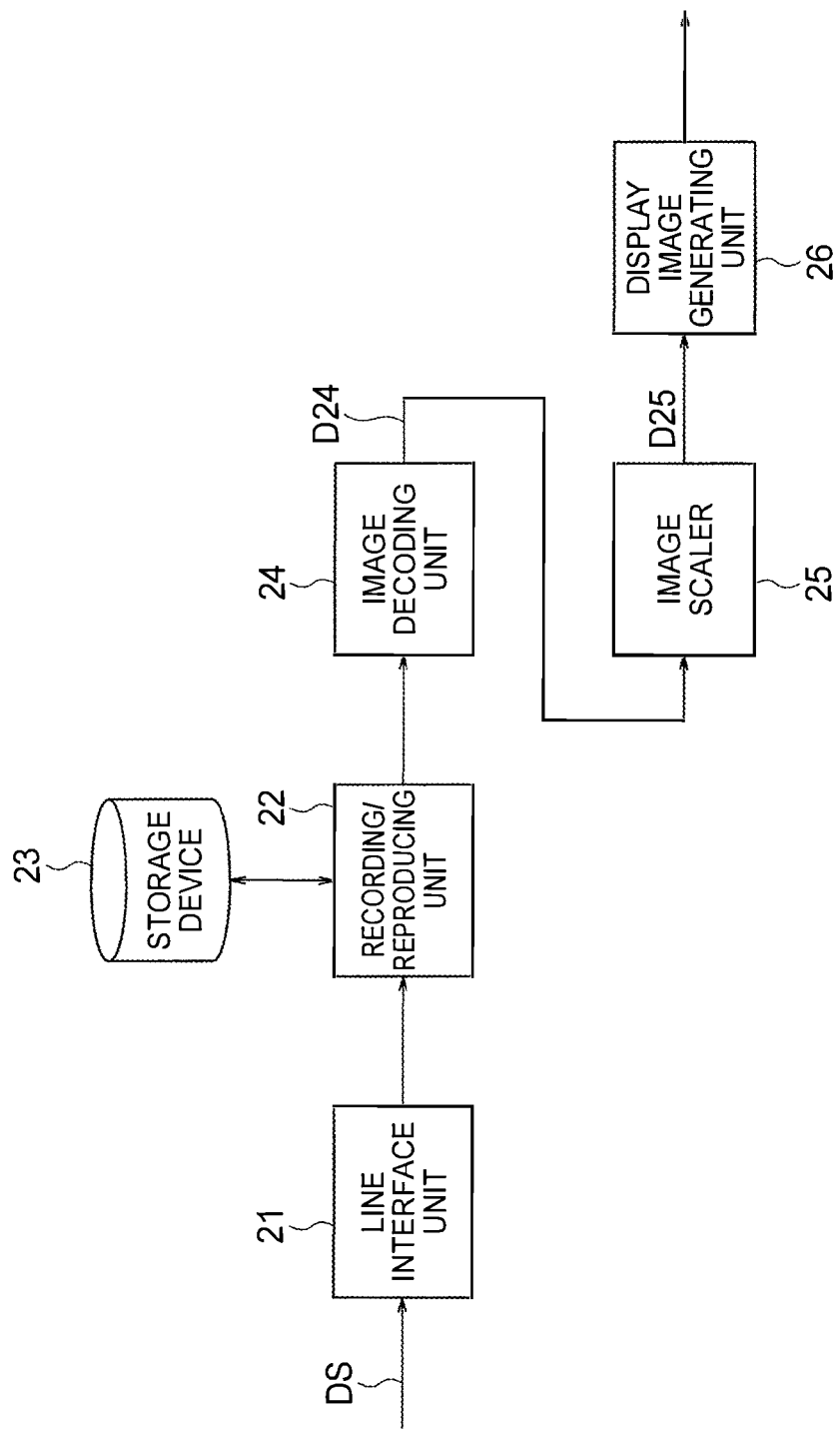

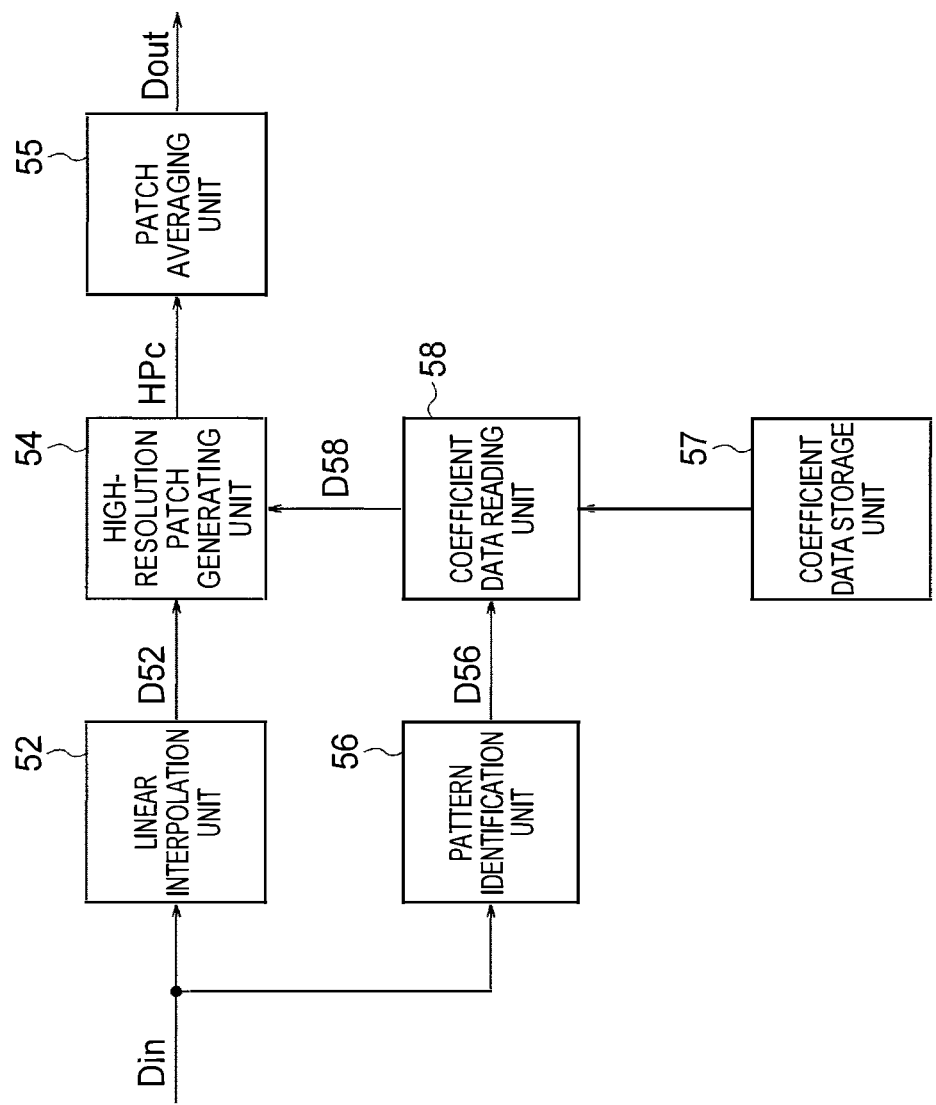

Din

| P(1) | P(6) | P(11) | P(16) | P(21) |
|---|---|---|---|---|
| P(2) | P(7) | P(12) | P(17) | P(22) |
| P(3) | P(8) | P(13) | P(18) | P(23) |
| P(4) | P(9) | P(14) | P(19) | P(24) |
| P(5) | P(10) | P(15) | P(20) | P(25) |

FIG. 8(b)

$$\begin{Bmatrix} dl_1 \\ dl_2 \\ dl_3 \\ dl_4 \\ \vdots \\ dl_{24} \\ dl_{25} \end{Bmatrix}$$

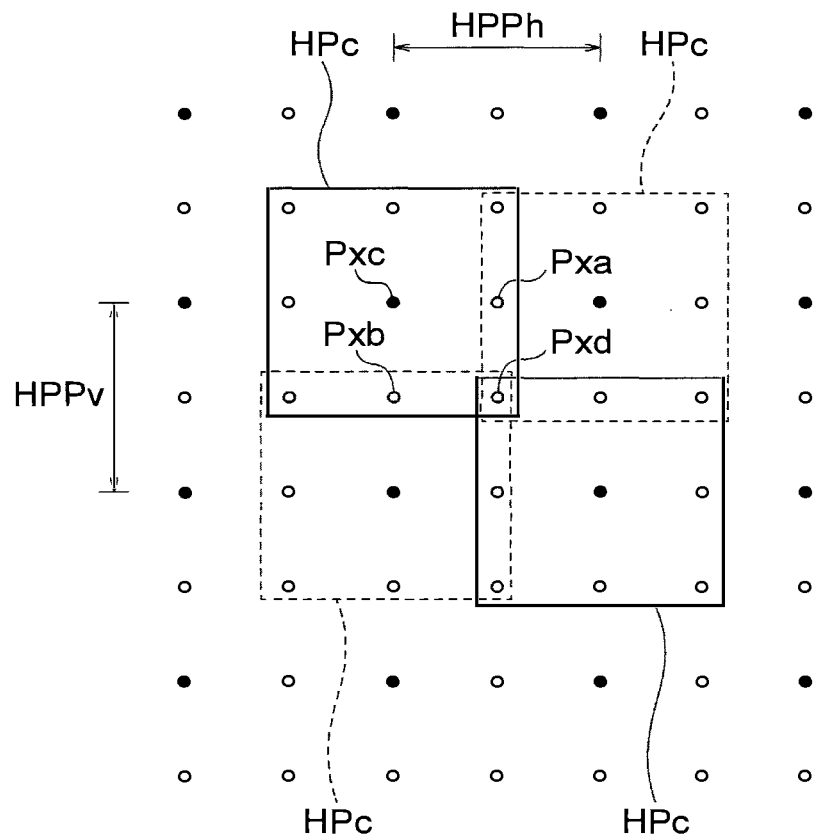

FIG. 15(a)

| 157 | 61 | 16 |
| --- | --- | --- |
| 79 | 93 | 191 |
| 106 | 98 | 234 |

AVE=115

FIG. 15(b)

ARb →

| D(-1,-1) 1 | D(-1,0) 0 | D(-1,1) 0 |
| --- | --- | --- |
| D(0,-1) 0 |  | D(0,1) 0 |
| D(1,-1) 0 | D(1,0) 1 | D(1,1) 1 |

FIG. 15(c)

| 0 | 0 | 1 | 1 | 0 | 0 | 0 | 1 |
| --- | --- | --- | --- | --- | --- | --- | --- |

=49

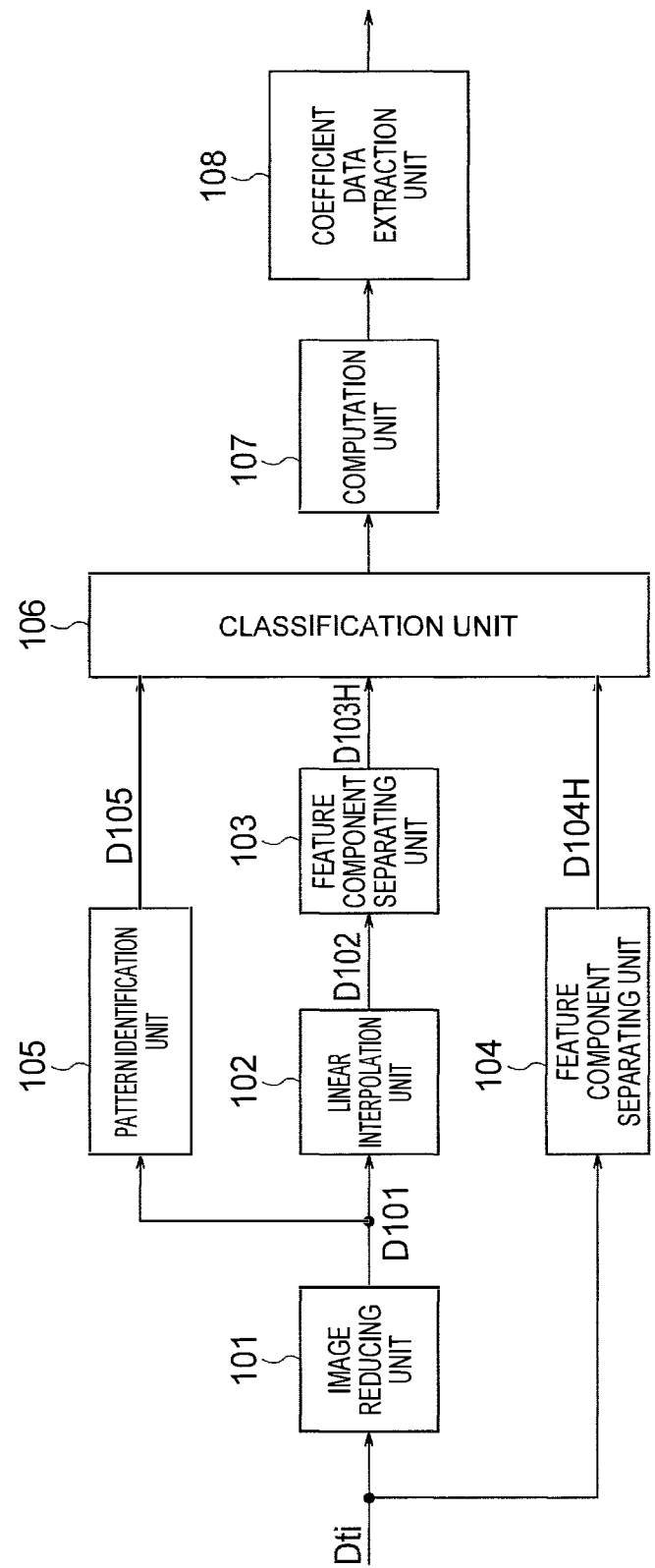

Dti

| D105 | PAIR NUMBER |
|---|---|
| 0 | xx, xx, xx, ⋯ |
| 1 | xx, xx, xx, ⋯ |
| 2 | xx, xx, xx, ⋯ |
| 3 | xx, xx, xx, ⋯ |
| 4 | xx, xx, xx, ⋯ |
| 5 | xx, xx, xx, ⋯ |
| ⋮ | ⋮ |
| 253 | xx, xx, xx, ⋯ |
| 254 | xx, xx, xx, ⋯ |
| 255 | xx, xx, xx, ⋯ |

FIG. 23

| P(1) | P(6) | P(11) | P(16) | P(21) | ← LPc |
|------|------|-------|-------|-------|-------|
| P(2) | P(7) | P(12) | P(17) | P(22) | |
| P(3) | P(8) | P(13) | P(18) | P(23) | |
| P(4) | P(9) | P(14) | P(19) | P(24) | ← HPc |
| P(5) | P(10)| P(15) | P(20) | P(25) | |

FIG. 27(a)

| 215 | 123 | 30 |
|---|---|---|
| 146 | 199 | 119 |
| 92 | 77 | 178 |

AVE=131
α=20

FIG. 27(b)

| T(-1,-1) 10 | T(0,-1) 01 | T(1,-1) 00 |
|---|---|---|
| T(-1,0) 01 |  | T(1,0) 01 |
| T(-1,1) 00 | T(0,1) 00 | T(1,1) 10 |

ARc

FIG. 27(c)

| 0 | 1 | 0 | 0 | 0 | 1 | 0 | 0 | 0 | 0 | 1 | 0 | =17926 |
|---|---|---|---|---|---|---|---|---|---|---|---|---|

FIG. 31(a)

| 215 | 123 | 30  |
|-----|-----|-----|
| 146 | 199 | 119 |
| 92  | 77  | 178 |

AVE=131
α=20

FIG. 31(b)

| T(-1,-1) 10 | T(-1,0) 01 | T(-1,1) 00 |
|-------------|------------|------------|
| T(0,-1) 01  |            | T(0,1) 00  |
| T(1,-1) 00  | T(1,0) 01  | T(1,1) 10  |

ARd

FIG. 31(c)

| 0 | 1 | 0 | 0 | 0 | 1 | 0 | 0 | 0 | 1 | 0 | 0 | 0 | 0 | 1 | 0 | =17926 |

FIG. 31(d)

| 1 | 0 | 0 | 0 | 1 | 1 | 1 | 0 | 1 | =573 |

FIG. 36(a) FIG. 36(b) FIG. 36(c)

| No. | Ta | Tb | Tc | Td | Te | Tf | Tg | Th | TERNARY PATTERN CODE |
|---|---|---|---|---|---|---|---|---|---|
| 1 | 0 | 0 | 0 | 0 | 0 | 0 | 0 | 0 | Pnc |
| 2 | 0 | 0 | 0 | 0 | 0 | 0 | 0 | 1 | |
| 3 | 0 | 0 | 0 | 0 | 0 | 0 | 0 | 2 | |
| 4 | 0 | 0 | 0 | 0 | 0 | 0 | 1 | 0 | |
| 5 | 0 | 0 | 0 | 0 | 0 | 0 | 1 | 1 | |
| 6 | 0 | 0 | 0 | 0 | 0 | 0 | 1 | 2 | |
| 7 | 0 | 0 | 0 | 0 | 0 | 0 | 2 | 0 | |
| 8 | 0 | 0 | 0 | 0 | 0 | 0 | 2 | 1 | |
| 9 | 0 | 0 | 0 | 0 | 0 | 0 | 2 | 2 | |
| 10 | 0 | 0 | 0 | 0 | 0 | 1 | 0 | 0 | |
| 11 | 0 | 0 | 0 | 0 | 0 | 1 | 0 | 1 | |
| 12 | 0 | 0 | 0 | 0 | 0 | 1 | 0 | 2 | |
| 13 | 0 | 0 | 0 | 0 | 0 | 1 | 1 | 0 | |
| 14 | 0 | 0 | 0 | 0 | 0 | 1 | 1 | 1 | 256 |
| 15 | 0 | 0 | 0 | 0 | 0 | 1 | 1 | 2 | |
| 16 | 0 | 0 | 0 | 0 | 0 | 1 | 2 | 0 | |
| 17 | 0 | 0 | 0 | 0 | 0 | 1 | 2 | 1 | 257 |
| 18 | 0 | 0 | 0 | 0 | 0 | 1 | 2 | 2 | 258 |
| 19 | 0 | 0 | 0 | 0 | 0 | 2 | 0 | 0 | |
| 20 | 0 | 0 | 0 | 0 | 0 | 2 | 0 | 1 | |
| 21 | 0 | 0 | 0 | 0 | 0 | 2 | 0 | 2 | |
| 22 | 0 | 0 | 0 | 0 | 0 | 2 | 1 | 0 | |
| 23 | 0 | 0 | 0 | 0 | 0 | 2 | 1 | 1 | |
| 24 | 0 | 0 | 0 | 0 | 0 | 2 | 1 | 2 | |
| 25 | 0 | 0 | 0 | 0 | 0 | 2 | 2 | 0 | |
| 26 | 0 | 0 | 0 | 0 | 0 | 2 | 2 | 1 | 259 |
| 27 | 0 | 0 | 0 | 0 | 0 | 2 | 2 | 2 | 260 |

FIG. 36(d)

| A | H | G |
|---|---|---|
| B |   | F |
| C | D | E |

| T(-1,-1) 01 | T(0,-1) 10 | T(1,-1) 10 |
|---|---|---|
| T(-1,0) 10 | | T(1,0) 01 |
| T(-1,1) 10 | T(0,1) 01 | T(1,1) 01 |

FIG. 37(b)

| T(-1,-1) 10 | T(0,-1) 01 | T(1,-1) 00 |
|---|---|---|
| T(-1,0) 01 | 01 | T(1,0) 00 |
| T(-1,1) 00 | T(0,1) 00 | T(1,1) 00 |

FIG. 38(a)

| T(-1,-1) 00 | T(0,-1) 01 | T(1,-1) 01 |
|---|---|---|
| T(-1,0) 00 | 01 | T(1,0) 01 |
| T(-1,1) 01 | T(0,1) 01 | T(1,1) 00 |

FIG. 38(b)

| T(-1,-1) 00 | T(0,-1) 01 | T(1,-1) 01 |
|---|---|---|
| T(-1,0) 00 | 01 | T(1,0) 01 |
| T(-1,1) 00 | T(0,1) 00 | T(1,1) 00 |

FIG. 47

| OCCURRENCE PATTERN | | | OCCURRENCE PATTERN CODE | |
|---|---|---|---|---|
| | | | EXTENSION CODE | BASIC CODE |
| ONE VALUE | No.0 | (01b) | 0b | 1100b |
| TWO VALUES | No.1 | 00b→01b→(00b) | 0b | 1110b |
| | No.2 | 10b→01b→(10b) | 1b | |
| | No.3 | 00b→10b→(00b) | 0b | 1101b |
| | No.4 | 10b→00b→(10b) | 1b | |
| | No.5 | 01b→00b→(01b) | 0b | 1100b |
| | No.6 | 01b→10b→(01b) | 1b | |
| THREE VALUES | No.7 | 00b→10b→01b→(00b) | 0b | 1010b |
| | No.8 | 10b→00b→01b→(10b) | 1b | |
| | No.9 | 00b→01b→10b→(00b) | 0b | 1001b |
| | No.10 | 10b→01b→00b→(10b) | 1b | |
| | No.11 | 01b→00b→10b→(01b) | 0b | 1000b |
| | No.12 | 01b→10b→00b→(01b) | 1b | |
| | No.13 | 00b→01b→10b→01b→(00b) | 0b | 01b |
| | No.14 | 10b→01b→00b→01b→(10b) | 1b | |
| | No.15 | 01b→00b→01b→10b→(01b) | 0b | 00b |
| | No.16 | 01b→10b→01b→00b→(01b) | 1b | |

| 10 | 10 | 01 |
| --- | --- | --- |
| 01 |    | 01 |
| 00 | 01 | 01 |

FIG. 50(a)

| REPETITION COUNT OF IDENTICAL COMPARISON CODE | REPETITION COUNT CODE |
|---|---|
| 1 | 000b |
| 2 | 001b |
| 3 | 010b |
| 4 | 011b |
| 5 | 100b |
| 6 | 101b |
| 7 | 110b |
| 8 | 111b |

FIG. 50(b)

| REPETITION COUNT OF IDENTICAL COMPARISON CODE | REPETITION COUNT CODE |
|---|---|
| 1 | 00b |
| 2 | 01b |
| 3 | 10b |
| 4 | 110b |
| 5 | 111b |

IMAGE ENLARGING APPARATUS, IMAGE ENLARGING METHOD, SURVEILLANCE CAMERA, PROGRAM AND RECORDING MEDIUM

TECHNICAL FIELD

The present invention relates to an image enlarging apparatus and an image enlarging method for enlarging an input image to generate an output image of a higher resolution. The present invention also relates to a surveillance camera provided with the above-mentioned image enlarging apparatus. The present invention also relates to a program for causing a computer to implement the above mentioned image enlarging apparatus or method, and a recording medium in which the above-mentioned program is recorded.

BACKGROUND ART

To electronically enlarge an image, linear interpolation, such as the one employing a bilinear method, or a bicubic method has been used. With such linear interpolation, a sense of high resolution or sharpness of the image tends to be lowered as the enlargement factor increases. As a method for obtaining a high-resolution image with a high sense of sharpness, a super-resolution process using a learned database is known. This method refers to a database in which examples of correspondence relations between high-resolution images and low-resolution images have been accumulated, to predict high-resolution components which are not present in the input image, thereby to achieve conversion to a higher resolution.

For example, in the super-resolution process described in patent reference 1, a search vector is generated for each of the patches formed by dividing an interpolated image, and a high-frequency component data corresponding to an index vector having the highest similarity to the search vector is read from a learned database to generate a patch of a high resolution.

PRIOR ART REFERENCES

Patent References

Patent reference 1: Japanese Patent Application Publication No. 2003-018398 (paragraphs 0014 to 0017)

SUMMARY OF THE INVENTION

Problems to be Solved by the Invention

However, to perform the super-resolution process described in patent reference 1, the learned database (coefficient database) needs to store a large amount of data, so that the required storage capacity and circuit size are large.

The present invention has been made to solve the problem set forth above, and makes it possible to obtain a high-resolution image with a high sense of sharpness, even though the required storage capacity and circuit size are small.

Means for Solving the Problem

An image enlarging apparatus according to the present invention comprises:

a linear interpolation unit for enlarging an input image by linear interpolation to generate an interpolated image;

a high-resolution patch generating unit for performing high-resolution conversion on each of a plurality of patches respectively forming parts of the interpolated image, to generate a high-resolution patch;

a pattern identification unit for identifying a pattern of a local region in the input image which corresponds to each patch in the interpolated image, to output a selection code;

a coefficient data storage unit for storing a plurality of coefficient data respectively corresponding to a plurality of values which can be assumed by the selection code; and a coefficient data reading unit for reading a coefficient data corresponding to the selection code, from among the plurality of coefficient data stored in said coefficient data storage unit; wherein said high-resolution patch generating unit generates the high-resolution patch using the coefficient data read from said coefficient data storage unit; and said pattern identification unit comprises:

a comparison code generating unit for using an average value of pixel values of pixels in the local region or the pixel value of the pixel positioned at a center of the local region as a reference value, comparing the pixel values of a plurality of peripheral pixels other than the pixel positioned at the center of the local region with the reference value, and generating either or both of binary comparison codes and ternary comparison codes indicating results of the comparison; and a selection code generating unit for generating the selection code based on the comparison codes generated for the plurality of peripheral pixels in the local region.

Effects of the Invention

According to the present invention, by generating the comparison codes by comparing the pixel values of the pixels in a local region corresponding to a patch, with the reference value obtained from the same local region, and the coefficient data is selected from the coefficient data storage unit by using the selection code generated based on the comparison codes, so that the amount of coefficient data stored in the coefficient data storage unit can be reduced, and yet a high-resolution image with a high sense of sharpness can be obtained.

BRIEF DESCRIPTION OF THE DRAWINGS

FIG. 3 is a block diagram showing an example of a configuration of a network recorder in FIG. 1.

FIG. 4 is a block diagram showing a configuration of an image enlarging apparatus according to a first embodiment of the present invention.

FIGS. 8(a) and (b) are diagrams showing the correspondence relation between an arrangement of pixels in each patch in the interpolated image, and constituent elements of a column vector formed of difference values pertaining to respective pixels.

FIG. 9 is a diagram showing an arrangement of patches in a high-resolution enlarged image, and pixels included in each patch.

FIG. 10 is a diagram showing an arrangement of pixels in a high-resolution image corresponding to the constituent elements of a column vector formed of the feature quantities of the high-resolution image obtained by conversion.

FIGS. 15(a) to (c) are diagrams showing an example of generation of a binary pattern code pertaining to a patch in the first embodiment;

FIG. 18 is a block diagram showing an apparatus (coefficient data generating apparatus) used for generating coefficient data.

FIG. 20 is a diagram showing an example of classification of patch pairs.

FIG. 23 is a diagram showing the relation between a patch formed of NL×NL pixels in the interpolated image, and a patch formed of NH×NH pixels in the high-resolution image.

FIGS. 27(a) to (c) are diagrams showing an example of generation of a ternary pattern code pertaining to a patch in the second embodiment.

FIGS. 31(a) to (d) are diagrams showing an example of generation of a ternary pattern code pertaining to a patch in the third embodiment.

FIGS. 36(a) to (c) are diagrams showing the relation between the input and output of the code conversion unit in FIG. 30, FIG. 36(d) is a diagram showing reference characters assigned to the pheripheral pixels in each patch; FIG. 36(e) is a diagram showing reference characters assigned to the pixel values of the peripheral pixels.

FIGS. 37(a) and (b) are diagrams showing an example of arrangement of the ternary comparison codes, for explaining a problem associated with the third embodiment.

FIGS. 38(a) and (b) are diagrams showing another example of arrangement of the ternary comparison codes for explaining the problem associated with the third embodiment.

FIG. 47 is a diagram showing relations between occurrence patterns of the comparison codes and occurrence pattern codes.

FIGS. 50(a) and (b) are diagrams showing the relations between repetition counts of the same comparison code and repetition count codes.

MODE FOR CARRYING OUT THE INVENTION

First Embodiment

Figure 1:
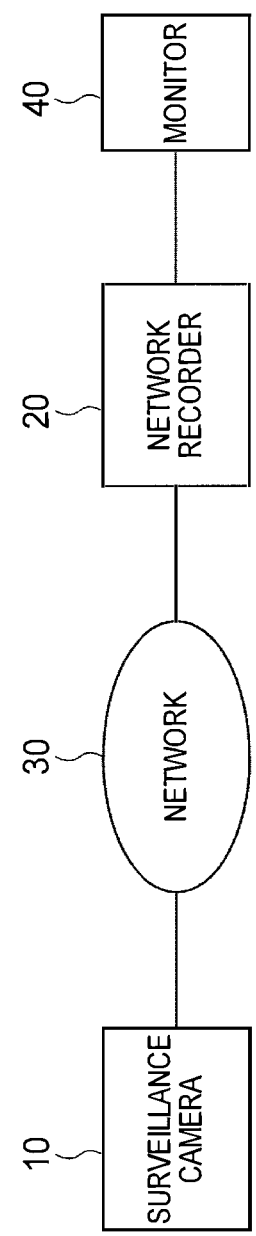
FIG. 1 is a block diagram showing an example of a configuration of a surveillance system.

FIG. 1 shows an example of a configuration of a surveillance system including a surveillance camera according a first embodiment of the present invention.

The surveillance system includes a surveillance camera 10 and a network recorder 20. The surveillance camera 10 and the network recorder 20 are connected to each other via a network 30. The images obtained by having the surveillance camera 10 shoot a target area to be surveyed are transmitted via the network 30, and recorded in the network recorder 20, and displayed by a monitor 40.

Figure 2:
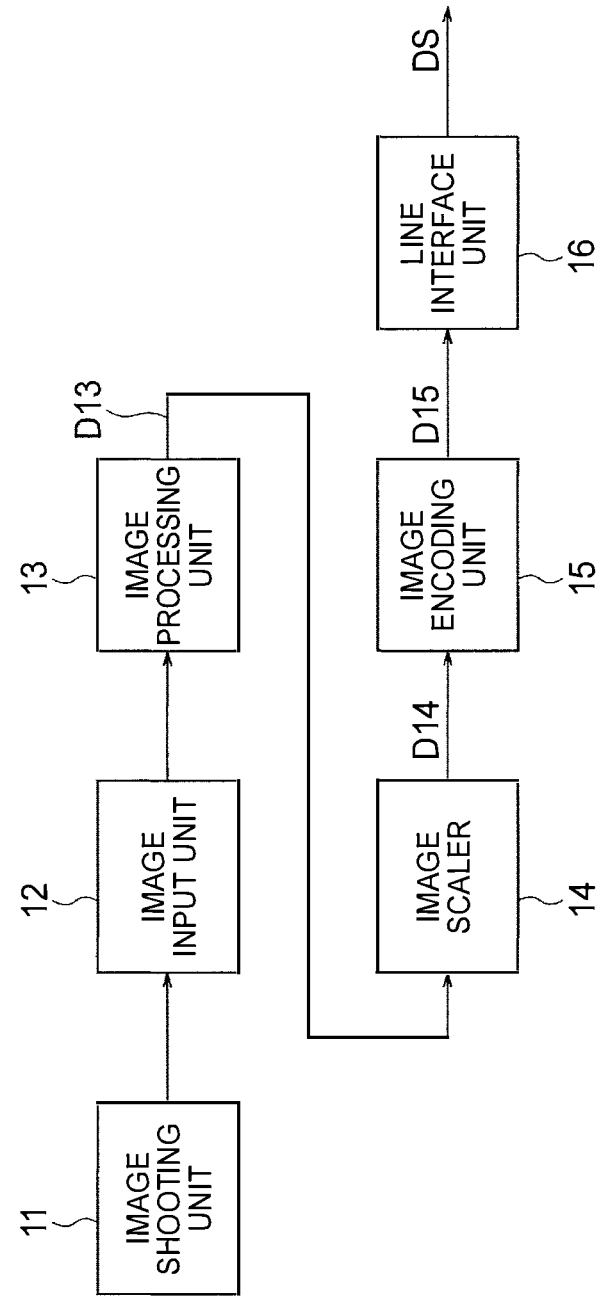
FIG. 2 is a block diagram showing an example of a configuration of a surveillance camera in FIG. 1.

FIG. 2 shows an example of a configuration of the surveillance camera 10 in FIG. 1. The illustrated surveillance camera 10 includes an image shooting unit 11, an image input unit 12, an image processing unit 13, an image scaler 14, an image encoding unit 15, and a network interface unit 16.

The image shooting unit 11 obtains images by shooting the target area to be surveyed. The images obtained by the image shooting unit 11 are input to the image input unit 12.

The image input unit 12 performs processes such as analog-to-digital conversion, on input images from the image shooting unit 11, and outputs the resultant images to the image processing unit 13. The image processing unit 13 performs image processes on the images supplied from the image input unit 12 to obtain processed images D13.

Examples of the image processes performed by the image processing unit 13 are signal level correction such as gamma correction, color correction, white balancing, noise reduction, flicker correction, digital sensitization, image combining, edge enhancement, and rendering. The image processing unit 13 performs one of the above-mentioned processes, or a plurality of the above-mentioned processes in combination. The image processing unit 13 may be adapted to perform any other well-known image process, either independently, or in combination with any of the above processes.

The image scaler 14 performs enlargement by means of a super-resolution process, on the processed images D13, to generate high-resolution images D14, and outputs them to the image encoding unit 15.

The image encoding unit 15 performs compression of the image data by an image encoding method, such as JPEG, H.264. MPEG-2, or MPEG-4, on the high-resolution images D14, and outputs a video stream D15 to the network interface unit 16.

The network interface unit 16 multiplexes the video stream D15 with other data such as audio data, performs processes such as packetization, and sends out a multiplexed stream DS to the network 30.

FIG. 3 shows an example of a configuration of the network recorder 20 in FIG. 1. The illustrated network recorder 20 includes a network interface unit 21, a recording/reproducing unit 22, a storage device 23, an image decoding unit 24, an image scaler 25, and a display image generating unit 26.

The network interface unit 21 demultiplexes the multiplexed stream DS received via the network 30 into a video stream, an audio stream, and the like, and outputs them to the recording/reproducing unit 22.

The recording/reproducing unit 22 records the demultiplexed data in the storage device 23.

The recording/reproducing unit 22 also outputs the video stream input from the network interface unit 21, or the video stream read from the storage device 23, to the image decoding unit 24.

The image decoding unit 24 performs decompression of the image data having been compressed by the image encoding method such as JPEG, H.264, MPEG-2, or MPEG-4, and outputs the decoded images D24 to the image scaler 25.

The image scaler 25 performs enlargement by means of a super-resolution process, on the decoded images D24, to generate high-resolution images D25, and outputs them to the display image generating unit 26.

The display image generating unit 26 converts the image data into a form suitable for display by the monitor 40, and outputs the converted image data to the monitor 40.

The monitor 40 displays images responsive to the image data from the display image generating unit 26.

In the surveillance system in FIG. 1, the images may be enlarged by both of, or either one of the image scaler 14 in the surveillance camera 10, and the image scaler 25 in the network recorder 20. For example, it may be so arranged that, when the network recorder 20 is provided with the image scaler 25, the image scaler 14 in the surveillance camera 10 does not perform the image enlargement, and the image scaler 25 in the network recorder 20 performs the image enlargement, while when the network recorder 20 is not provided with the image scaler 25, the image scaler 14 in the surveillance camera 10 performs the image enlargement.

FIG. 4 shows an image enlargement apparatus which can be used as the image scaler 14 in FIG. 2 and the image scaler 25 in FIG. 3. When the image enlargement apparatus 50 is used as the image scaler 14, the processed image D13 is supplied as the input image Din, and an output image Dout is output as the high-resolution image D14.

When the image enlargement apparatus 50 is used as the image scaler 25, the decoded image D24 is supplied as the input image Din, and the output image Dout is output as the high-resolution image D25.

In the examples described in detail hereinbelow, the enlargement factor of the image enlargement apparatus 50 is two in both of the horizontal direction and the vertical direction.

In the following explanation, it is assumed that the enlargement process by means of a super-resolution process is performed on the luminance component of the image. In this case, the luminance component of the processed image D13 or the decoded image D24 is taken as the input image Din, and the enlargement process by means of a super resolution process is applied to the luminance component. The present invention however is not limited to such a scheme, and similar processes can also be applied to the color difference components. If the image is represented by data of color components of red, green and blue, for example, the enlargement by means of a super resolution process can be applied to each of the color components.

The image enlargement apparatus 50 shown in FIG. 4 includes a linear interpolation unit 52, a high-resolution patch generating unit 54, a patch averaging unit 55, a pattern identification unit 56, a coefficient data storage unit 57, and a coefficient data reading unit 58.

The linear interpolation unit 52 enlarges the input image Din by means of linear interpolation, to generate an enlarged image, i.e., an interpolated image D52, of a low resolution.

The interpolated image D52 is also called a low-resolution enlarged image, for distinction from a high-resolution image to be described later.

The high-resolution patch generating unit 54 extracts a plurality of patches (interpolated image patches) each forming a part of the interpolated image D52, and performs high-resolution conversion on each patch, to generate a corresponding high-resolution patch. In the generation of the high-resolution patch, pixel values of the pixels forming the patch are determined.

The patch averaging unit 55 averages, for each pixel in the high-resolution image, the pixel values of the pixel determined in the generation of each of one or more high-resolution patches, to generate the pixel value of the pixel in the output image.

The pattern identification unit 56 identifies the feature of the local region in the input image Din corresponding to each patch in the interpolated image D52, and generates a selection code D56 based on the result of the identification.

The pattern identification unit 56 in this embodiment uses an average value of the pixel values of the pixels in the local region, or the pixel value of the pixel positioned at the center of the local region as a reference value, and compares the pixel values of peripheral pixels other than the pixel positioned at the center, with the reference value, and generates the selection code based on the results of the comparison.

The coefficient data storage unit 57 stores a plurality of coefficient data respectively corresponding to a plurality of mutually different patterns. Each coefficient data includes data representing one set of coefficients, so that it can be called coefficient set data.

The coefficient data reading unit 58 reads a coefficient data corresponding to the selection code, among the plurality of coefficient data stored in the coefficient data storage unit 57, and outputs it as a selected coefficient data.

The high-resolution patch generating unit 54 generates the high-resolution patch by using the coefficient data read from the coefficient data storage unit 57.

The processes performed by each unit will be described below in further detail.

Figure 5A:
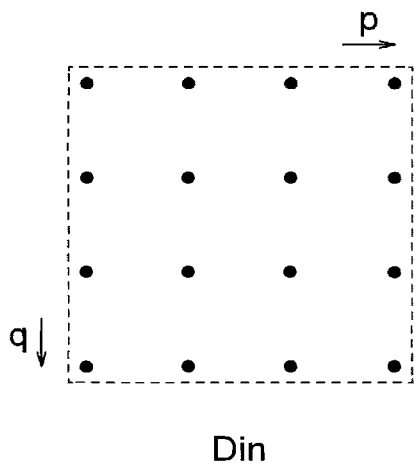
FIGS. 5(a) and (b) are diagrams showing an input image and an interpolated image obtained by enlarging the input image by linear interpolation.
Figure 5B:
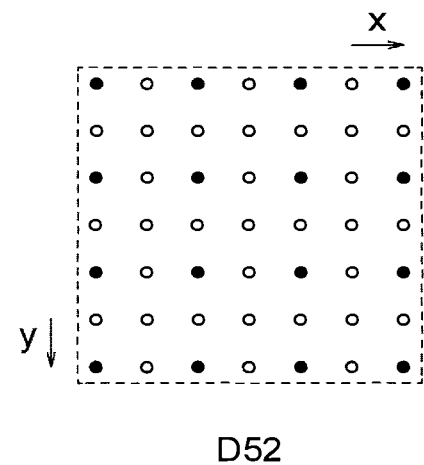

The linear interpolation unit 52 enlarges the input image Din shown in FIG. 5(a), for example, to generate an interpolated image D52 shown in FIG. 5(b). The enlargement factor in the linear interpolation is identical to the enlargement factor of the image enlarging apparatus 50, and is, for example, two in each of the horizontal direction and the vertical direction. In FIGS. 5(a) and (b), each of the dots represents a pixel. The interpolation of the image is performed by for example a bicubic method. Among the pixels in the interpolated image D52 in FIG. 5(b), the pixels represented by the black dots are the pixels at the positions corresponding to the pixels in the input image Din shown in FIG. 5(a).

The position in the input image Din is represented by coordinates (p, q). p is a value taking, as a unit, one pixel pitch (interval between adjacent pixels) in the horizontal direction in the input image Din, and q is a value taking, as a unit, one pixel pitch (interval between adjacent pixels) in the vertical direction in the input image Din. At the position of each pixel, p and q are integers.

The position in the interpolated image D52 is represented by coordinates (x, y). x is a value taking, as a unit, one pixel pitch (interval between adjacent pixels) in the horizontal direction in the interpolated image D52, and y is a value taking, as a unit, one pixel pitch (interval between adjacent pixels) in the vertical direction in the interpolated image D52. At the position of each pixel, x and y are integers.

When the coordinates of the pixel at the upper left corner of the input image Din are (p, q)=(1, 1), and the coordinates of the pixel at the upper left corner of the interpolated image D52 are (x, y)=(1, 1), the relations:

$$x=2p-1$$

$$y=2q-1$$

hold.

If the coordinates of the pixel at the lower right corner of the input image are represented by (P, Q), the coordinates of the pixel at the lower right corner of the interpolated image D52 are represented by $$(X,Y)=(2P-1,2Q-1).$$

The high-resolution patch generating unit 54 extracts, from the interpolated image D52, a plurality of patches (interpolated image patches) LPc, each forming a part of the interpolated image D52, and converts each of the extracted patches LPc to that of a high resolution, and outputs data of the corresponding high-resolution patches. The data of each high-resolution patch includes data representing the pixel values of the pixels forming the patch.

The plurality of the high-resolution patches in combination form a high-resolution image D54. The high-resolution image D54 has the same number of pixels as the interpolated image D52, both in the horizontal direction and the vertical direction, and the arrangement of the pixels in the high-resolution image D54 is the same as the arrangement of the pixels in the interpolated image D52 shown in FIG. 5(b).

Figure 6:
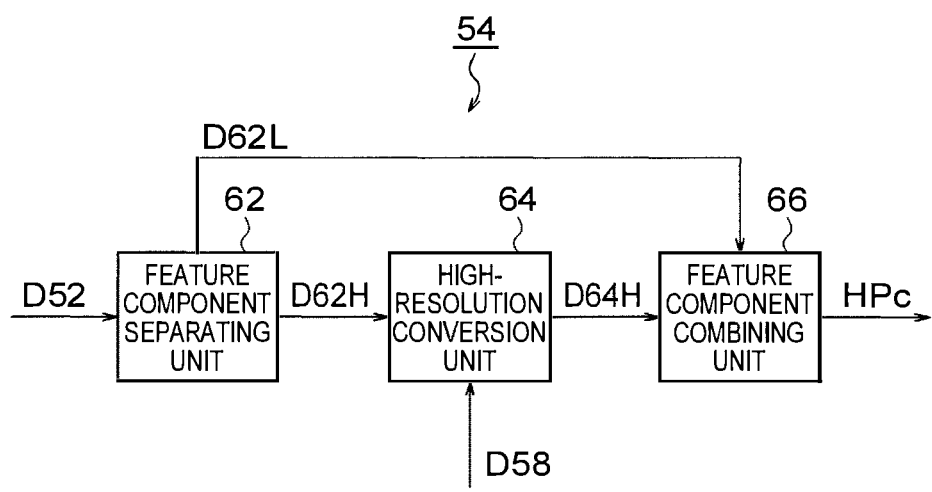
FIG. 6 is a block diagram showing a configuration of a high-resolution patch generating unit used in the image enlarging apparatus of the first embodiment.

The high-resolution patch generating unit 54 includes a feature component separating unit 62, a high-resolution conversion unit 64, and a feature component combining unit 66, as shown in FIG. 6.

The feature component separating unit 62 extracts, from the interpolated image D52, a plurality of patches (interpolated image patches) LPc respectively forming parts of the interpolated image D52, separates the pixel values in each of the extracted patches into a feature component D62H (feature component of the low-resolution) of the interpolated image patch, and a non-feature component D62L (non-feature component of the low-resolution).

The extraction of the patches from the interpolated image D52 is so made that each pixel in the interpolated image D52 is included in at least one of the plurality of patches LPc formed by the extraction, and the patches formed by the extraction overlap each other.

Figure 7:
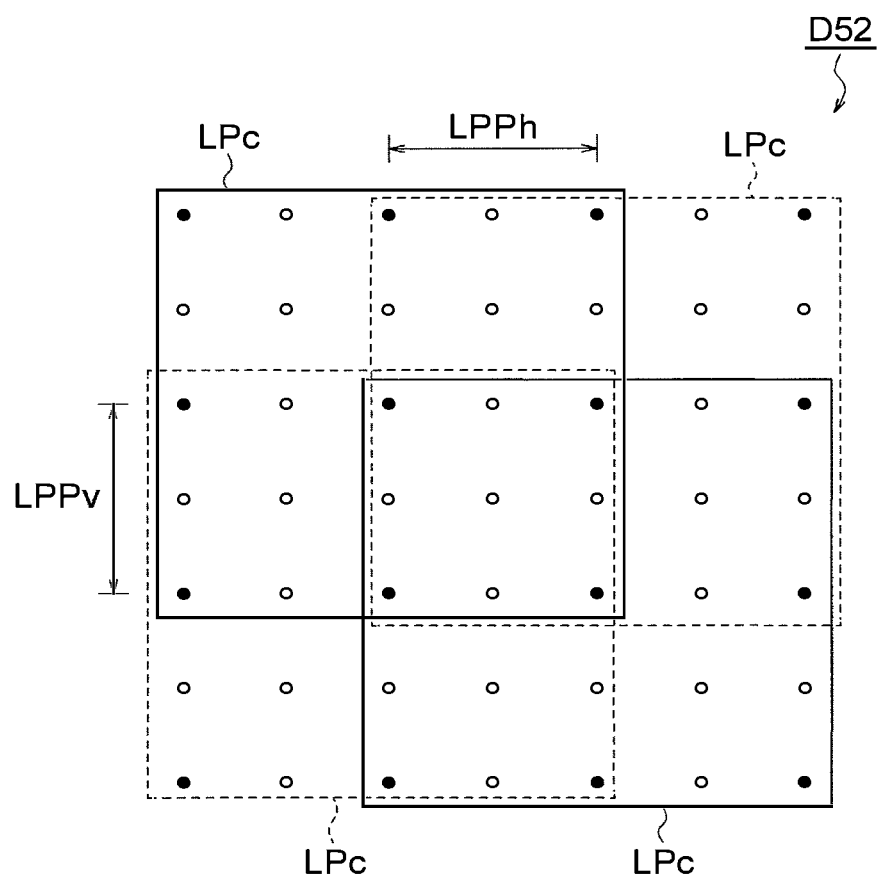
FIG. 7 is a diagram showing an arrangement of patches in the interpolated image, and pixels included in each patch.

For example, as shown in FIG. 7, each patch LPc is a rectangular region consisting of NL×NL pixels. NL is for example five, and the pitch LPPh of the patches (distance between the centers of the patches) in the horizontal direction, and the pitch LPPv of the patches (distance between the centers of the patches) in the vertical direction are both two pixels, with the result that there is an overlap of three pixels in the horizontal direction between patches mutually adjacent in the horizontal direction, and there is an overlap of three pixels in the vertical direction between patches mutually adjacent in the vertical direction.

For each patch LPc in the interpolated image D52, the feature component separating unit 62 determines a mean value lMean of the NL×NL pixels in the patch, and outputs it as the non-feature component D62L, and subtracts the mean value lMean from the pixel value of each of the pixels to obtain NL×NL difference values as feature quantities, and outputs, as the feature component D62H, a column vector obtained by arranging the feature quantities in a predefined order.

For example, as shown in FIG. 8(a), the pixels P(1) to P(25) are selected in the order of their numbers (the numerals in the parentheses), and their difference values $dl_1$ to $dl_{25}$ are taken as the feature quantities, and are arranged sequentially from the top, to form the column vector as shown in FIG. 8(b).

The feature component D62H is obtained by subtracting the mean value from the pixel value of each pixel, so that it can be said to be a high-frequency component of the patch, while the non-feature component D62L can be said to be a low-frequency component of the patch.

Using the coefficient data D58 selected by the coefficient data reading unit 58, the high-resolution conversion unit 64 converts the feature component D62H of the low resolution to the feature component D64H of the high resolution. This conversion is from the feature component of the patch in the interpolated image (low-resolution enlarged image) into the feature component of the corresponding patch in the high-resolution image. Here, "corresponding" with respect to the position means that the position of the pixel at the center of the patch in the high-resolution image is identical to the position of the pixel at the center of the patch in the interpolated image, in other words, the position of the pixel at the center of the patch in the high-resolution image coincides with the position of the pixel at the center of the patch in the interpolated image when the high-resolution image is superimposed on the interpolated image in such a manner that their edges coincide with each other. The patch in the interpolated image and the patch in the high-resolution image having the central positions corresponding to each other form a patch pair.

The patches in the high-resolution image are also formed to overlap each other.

For example, as shown in FIG. 9, each patch HPc is a rectangular region consisting, for example, of NH×NH pixels. NH is for example three. The pitch HPPh of the patches in the horizontal direction and the pitch HPPv of the patches in the vertical direction are both two pixels, so that there is an overlap of one pixel between patches mutually adjacent in the horizontal direction, and there is an overlap of one pixel between patches mutually adjacent in the vertical direction.

The coefficient data D58 represents the relation between the feature component values D62H of each patch LPc in the interpolated image and the feature component values D64H of a corresponding patch HPc in the high-resolution image, and is supplied from the coefficient data reading unit 58.

If the feature component D62H of each patch in the interpolated image is defined by a column vector nlp having NL×NL values $dl_1$ to $dl_{NL×NL}$ (feature component values of the pixels constituting each patch in the interpolated image), the feature component D64H of the corresponding patch in the high-resolution image is defined by a column vector nhp having NH×NH values $dh_1$ to $dh_{NH×NH}$ (feature component values of the pixels constituting the corresponding patch in the high-resolution image), and the coefficient data D58 is defined by a matrix M consisting of components (coefficients) in NH×NH rows and NL×NL columns, the conversion by the high-resolution conversion unit 64 is represented by the following equation (1).

[Mathematical Expression 1]

$$nhp = M \times nlp \quad (1)$$

For the case of NL=5 and NH=3, the equation (1) can be rewritten as the following equation (2) using matrixes.

[Mathematical Expression 2]

$$\begin{pmatrix} dh_1 \\ dh_2 \\ \vdots \\ dh_9 \end{pmatrix} = \begin{pmatrix} m_{1,1} & m_{2,1} & \cdots & \cdots & m_{25,1} \\ m_{1,2} & m_{2,2} & \cdots & \cdots & m_{25,2} \\ \vdots & \vdots & & & \vdots \\ \vdots & \vdots & & & \vdots \\ m_{1,9} & m_{2,9} & \cdots & \cdots & m_{25,9} \end{pmatrix} \times \begin{pmatrix} dl_1 \\ dl_2 \\ \vdots \\ dl_{25} \end{pmatrix} \quad (2)$$

The left side of the equation (2) is obtained by selecting the pixels Q(1) to Q(9) shown in FIG. 10, in the order of their numbers (numerals in the parentheses), and arranging their difference values $dh_1$ to $dh_9$ sequentially from the top. The pixels Q(1) to Q(9) shown in FIG. 10 are those at 3×3 positions, namely the positions corresponding to P(7), P(8), P(9), P(12), P(13), P(14), P(17), P(18) and P(19), in the central part among the pixels shown in FIG. 8(a).

The equation (1) and the equation (2) indicate that the value of each pixel in the feature component D64H of the high-resolution is obtained by weighted addition of all of the NL×NL pixels of the feature component D62H of the low-resolution.

The matrix M is formed of coefficients represented by the coefficient data D58 selected by the coefficient data reading unit 58. The coefficient data reading unit 58 selects a coefficient data among the plurality of coefficient data D57 stored in the coefficient data storage unit 57, and supplies the selected coefficient data to the high-resolution conversion unit 64. Each of the plurality of coefficient data stored in the coefficient data storage unit 57 represents the relation of the pair consisting of the feature component D62H in the interpolated image generated from a training image, and the feature component D64H in the high-resolution image. A method of generating the coefficient data will be described later.

The conversion from the feature component D62H of the low resolution into the feature component D64H of the high resolution may be non-linear. In such a case, as the coefficient data, those defining coefficients of non-linear function are used.

The feature component combining unit 66 combines the feature component D64H of the high resolution and the non-feature component D62L to generate a high-resolution patch HPc.

For example, the feature component combining unit 66 adds the mean value lMean (=D62L) of the patch in the interpolated image to the respective components $dh_1$ to $dh_9$ (values pertaining to the respective pixels) of the feature component D64H of the high resolution.

The combination by the feature component combining unit 66 is represented by the following equation (3).

[Mathematical Expression 3]

$$hp = c \cdot nhp + lMean \quad (3)$$

In the equation (3), hp is a column vector having NH×NH values $h_1$ to $h_{NH×NH}$ representing pixel values of pixels constituting the high-resolution patch HPc, nhp is a column vector having the feature component values $dh_1$ to $dh_{NH×NH}$ of NH×NH pixels constituting the feature component D64H of the high-resolution patch, lMean is a scalar value representing the non-feature component D62L, and c is a scalar value (constant) for adjusting the gain for the feature component of the high resolution (high-frequency component).

The equation (3) can be rewritten as the following equation (4), using matrixes for the case of NH=3.

[Mathematical Expression 4]

$$\begin{pmatrix} h_1 \\ h_2 \\ \vdots \\ \vdots \\ h_9 \end{pmatrix} = c \times \begin{pmatrix} dh_1 \\ dh_2 \\ \vdots \\ \vdots \\ dh_9 \end{pmatrix} + lMean \quad (4)$$

In the equation (3) or the equation (4), a result of estimation exactly corresponding to the result of the learning can be obtained by putting c=1.

By putting c>1, the feature component of the high resolution (high-frequency component) is intentionally strengthened (enhanced), thereby to increase the sense of high resolution of the output image.

The computation according to the equation (3) or the equation (4) is performed for each of the high-resolution patches.

As was described earlier, the patches are formed to overlap each other, so that some pixels belong to a plurality of patches. In the example of FIG. 9, among the pixels in the high-resolution image, the pixel Pxc positioned at the center of each patch belongs to a single patch HPc, the pixels Pxa horizontally adjacent to the central pixel Pxc and the pixels Pxb vertically adjacent to the central pixel Pxc belong to two patches HPc, and the pixels Pxd diagonally adjacent to the central pixel Pxc belong to four patches HPc.

For the pixels belonging to two patches, two results of computation according to the equation (3) or the equation (4) (the pixel values of the pixels determined in the computation pertaining to the respective patches) are obtained; for the pixels belonging to four patches, four results of computation according to the equation (3) or the equation (4) are obtained; for the pixels belonging to a single patch, just one result of computation according to the equation (3) or the equation (4) is obtained.

The patch averaging unit 55 averages one or more high-resolution patch values (the pixel values of the pixels determined in the generation of the respective patches) for each pixel in the high-resolution image, thereby to generate the pixel value Dout(x, y) of the pixel in the output image Dout. That is, for the pixels belonging to two patches, two patch values are averaged; for the pixels belonging to four patches, four patch values are averaged; for the pixels belonging to just one patch, the single patch value is output as is.

As was described above, the arrangement of the pixels in the high-resolution image D54 is the same as the arrangement of the pixels in the interpolated image D52 shown in FIG. 5(b), and the position of each pixel in the high-resolution image D54 is represented by the coordinates (x, y), and the pixel value of the pixel is represented by D54(x, y).

The position of each pixel in the high-resolution patch HPc is represented by offset coordinates (u, v) with respect to the central pixel in the patch, where u=−1 to 1, v=−1 to 1).

There is the following relation between the coordinates (x, y) in the high-resolution image D54 and the offset coordinates (u, v) in the high-resolution patch HPc.

$$(x,y)=(xc+u, yc+v)$$

Here, (xc, yc) are coordinates of the central pixel in the high-resolution patch HPc in the high-resolution image D54.

Accordingly, the pixel value of the pixel at the coordinates (u, v) in the patch HPc centered around the pixel at the position of the coordinates (xc, yc) in the high-resolution image D54, generated by the high-resolution patch generating unit 54 is obtained as the pixel value of the pixel at the coordinates (x, y)=(xc+u, yc+v) in the high-resolution image D54.

For the pixel at the coordinates (x, y) in the high-resolution image, the patch averaging unit 55 determines the pixel value Dout(x, y) in the output image Dout by averaging the pixel values D54(x, y) obtained from one or more high-resolution patches HPc.

By a set of pixels having the pixel values Dout(x, y) having been determined in the manner described above, the output image Dout is formed.

Like the high-resolution image D54, the output image Dout has the same number of pixels as the interpolated image both in the horizontal direction and in the vertical direction, and the arrangement of the pixels in the output image Dout is the same as the arrangement of the pixels in the interpolated image shown in FIG. 5(b).

The coefficient data storage unit 57 stores a plurality of coefficient data representing the correspondence relation between the feature component in the interpolated image and the feature component in the high-resolution image. The coefficient data are determined for the respective patterns of the variation in the pixel values in each part of the image. What pattern each part of the image has is determined by the pattern identification unit 56.

Figure 11:
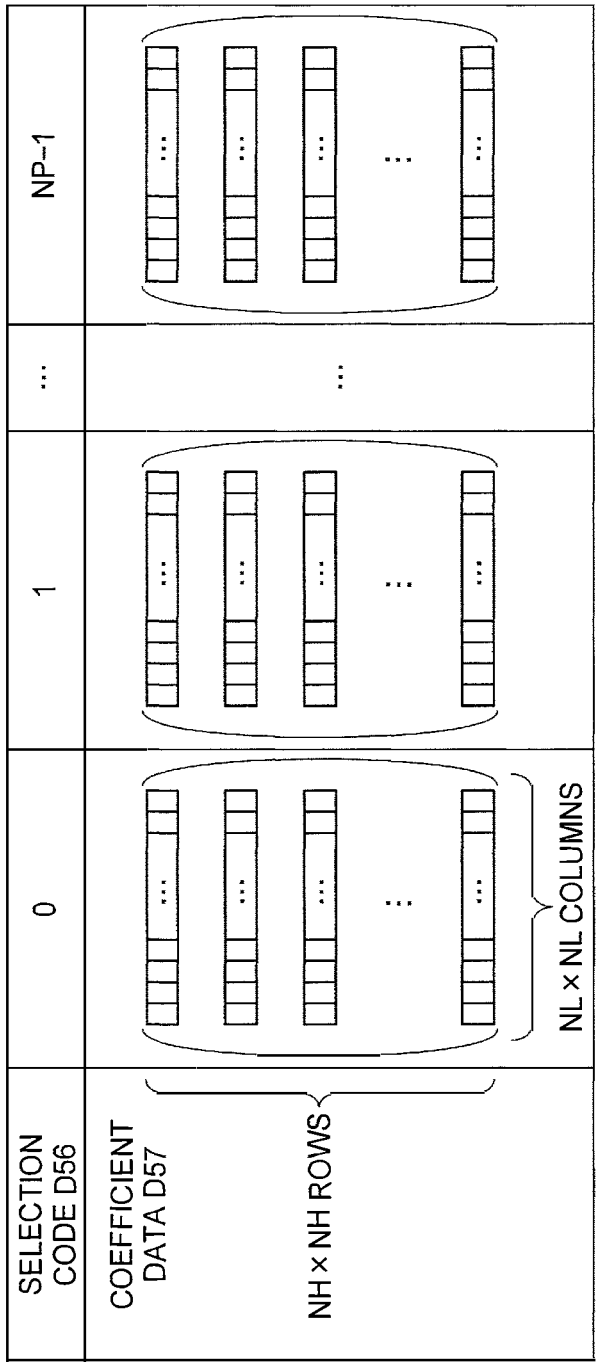
FIG. 11 is a diagram showing an example of coefficient data stored in a coefficient data storage unit 57.

FIG. 11 shows a plurality of the coefficient data D57 stored by the coefficient data storage unit 57. In the example shown in FIG. 11, a set of coefficients represented by each coefficient data D57 constitute a matrix M having NH×NH rows and NL×NL columns used in the equation (1) or the equation (2), and is defined for each of the values 0, 1, ..., NP−1 (NP being the number of values which can be assumed by the selection code) of the selection code D56. When the selection code D56 is input to the coefficient data storage unit 57, the coefficient data corresponding to (preset to correspond to) the input selection code D56 is selected.

The pattern identification unit 56 identifies the feature of the local region in the input image Din, corresponding to each patch in the interpolated image D52, and generates the selection code D56 based on the result of the identification.

Figure 12:
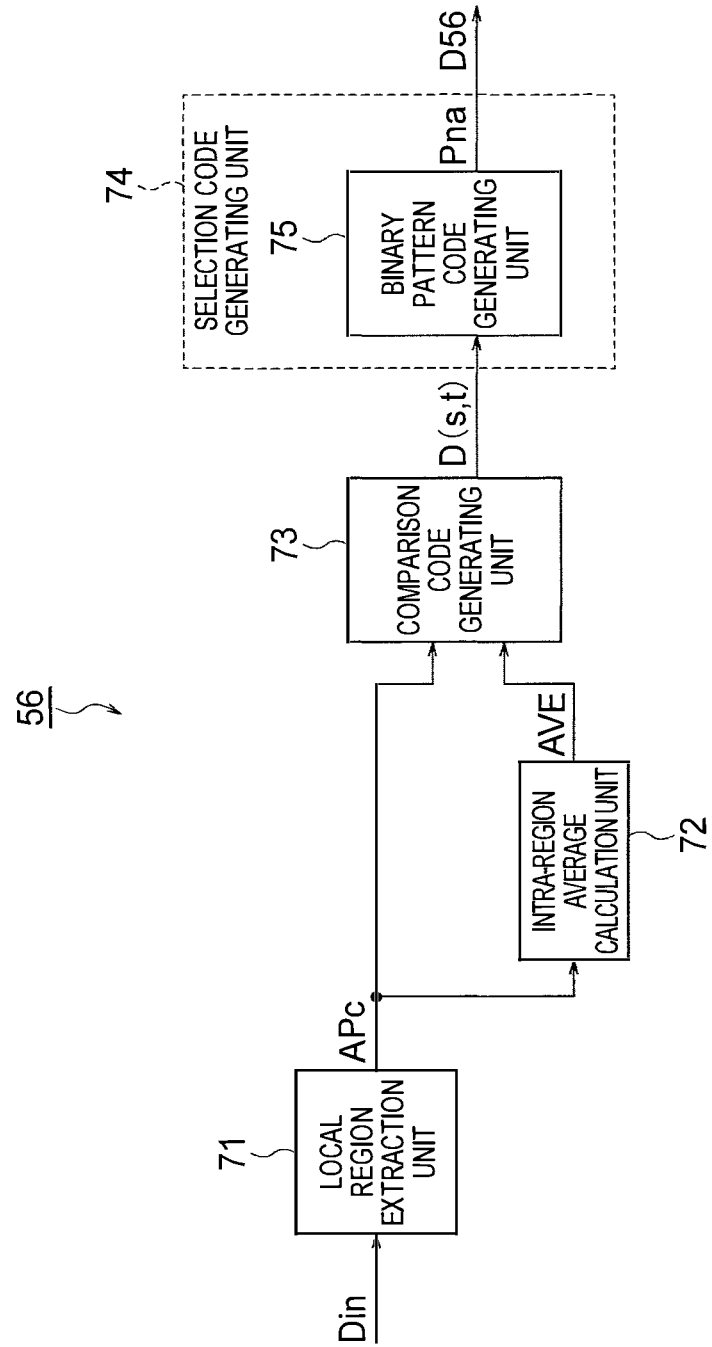
FIG. 12 is a block diagram showing a configuration of a pattern identification unit used in the image enlarging apparatus of the first embodiment.

The pattern identification unit 56 in FIG. 4 includes a local region extraction unit 71, an intra-region average calculating unit 72, a comparison code generating unit 73, and a selection code generating unit 74, as shown in FIG. 12.

In the illustrated example, the selection code generating unit 74 is formed of a binary pattern code generating unit 75.

The local region extraction unit 71 extracts, as a local region, a part of the input image Din corresponding to the patch LPc in the interpolated image, and supplies data representing the pixel values of the pixels in the extracted local region, to the intra-region average calculation unit 72 and the comparison code generating unit 73.

Figure 13:
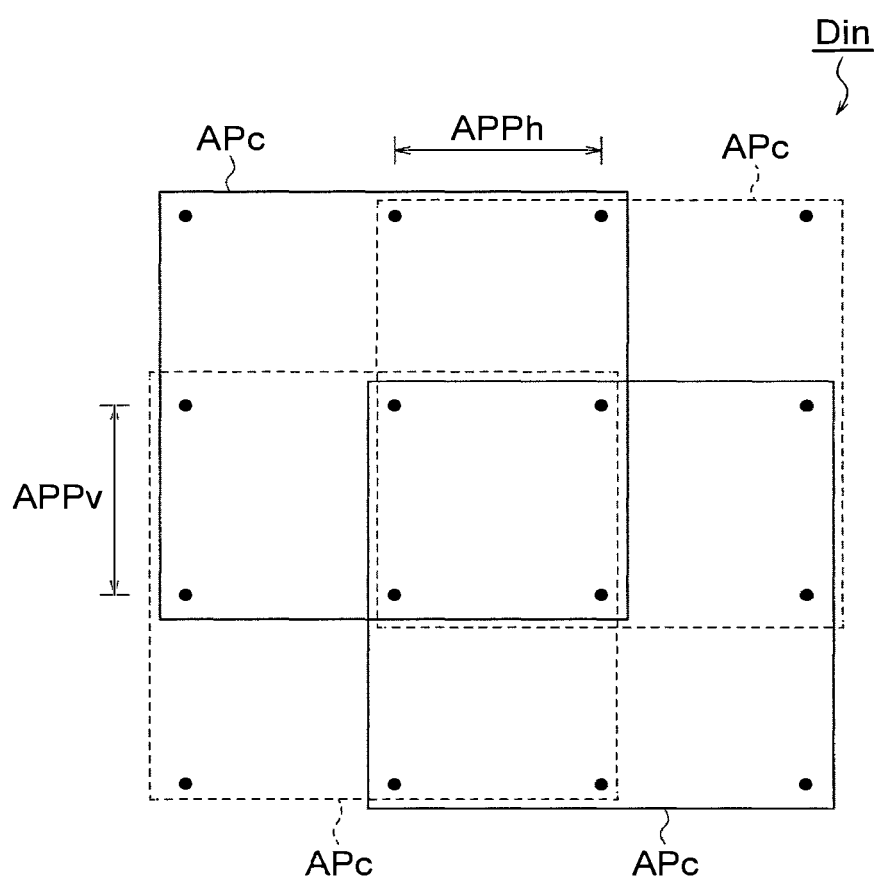
FIG. 13 is a diagram showing an arrangement of local regions in the input image and pixels contained in each local region.

As shown in FIG. 13, the local region APc is a rectangular region consisting of NA×NA pixels, that is, a square region. NA is for example three, and the pitch APPh of the local regions (distance between the centers of local regions) in the horizontal direction and the pitch APPv of the local regions (distance between the centers of local regions) in the vertical direction are both one pixel.

The position of the pixel in the extracted local region APc is represented by offset coordinates (s, t) with respect to the central pixel in the local region, where s=−1 to 1, t=−1 to 1, and the pixel value of the pixel at such a position is represented by IN(s, t).

The intra-region average calculation unit 72 determines an average value AVE of the pixel values IN(s, t) of the pixels in each local region APc supplied from the local region extraction unit 71.

The average AVE may be a simple average of the pixel values of all the pixels in each local region, or a weighted average with a larger weight for the central pixel. An example of computation for determining the weighted average is represented by the following equation (5).

[Mathematical Expression 5]

$$AVE = \frac{IN(-1,-1)}{16} + \frac{IN(0,-1)}{8} + \frac{IN(1,-1)}{16} + \frac{IN(-1,0)}{8} + \\ \frac{IN(0,0)}{4} + \frac{IN(1,0)}{8} + \frac{IN(-1,1)}{16} + \frac{IN(0,1)}{8} + \frac{IN(1,1)}{16}$$ (5)

The comparison code generating unit 73 compares the magnitudes of the pixel values IN(s, t) of the pixels (peripheral pixels) other than the pixel positioned at the center in each local region, output from the local region extraction unit 71, with the magnitude of the average value AVE of the pixel values of the pixels in the same local region output from the intra-region average calculation unit 72, and outputs comparison codes of a binary value, D(s, t) (binary comparison codes) indicating the results of the comparison pertaining to the respective pixels.

For instance, when the pixel value IN(s, t) is smaller than the average value AVE, the comparison code D(s, t) is set to "0b" and output; when the pixel value IN(s, t) is not smaller than the average value AVE, the comparison code D(s, t) is set to "1b" and output.

The above process of generating the comparison code D(s, t) is represented by the following mathematical expression (6).

[Mathematical Expression 6]

$$D(s,t) = \begin{cases} 0b & \text{when } IN(s,t) < AVE \\ 1b & \text{when } IN(s,t) \geq AVE \end{cases}$$ (6)

"0b" and "1b" respectively correspond to decimal numbers "0" and "1".

In the above example, when the pixel value IN(s, t) is equal to the average value AVE the comparison code D(s, t) is set to "0b". The comparison code D(s, t) in this case may alternatively be set to "1b". In summary, it is satisfactory if the comparison code generating unit 73 performs one of a decision as to whether the pixel value IN(s, t) is not smaller than the average value AVE, and a decision as to whether the pixel value IN(s, t) is not larger than the average value AVE.

The allocation of the codes "0b" and "1b" may be opposite to that described above. In summary, it is satisfactory if the comparison code generating unit 73 outputs a first value or a second value depending on the result of the decision.

The binary pattern code generating unit 75 links the comparison codes D(s, t) pertaining to the eight peripheral pixels generated for each local region by the comparison code generating unit 73, to generate a binary pattern code Pna. The binary pattern code Pna generated in this way is a sequence of numbers obtained by arranging and linking the comparison codes D(s, t) in an order predefined according to the positions of the corresponding pixels.

Figure 14A:
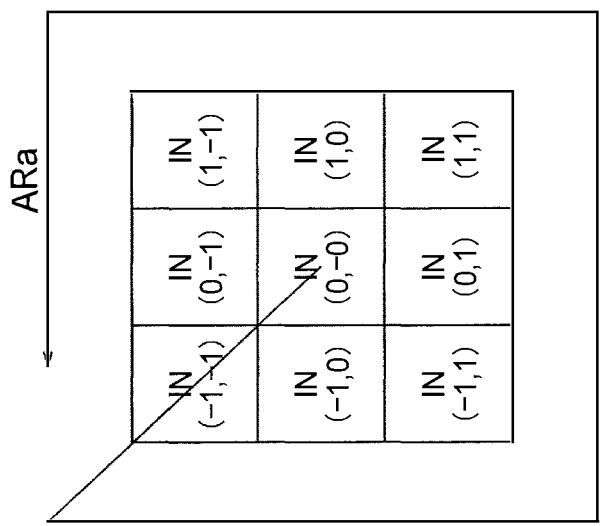
FIG. 14(a) is a diagram showing the pixel values of pixels in each patch in the input image Din, at positions of the respective pixels.
Figure 14B:
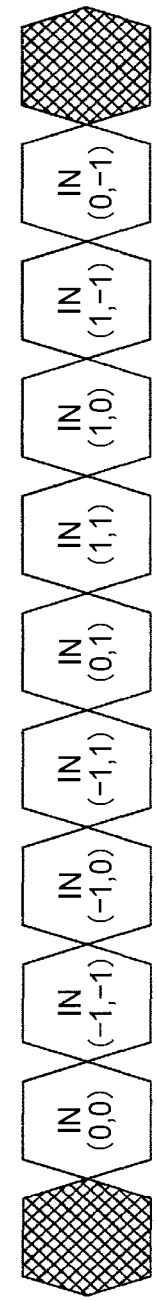
FIG. 14(b) is a diagram showing the order of input of the pixel values IN(s, t) of the pixels in each patch, to the comparison code generating unit.

FIG. 14(*a*) shows the pixel values IN(s, t), at respective positions (s, t), of nine pixels in a local region in the input image Din, and the order of input of the pixel values IN(s, t) to the comparison code generating unit 73 by an arrow-headed line ARa.

FIG. 14(*b*) shows the pixel values IN(s, t) of the nine pixels in a local region in the order of input to the comparison code generating unit 73. The pixel values IN(s, t) are input in the order from the left to the right in FIG. 14(*b*).

As shown in FIGS. 14(*a*) and 14(*b*), the pixel positioned at the center of a local region is first selected and its pixel value IN(0, 0) is input. Subsequently, the pixel at the upper left corner is selected and its pixel value IN(−1, −1) is input, and the pheripheral pixels are successively selected counterclockwise as indicated by the arrow-headed line ARa in the diagram, and their pixel values are input.

The order of selection of the pixels may be clockwise, opposite to that shown in FIG. 14(*a*). The pixel selected next after the central pixel may be other than the pixel at the upper left corner.

FIGS. 15(*a*) to 15(*c*) show an example of the comparison by the comparison code generating unit 73 and the generation of the binary pattern code Pna by the binary pattern code generating unit 75, performed for a local region.

In FIG. 15(*a*), 3×3 squares respectively correspond to 3×3 pixels in FIG. 14(*a*), and the numerals in each square represent the pixel value of the pixel at the position of the square.

AVE indicates the average value of the 3×3 pixel values which are shown in the diagram. In the illustrated example, "115" is calculated as the average value AVE by the intra-region average calculation unit 72, and supplied to the comparison code generating unit 73.

The comparison code generating unit 73 compares the pixel values IN(s, t) of the eight peripheral pixels shown in FIG. 15(*a*), with the average value AVE, and binarizes each pixel value to produce "1b" if the pixel value is not smaller than the average value AVE, and to produce "0b" if the pixel value is smaller than the average value AVE, and successively generates and outputs the comparison codes D(s, t), that is, D(−1,−1), D(−1,0), D(−1,1), D(0,−1), D(0,1), D(1,−1), D(1,0), D(1,1), shown in FIG. 15(*b*).

The order of output of the binary comparison codes D(s, t) from the comparison code generating unit 73 is as indicated by an arrow-headed line ARb in FIG. 15(*b*).

The binary pattern code generating unit 75 successively arranges and links the comparison codes D(s, t) output from the comparison code generating unit 73 in the order shown in FIG. 15(*b*), to generate the binary pattern code Pna of eight bits shown in FIG. 15(*c*). That is, by allocating the comparison code D(−1, −1) for the pixel at the coordinates (s, t)=(−1, −1) to a first bit, the comparison code D(−1, 0) for the pixel at the coordinates (s, t)=(−1, 0) to a second bit, and thereafter selecting the comparison codes D(s, t) counterclockwise as indicated by the arrow-headed line ARb in FIG. 15(*b*) and arranging them successively (allocating to the respective bit positions), the binary pattern code Pna of eight bits, shown in FIG. 15(*c*) is generated. The generation of the binary pattern code Pna is represented by the following equation (7).

[Mathematical Expression 7]

$$Pna = D(-1, -1) \cdot 2^0 + D(-1, 0) \cdot 2^1 + D(-1, 1) \cdot 2^2 + D(0, 1) \cdot 2^3 + \\ D(1, 1) \cdot 2^4 + D(1, 0) \cdot 2^5 + D(1, -1) \cdot 2^6 + D(0, -1) \cdot 2^7 \quad (7)$$

When the pixel values of the 3×3 pixels in the extracted local region are as shown in FIG. 15(a), the binary pattern code Pna determined by the equation (7) will be one which corresponds to a decimal number "49", as shown in FIG. 15(c).

The binary pattern code Pna thus generated is output as the selection code D56.

As explained in connection with FIG. 11, the coefficient data storage unit 57 stores, for each of the values 0, 1, . . . NP-1 of the selection code D56, a matrix M consisting of elements (coefficients) in NH×NH rows and NL×NL columns used in the equation (1) or equation (2).

When the binary pattern code Pna consists of a combination of the binary comparison codes D(s, t) pertaining to eight pixels, i.e., eight binary comparison codes, as in the example described above, the number of values which can be assumed by the binary pattern code Pna, and hence by the selection code D56 is 256. In this case, 256 coefficient data are stored in the coefficient data storage unit 57.

The coefficient data reading unit 58 reads, among the 256 coefficient data D57 stored in the coefficient data storage unit 57, the coefficient data corresponding to the binary pattern code Pna (selection code D56), and outputs it as the selected coefficient data D58.

Next, the operation of the above image enlarging apparatus will be described with reference to a flowchart of FIG. 16.

Figure 16:
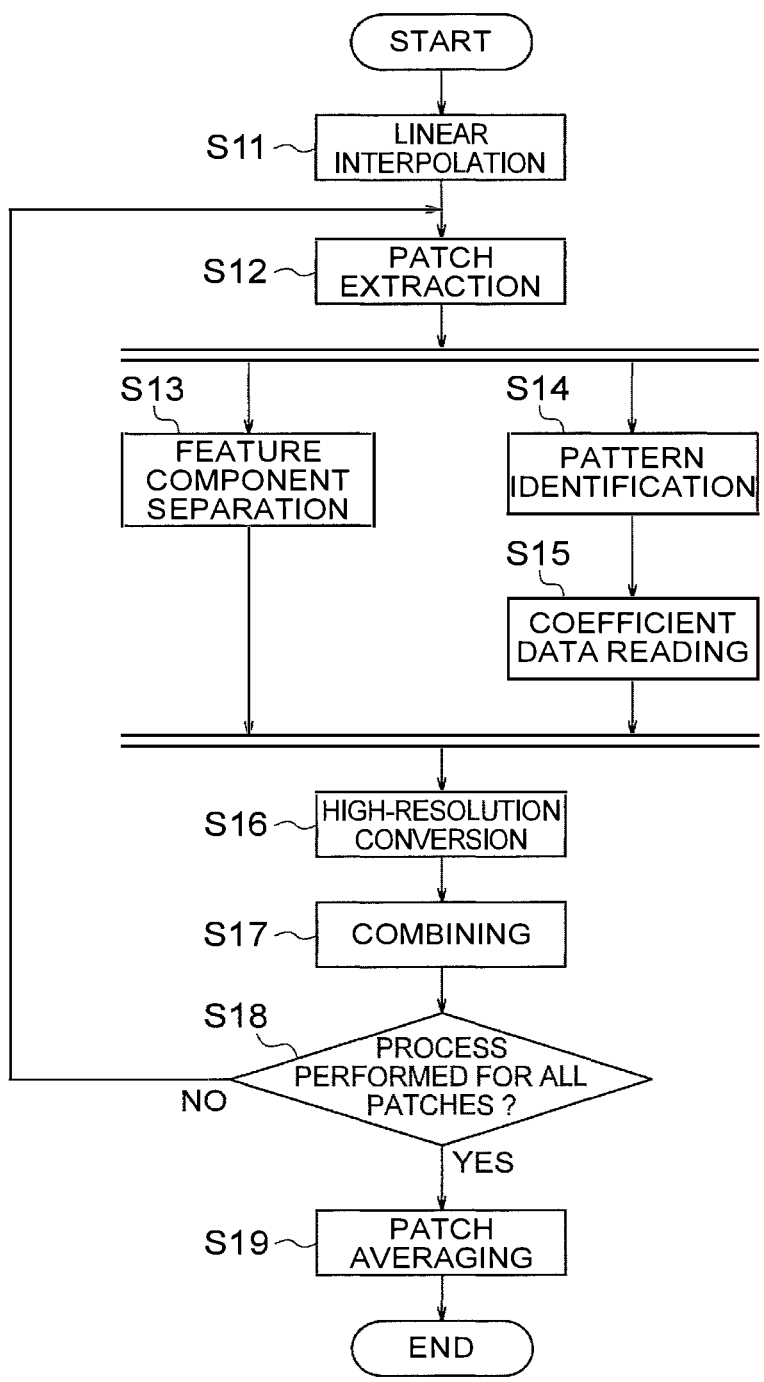
FIG. 16 is a flowchart showing the procedure in the image enlarging apparatus according to the first embodiment.

FIG. 16 shows the procedure of the processes in the image enlarging apparatus according to the first embodiment.

First, in a linear interpolation step S11, the linear interpolation unit 52 enlarges the input image Din to generate the interpolated image D52.

Next, in a patch extraction step S12, the feature component separating unit 62 in the high-resolution patch generating unit 54 selects and extracts one of the plurality of patches LPc each forming a part of the interpolated image D52.

The patches are selected, for example, in a raster order, for example, in the order from the top left to the bottom right (from the top to the bottom, and from the left to the right at the same height position).

Next, in steps S13 to S17, processes are performed on the selected patch.

In the professes (steps S13 to S17) for the selected patch, first, in a feature component separation step S13, the feature component separating unit 62 separates each interpolated image patch LPc into the feature component D62H of the low resolution and the non-feature component D62L.

In parallel with the process of the step S13, in a pattern identification step S14, the pattern identification unit 56 identifies the pattern by using the pixels in a local region APc in the input image Din corresponding to each patch, and generates the selection code D56.

Next, in a coefficient data reading step S15, the coefficient data reading unit 58 reads the coefficient data corresponding to the selection code generated in the step S14, from the coefficient data storage unit 57, and outputs the coefficient data thus read.

In a high-resolution conversion step S16, carried out after the step S13 and the step S15, the high-resolution conversion unit 64 performs computation on the feature component D62H of each patch in the interpolated image obtained in the step S13, by using the coefficient data D58 selected in the step S15, thereby to perform conversion from the feature component D62H of the low resolution to the feature component D64H of the high resolution.

Next, in the step S17, the feature component combining unit 66 combines the non-feature component D62L separated in the step S13 with the feature component D64H of the high resolution generated in the step S16, to generate the high-resolution patch.

Next, in a decision step S18, it is decided whether or not the processes of the steps S12 to S17 have been performed for all the patches in the image. This decision is performed for example by the feature component separating unit 62. If there remains any patch which has not been processed (NO in the step S18), the process of the step S12 is next performed. In this step, a next patch is selected.

If, in the step S18, processes for all the patches are found to have been completed, the process of a patch averaging step S19 is performed. In this step, the patch averaging unit 55 averages the pixel values in the high-resolution patches HPc obtained for each pixel in the high-resolution image D54 by the patch-by-patch processes, to determine the pixel value Dout(x, y) of each pixel in the output image Dout. A set of the pixel values Dout(x, y) thus determined forms the output image Dout.

Incidentally, it may be so arranged that the process of the step S19 for each pixel in the high-resolution image D54 is performed immediately after the processes of the steps S12 to S17 for the patches to which the above-mentioned each pixel belong have been completed, even when all the patches in the image have not been processed. In this case, the processes of the steps S12 to S17, and the process of the step S19 are performed in parallel.

Figure 17:
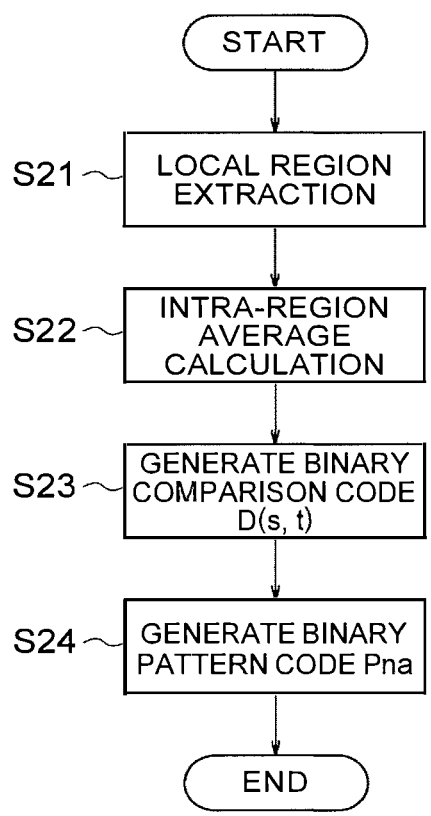
FIG. 17 is a flowchart showing details of the process in a pattern identification step in FIG. 16.

FIG. 17 shows details of the process of the pattern identification step S14 in FIG. 16.

As illustrated, first, in a local region extraction step S21, the local region extraction unit 71 extracts a local region. Here, a local region APc corresponding to the patch LPc selected from the interpolated image D52 in the step S12 is extracted, and the data of the extracted local region APc are obtained.

Next, in an intra-region average calculation step S22, the intra-region average calculation unit 72 calculates the average value AVE of the pixels in the extracted local region APc.

Next, in a comparison code generating step S23, the comparison code generating unit 73 determines, for each of the eight peripheral pixels, the binary comparison code D(s, t) by comparing the pixel value of the pixel with the average value AVE.

Next, in a selection code generating step S24, the selection code generating unit 74 combines the binary comparison codes D(s, t) for the eight peripheral pixels to generate the binary pattern code Pna, and outputs it as the selection code.

This completes a description of the operation of the image enlarging apparatus according to the first embodiment.

Next, a method of generating the coefficient data D57 will be explained. As was described before, the coefficient data D57 represent the relations of the pairs each consisting of the feature component D62H in the interpolated image generated from the training image, and the feature component D64H in the high-resolution image, and are stored in the coefficient data storage unit 57, after being obtained by learning in advance.

FIG. 18 shows an apparatus (coefficient data generating apparatus) used for generating the coefficient data.

Figure 19A:
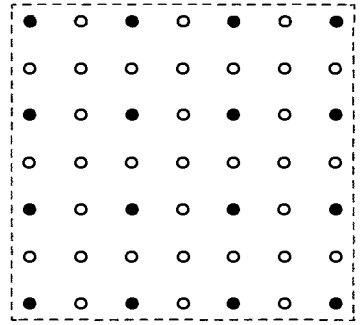
FIGS. 19(a) to (c) are diagrams showing a training image, a reduced image obtained by reducing the training image, and an interpolated image obtained by enlarging the reduced image by linear interpolation.
Figure 19B:
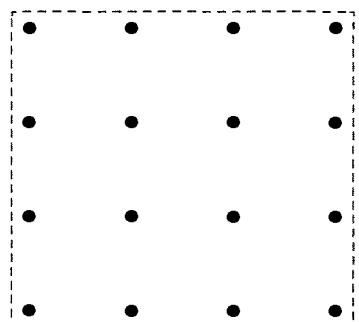
Figure 19C:
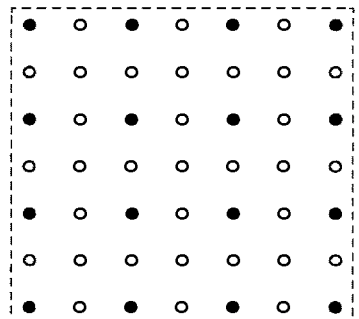

For the generation of the coefficient data, first, in an image reducing unit 101, a high-resolution image Dti (FIG. 19(*a*)) serving as a training image is reduced to generate a reduced image (low-resolution image) D101 (FIG. 19(*b*)). The resolution of the high-resolution image Dti is identical to that of the output image Dout, and the reduction factor in the image reduction by the image reducing unit 101 is identical to the enlargement factor of the linear interpolation unit 52. The reduction may be performed by down-sampling or by averaging. The pixels in the reduced image D101 in FIG. 19(*b*) are at the positions corresponding to the pixels indicated by black dots, among the pixels in the high-resolution image Dti in FIG. 19(*a*).

A linear interpolation unit 102 enlarges, by linear interpolation, the reduced image D101 (FIG. 19(*b*)) to generate a low-resolution enlarged image D102 (FIG. 19(*c*)). The process performed by the linear interpolation unit 102 is identical to the process performed by the linear interpolation unit in FIG. 4. Among the pixels in the low-resolution enlarged image D102 in FIG. 19(*c*), those indicated by black dots are pixels at positions corresponding to the pixels in the reduced image D101 shown in FIG. 19(*b*).

A feature component separating unit 103 extracts a plurality of patches from the low-resolution enlarged image D102, and extracts a feature component of each patch. That is, the feature component separating unit 103 selects a plurality of pixels, among the pixels (indicated by black dots in FIG. 19(*c*)) in the low-resolution enlarged image D102, at positions corresponding to the pixels in the reduced image D101, extracts patches LPc (similar to LPc in FIG. 7) each centered around each of the plurality of pixels having been selected and having the size of NL×NL pixels, determines, for each of the plurality of patches having been extracted, a mean value tlMean of the NL×NL pixels in the patch, subtracts the mean value tlMean from the respective pixel values of the pixels to obtain NL×NL difference values, uses the thus-obtained NL×NL difference values as feature quantities, and outputs a column vector obtained by arranging the thus-obtained feature quantities in a predefined order, as a feature component D103H. What is obtained by arranging the NL×NL feature quantities constituting the feature component D103H in the same way as the corresponding pixels is called a low-resolution patch.

The feature component separating unit 62 in FIG. 6 extracts a plurality of patches at regular intervals from the interpolated image D52 in such a manner that every pixel in the interpolated image D52 belongs to at least one patch. There is however no restriction with regard to the manner of extraction of patches by the feature component separating unit 103 in FIG. 18, and it is satisfactory if it extracts, as patches, different parts of the low-resolution enlarged image D102. For instance, the patches may be extracted in such a manner that all the pixels in the low-resolution enlarged image D102 corresponding to the pixels in the reduced image D101 are successively situated at the center of the extracted patch. Alternatively, the patches may be extracted in such a manner that the pixels randomly selected from among the pixels in the low-resolution enlarged image D102 corresponding to the pixels in the reduced image D101 are successively situated at the center of the extracted patch.

A feature component separating unit 104 extracts patches each centered around a pixel in the high-resolution image Dti, corresponding to the pixel at the center of the patch obtained by separating the feature component by the feature component separating unit 103, and extracts a feature component of the extracted patch. That is, the feature component separating unit 104 extracts a plurality of patches TPc (having the same size as LPc in FIG. 7), each consisting of NL×NL pixels, and centered around a pixel in the high-resolution image (training image) Dti, corresponding to the pixel at the center of each of the patches extracted by the feature component separating unit 103, determines, for each of the plurality of patches having been extracted, a mean value thMean of the NL×NL pixels in the extracted patch, subtracts the mean value thMean from the respective pixel values of the pixels to obtain NL×NL difference values, uses the thus-obtained NL×NL difference values as feature quantities, and outputs a column vector obtained by arranging the feature quantities in a predefined order, as a feature component D104H. What is obtained by arranging the NL×NL feature quantities constituting the feature component D104H in the same way as the corresponding pixels is called a high-resolution patch.

The pattern identification unit 105 performs pattern identification of the local region in the reduced image D101, corresponding to the patch obtained by separating the feature component by the feature component separating unit 103, and generates a code (pattern identification code) D105 indicating the result of the identification. The pattern identification code D105 corresponds to the selection code D56 in the image enlarging apparatus, so that it is called a selection code. The pattern identification by the pattern identification unit 105 is essentially identical to the process performed by the pattern identification unit 56 in FIG. 12.

The patches (low-resolution patch) obtained by separating the feature component by the feature component separating unit 103, and the patches (high-resolution patch) obtained by separating the feature component by the feature component separating unit 104 have the same size (NL×NL) as the patches from which the feature component is separated by the feature component separating unit 62.

A low-resolution patch which is centered around a pixel in the low-resolution enlarged image D102, corresponding to a certain pixel in the reduced image D101, and is obtained by separating a feature component by the feature component separating unit 103, and a high-resolution patch which is centered around a pixel in the training image Dti, corresponding to the same pixel in the reduced image D101, and is obtained by separating a feature component by the feature component separating unit 104, in combination form a pair (patch pair).

Furthermore, the selection code D105 obtained as a result of the pattern identification performed by the pattern identification unit 105 for the local region centered around the same pixel in the reduced image D102 is obtained as a selection code corresponding to the above-mentioned patch pair.

A classification unit 106 associates, with each other, the feature components D103H and D104H of the patches forming each pair, and classifies (groups) each pair according to the value of the corresponding pattern identification code D105.

A result of the classification, represented in the form of a table, is for example as shown in FIG. 20. In FIG. 20, the values of the selection code D56 (values of from 0 to 256) explained in connection with the pattern identification unit 56 are entered in advance in the column of the selection code D105.

Pair numbers (they are all indicated by "xx" but their values differ) corresponding to the selection code D105 are entered in the pair number column. For example, if, as a result of pattern identification on a local region corresponding to a patch forming a certain pair, a selection code D105 having a certain value is generated, then the number of the above-mentioned certain pair is entered in the column of the above-mentioned certain value. As the pair number, data representing the coordinates of the pixel at the center of the patch forming the pair may be used.

As a result of such grouping, the values of the selection code and the pair numbers corresponding thereto are stored in association with each other.

So far, the description assumed that a single training image Dti is supplied, and the pattern identification, and the formation and classification of the patch pairs are performed using the single training image. But a plurality of training images Dti may be supplied in turn, and the pattern identification, and the formation and classification of the patch pairs may be performed using the plurality of training images, and the results of the processes may be accumulated in the classification unit 106.

A computation unit 107 determines, by linear regression computation, the values of the coefficients for approximating the relation between the low-resolution patches and the high-resolution patches for each group having the selection code D105 of the same value. The computation is represented by the following equation (8).

[Mathematical Expression 8]

$$Ms = (X_t^T \cdot X_t + \lambda \cdot eye(NL \times NL, NL \times NL))^{-1} \cdot X_t^T \cdot Y_t \quad (8)$$

Figure 21:
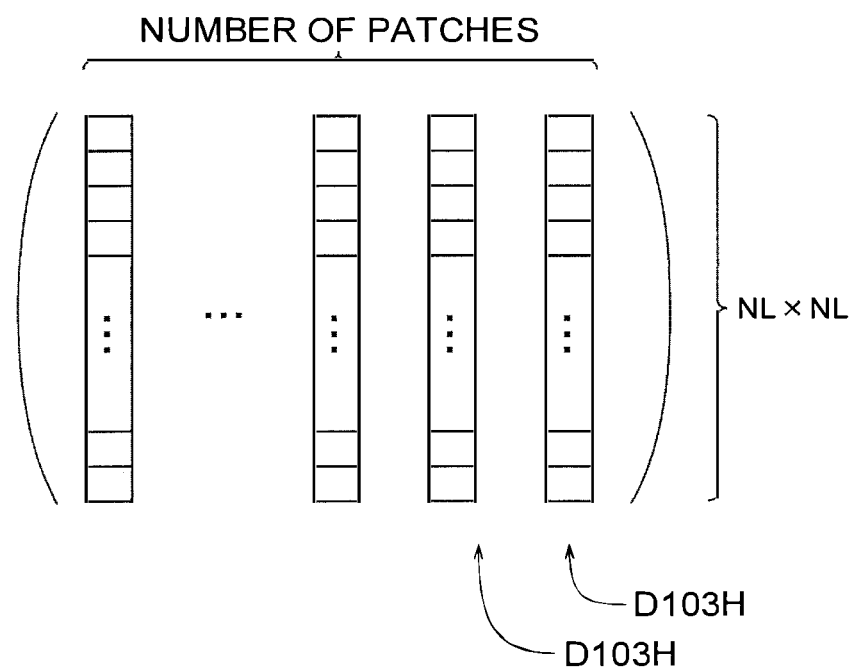
FIG. 21 is a diagram showing a matrix of coefficients of which the number of rows equals NL×NL and the number of columns equals the number of patches in a group.
Figure 22:
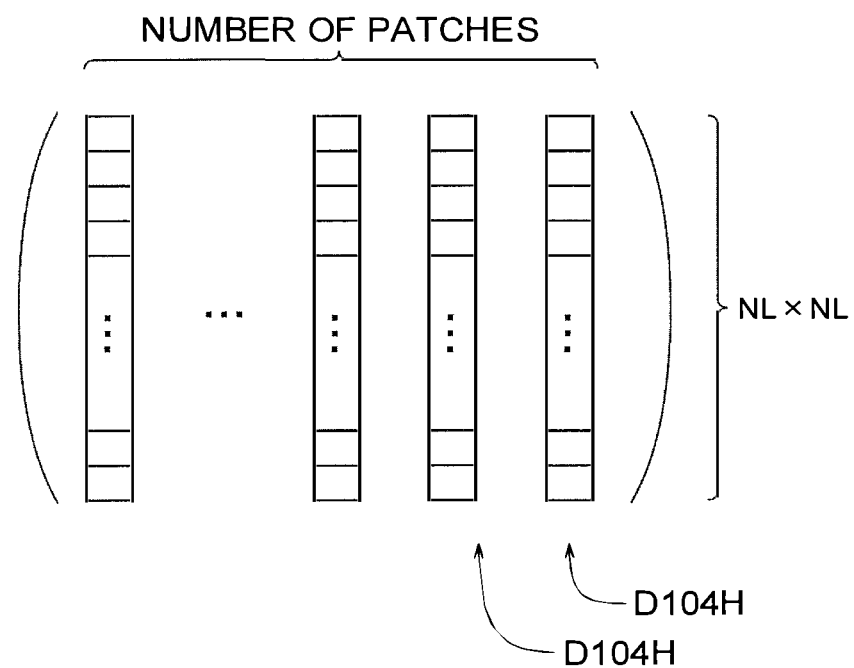
FIG. 22 is a diagram showing a matrix of coefficients of which the number of rows equals NH×NH and the number of columns equals the number of patches in the group.

In the equation (8),

Ms represents a matrix (coefficient matrix) consisting of elements (coefficients) in NL×NL rows and NL×NL columns, corresponding to the selection code of the group;

Xt represents a matrix in which the NL×NL feature quantities, namely the difference values constituting the feature component D103H of a low-resolution patch forming a pair having been classified in the group are arranged in the column direction, and the feature components D103H pertaining to different patches are arranged in the row direction (disposed in different columns), as shown in FIG. 21;

Yt represents a matrix in which the NL×NL feature quantities, namely the difference values constituting the feature component D104H of a high-resolution patch forming a pair having been classified in the group are arranged in the column direction, and the feature components D104H pertaining to different patches are arranged in the row direction (disposed in different columns), as shown in FIG. 22;

λ represents a predetermined constant; and eye(NL×NL,NL×NL) represents an identity matrix having NL×NL rows and NL×NL columns.

Also, $Xt^T$, $Yt^T$ respectively represent transposed matrixes of Xt, Yt.

If the number of patches in each group is less than (NL×NL), an identity matrix is output as Ms.

From the matrix Ms having NL×NL rows and NL×NL columns obtained in the manner described above, a coefficient data extraction unit 108 takes the elements corresponding to NH×NH pixels constituting a high-resolution patch HPc (the elements used for the calculation of the feature component D64H of the NH×NH pixels), to extract a matrix M having NH×NH rows and NL×NL columns. The coefficient data extraction unit 108 causes the data representing the extracted matrix M to be stored as the coefficient data D57 in the coefficient data storage unit 57.

Figure 24:
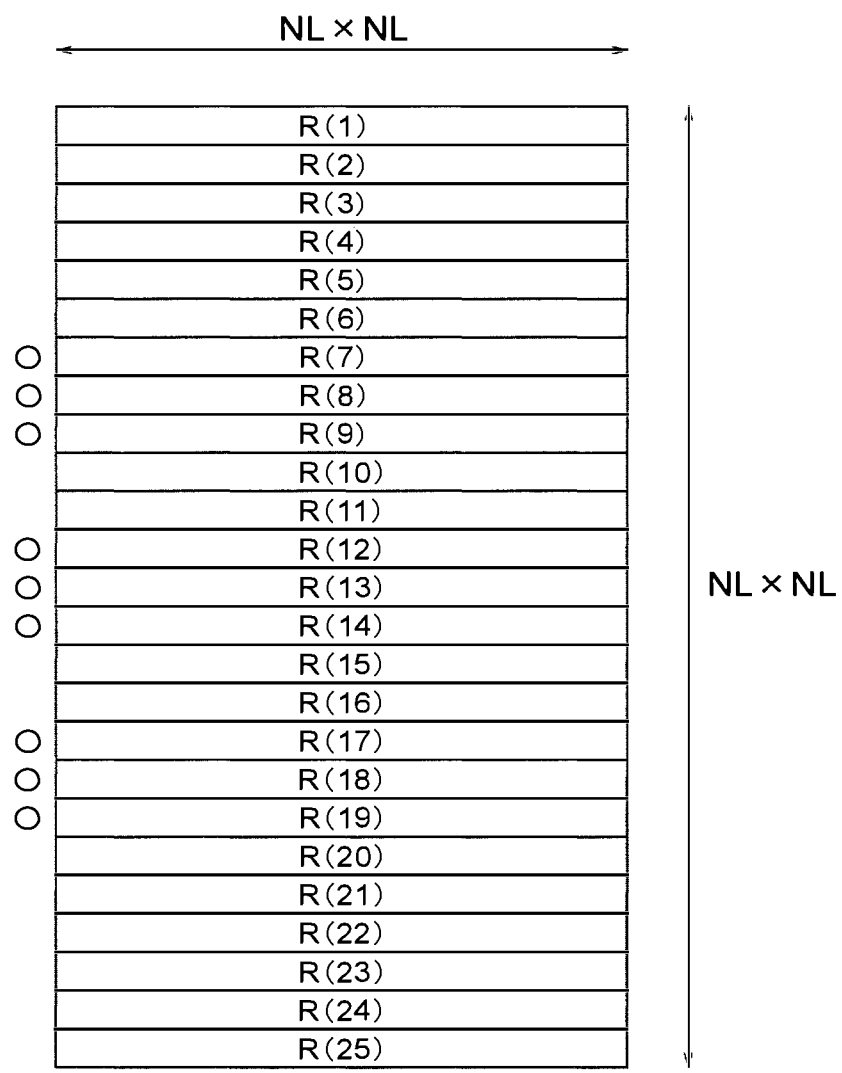
FIG. 24 is a diagram showing coefficients used for the calculation of NH×NH pixels, in a matrix Ms of coefficients having NL×NL rows and NL×NL columns obtained by regression computation.

For the case of NL=5, NH=3, as shown in FIG. 23, the NH×NH rows (9 rows) extracted from the matrix Ms having NL×NL rows and NL×NL columns (25 rows and 25 columns), for the generation of the matrix M having NH×NH rows and NL×NL columns (9 rows and 25 columns) are shown in FIG. 24. In FIG. 23, the pixels in the patch consisting of NL×NL pixels are indicated by reference characters P(1) to P(25). Of the reference characters P(1) to P(25), the numerals in the parentheses are the numbers assigned to the pixels. NH×NH pixels constituting a high-resolution patch HPc within the patch LPc consisting of NL×NL pixels shown in FIG. 23, are pixels within the part surrounded by a bold line HPc, and correspond to the NH×NH pixels Q(1) to Q(9) in FIG. 10.

In FIG. 24, the numerals in the parentheses in the reference characters R(1) to R(25) indicating the rows represent the row numbers. The rows R(1) to R(25) in FIG. 24 respectively correspond to the pixels P(1) to (25), and include 25 (=NL×NL) coefficients. In FIG. 24, the rows that are extracted are marked with a circle at the left end. The extracted rows consist of the coefficients used for the calculation of the NH×NH pixels Q(1) to Q(9) shown in FIG. 10, namely, the rows R(7), R(8), R(9), R(12), R(13), R(14), R(17), R(18), and R(19) corresponding to the pixels P(7), P(8), P(9), P(12), P(13), P(14), P(17), P(18), and P(19) in the region surrounded by the bold line HPc, among the NL×NL pixels, shown in FIG. 23.

By the above process, a coefficient data corresponding to one value of the selection code is generated and stored in the coefficient data storage unit 57.

The above process is performed for each of the 256 values of the selection code, and the coefficient data D57 corresponding to each of the 256 values of the selection code is stored in the coefficient data storage unit 57.

The above-described method of generating the coefficient data relates to a case where the conversion by the high-resolution conversion unit 64 is linear. For the case of non-linear conversion, it is possible to calculate the coefficient data using a known optimization method.

This completes a description of the method of generating the coefficient data.

In the pattern identification unit shown in FIG. 12, the comparison code generating unit 73 uses the average value AVE calculated by the intra-region average calculation unit 72 for the comparison with the pixel values of the peripheral pixels. However, the pixel value IN(0, 0) of the central pixel in the local region may be used for the comparison with the pixel values of the peripheral pixels. In summary, it is satisfactory if the comparison code generating unit 73 performs comparison of the pixel values of the peripheral pixel by using the average value or the pixel value IN(0, 0) of the central pixel as a reference value.

Incidentally, the pixel value of the central pixel may be seen as a value obtained by the calculation of a weighted average in which the weights on the peripheral pixels are zero, and the pixel value IN(0, 0) of the central pixel itself is taken as the average value AVE.

As has been described, in the first embodiment, magnitude comparison is performed between the reference value obtained from each local region in the input image and the pheripheral pixels in the same local region, and the binary comparison codes D(s, t) obtained as the results of the comparison are combined to generate the binary pattern code Pna, and the binary pattern code Pna is used as the selection code to read the coefficient data. There are "8th power of 2"=256 combinations of the binary comparison codes pertaining to the eight peripheral pixels, so that the binary pattern code Pna represents one of 256 values. The coefficient data storage unit 57 stores 256 coefficient data (each including data of one set of coefficients), and outputs, responsive to the binary pattern code Pna, the corresponding coefficient data. In this way, the number of coefficient data which need to be stored in the coefficient data storage unit 57 can be restrained to 256. Accordingly, the storage capacity of the coefficient data storage unit 57 can be reduced, and the circuit size can be reduced. When the coefficient data storage unit 57 is configured as an integrated circuit, the chip size can be reduced because of the reduction in the storage capacity and the circuit size. Power consumption can be reduced by the reduction in the chup size.

Second Embodiment

The first embodiment described above is associated with a problem explained below. That is, the average value or the pixel value of the central pixel in each local region is used as a reference value for the comparison with the pixel values of the peripheral pixels, and the results of the comparison are represented by the binary comparison codes D(s, t), and the binary pattern code Pna obtained by combining the binary comparison codes is used as the selection code D56 to read the coefficient data. Even when the pixel values of the peripheral pixels are close to the reference value, a decision as to whether or not they are larger than the reference value is made, and the binary pattern code is generated based on the result of the decisions, and the generated binary pattern code is used for the selection of the coefficient data. Accordingly, when the pixel values of the peripheral pixels are close to the reference value (average value or the pixel value of the central pixel), the coefficient data which is not necessarily appropriate may be used, causing degradation in the quality of the output image.

In the second embodiment, the results of the comparison between the reference value obtained from each local region, and the pixel values of the peripheral pixels are represented by ternary comparison codes, and a ternary pattern code obtained by combining the ternary comparison codes is used for the selection of the coefficient data.

The ternary comparison code assumes one of three values depending on whether the pixel value of the peripheral pixel is about the same as the reference value (the difference from the reference value is small); is not about the same as the reference value and is larger than the reference value; or is not about the same as the reference value and is smaller than the reference value.

If the size of the local region is 3×3 pixels as in the first embodiment, there are eight peripheral pixels in each local region, and since a ternary comparison code is generated for each of the peripheral pixels, there are "8th power of 3"=6561 combinations of the ternary comparison codes.

The coefficient data storage unit stores this number of coefficient data. By doing so, the degradation in the high-resolution image can be restrained in comparison with the first embodiment.

Figure 25:
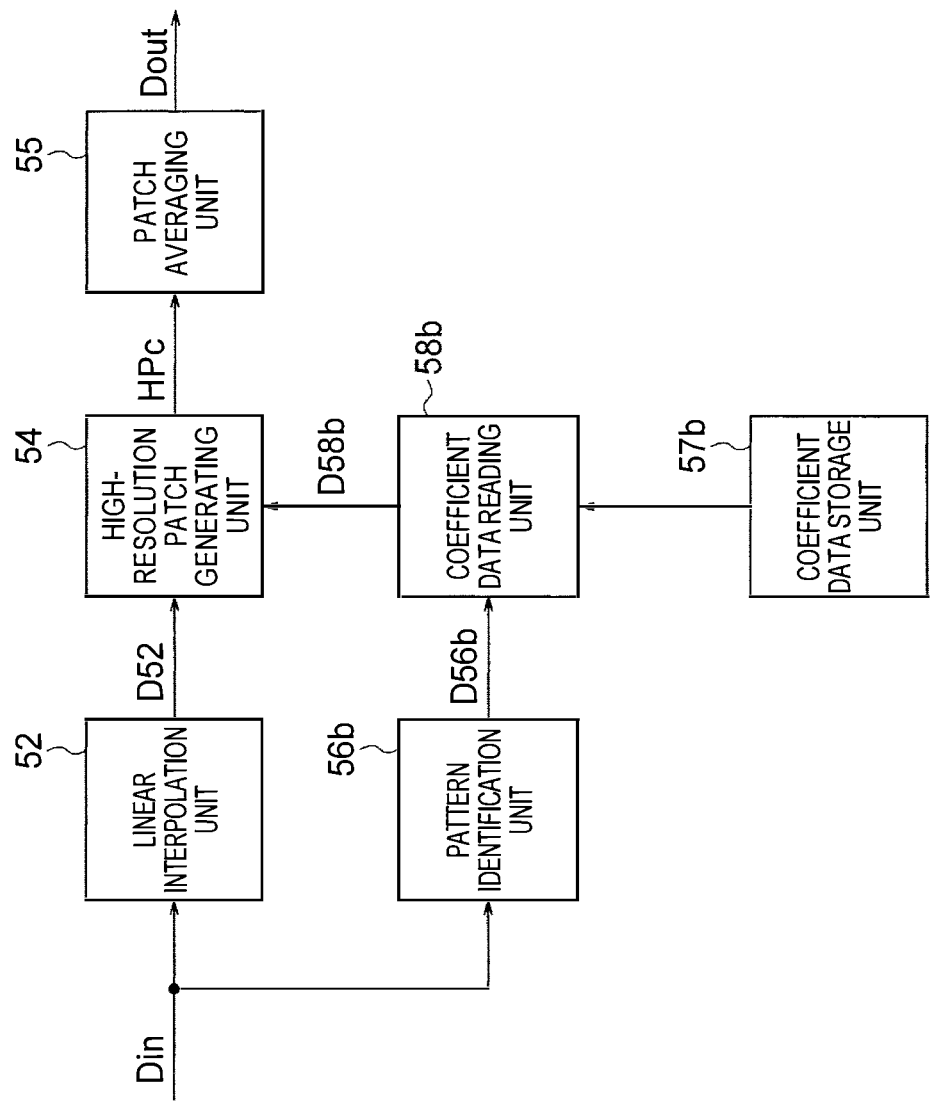
FIG. 25 is a block diagram showing a configuration of an image enlarging apparatus of the second embodiment of the present invention.

FIG. 25 shows an image enlarging apparatus 50b of the second embodiment. The illustrated image enlarging apparatus 50b can be used in place of the image enlarging apparatus 50 of the first embodiment, and includes a linear interpolation unit 52, a high-resolution patch generating unit 54, a pattern identification unit 56b, a coefficient data storage unit 57b, a coefficient data reading unit 58b, and a patch averaging unit 55.

The linear interpolation unit 52, the high-resolution patch generating unit 54, and the patch averaging unit 55 are identical to those in the first embodiment.

Figure 26:
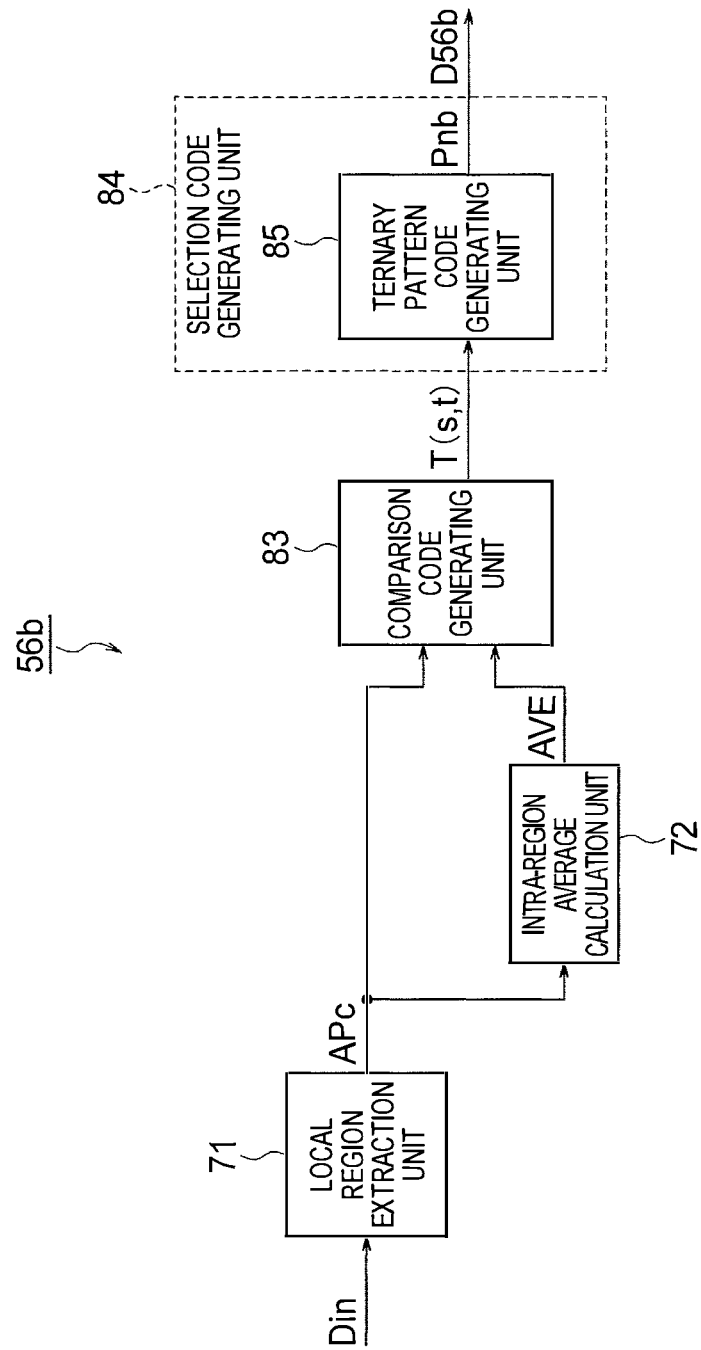
FIG. 26 is a block diagram showing a configuration of a pattern identification unit used in the image enlarging apparatus of the second embodiment.

As shown in FIG. 26, the pattern identification unit 56b includes a local region extraction unit 71, an intra-region average calculation unit 72, a comparison code generating unit 83, and a selection code generating unit 84.

In the illustrated example, the selection code generating unit 84 is formed of a ternary pattern code generating unit 85.

The local region extraction unit 71, and the intra-region average calculation unit 72 are identical to those described with reference to FIG. 12 in connection with the first embodiment.

The comparison code generating unit 83 compares the magnitudes the pixel values IN(s, t) of the peripheral pixels in each local region output from the local region extraction unit 71, with the magnitude of the average value AVE of the pixel values of the pixels in the same local region output from the intra-region average calculation unit 72, and outputs ternary comparison codes T(s, t) indicating the results of the comparison pertaining to the respective peripheral pixels.

Each comparison code T(s, t) is represented by two bits.

For instance, when the pixel value IN(s, t) is smaller than the average value AVE, and the absolute value of the difference from the average value AVE is not smaller than a threshold value α, then the comparison code T(s, t) is set to "00b"; when the pixel value IN(s, t) is larger than the average value AVE, and the absolute value of the difference from the average value AVE is not smaller than the threshold value α, then the comparison code T(s, t) is set to "10b"; and when the absolute value of the difference between the pixel value IN(s, t) and the average value AVE is smaller than the threshold value α, then the comparison code T(s, t) is set to "01b".

The above process of generating the comparison code T(s, t) is represented by the following mathematical expression (9).

[Mathematical Expression 9]

$$T(s, t) = \begin{cases} 00b & \text{when} \quad AVE - IN(s, t) \geq \alpha \\ 10b & \text{when} \quad IN(s, t) - AVE \geq \alpha \\ 01b & \text{when} \quad |IN(s, t) - AVE| < \alpha \end{cases} \quad (9)$$

"00b", "10b", and "01b" respectively correspond to decimal numbers "0", "2" and "1".

The allocation of the comparison code is not limited to that of the above example, and "11b" may be used as a comparison code. The allocation of the code "0b" and "1b" may be opposite to that described above. In summary, it is satisfactory if the comparison code generating unit 83 outputs a first value, a second value or a third value depending on the result of the decision.

The ternary pattern code generating unit 85 links the comparison codes T(s, t) pertaining to the eight peripheral pixels generated by the comparison code generating unit 83 for each local region, to generate a ternary pattern code Pnb. The ternary pattern code Pnb generated in this way is a sequence of numbers obtained by arranging and linking the comparison codes T(s, t) in a predefined order depending on the positions of the corresponding pixels.

The order of input of the pixel values IN(s, t) of the nine pixels in each local region to the comparison code generating unit 83 is identical to that described with reference to FIGS. 14(a) and (b) in connection with the first embodiment.

FIGS. 27(a) to (c) show an example of the comparison by the comparison code generating unit 83 and the generation of the ternary pattern code Pnb by the ternary pattern code generating unit 85, performed for a local region.

The comparison code generating unit 83 compares the pixel values IN(s, t) of the eight peripheral pixels shown in FIG. 27(a) with the average value AVE, and successively generates and outputs the ternary comparison codes T(s, t), namely, T(−1, −1), T(−1, 0), T(−1, 1), T(0, −1), T(0, 1), T(1, −1), T(1, 0), and T(1, 1) shown in FIG. 27(b).

The order of the output of the ternary comparison codes T(s, t) from the comparison code generating unit 83 is as indicated by an arrow-headed line ARc in FIG. 27(b).

The ternary pattern code generating unit 85 successively arranges and links the two-bit comparison codes T(s,t) output from the comparison code generating unit 83 in the order indicated in FIG. 27(b), to generate the ternary pattern code Pnb of 16 bits shown in FIG. 27(c). That is, by allocating the comparison code T(−1, −1) for the pixel at coordinates (s, t)=(−1, −1) to a first and second bits, by allocating the comparison code T(−1, 0) for the pixel at coordinates (s, t)=(−1, 0) to a third and fourth bits, and thereafter successively selecting the two-bit comparison codes T(s, t) counterclockwise as indicated by the arrow-headed line ARc in FIG. 27(b) and arranging them (allocating to the respective bit positions), the ternary pattern code Pnb of 16 bits, shown in FIG. 27(c) is generated. The generation of the ternary pattern code Pnb is represented by the following equation (10).

[Mathematical Expression 10]

$$Pnb = T(-1, -1) \cdot 2^0 + T(-1, 0) \cdot 2^2 + T(-1, 1) \cdot 2^4 + T(0, 1) \cdot 2^6 + T(1, 1) \cdot 2^8 + T(1, 0) \cdot 2^{10} + T(1, -1) \cdot 2^{12} + T(0, -1) \cdot 2^{14} \quad (10)$$

When the pixel values of the 3×3 pixels in the extracted local region are as shown in FIG. 27(a), the ternary pattern code Pnb determined by the equation (10) will be one corresponding to a decimal number "17926", as shown in FIG. 27(c).

The ternary pattern code Pnb generated in this way is output as a selection code D56b.

The coefficient data storage unit 57b stores coefficient data respectively corresponding to all the values which can be assumed by the ternary pattern code Pnb (and hence the selection code D56b).

When the ternary pattern code Pnb consists of a combination of the ternary comparison codes T(s, t) pertaining to eight pixels, as in the above example, the number of the values which can be assumed by the ternary pattern code Pnb, hence by the selection code D56b is 6561. In this case, 6561 coefficient data are stored in the coefficient data storage unit 57b.

The coefficient data reading unit 58b reads, among the 6561 coefficient data stored in the coefficient data storage unit 57b, the coefficient data corresponding to the ternary pattern code Pnb (selection code D56b), and outputs it as the selected coefficient data.

As in the first embodiment, the high-resolution patch generating unit 54 generates, for each patch LPc in the interpolated image D52, a high-resolution patch HPc by using the coefficient data D58b read by the coefficient data reading unit 58b.

As in the first embodiment, the patch averaging unit 55 averages, for each pixel in the high-resolution image D54, the pixel values in a plurality of high-resolution patches HPc to determine the pixel value Dout(x, y) in the output image Dout.

On the whole, the operation of the second embodiment is identical to that described with reference to FIG. 16 in connection with the first embodiment. However, as the step S14 in FIG. 16, the process shown in FIG. 28 is performed in place of the process shown in FIG. 17.

Figure 28:
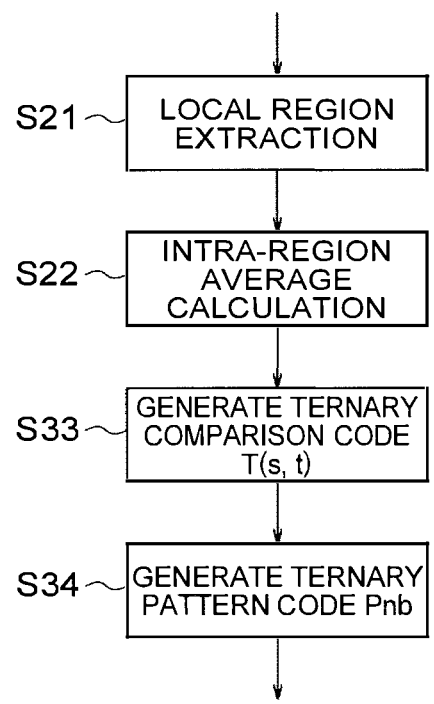
FIG. 28 is a flowchart showing details of the process in the pattern identification step in FIG. 16, in the second embodiment.

The steps S21 and S22 in FIG. 28 are identical to those in FIG. 17.

In a comparison code generating step S33, the comparison code generating unit 83 determines, for each of the eight peripheral pixels, a ternary comparison code T(s, t) by comparison between the pixel value of the pixel and the average value AVE.

In a selection code generating step S34, the selection code generating unit 84 combines the ternary comparison codes T(s, t) pertaining to the eight peripheral pixels to generate the ternary pattern code Pnb, and outputs it as the selection code D56b.

For the generation of the coefficient data stored in the coefficient data storage unit 57b, an apparatus similar to that shown in FIG. 18 can be used. However, as the pattern identification unit 105, one similar to the pattern identification unit 56b in FIG. 26, in place of the one similar to the pattern identification unit 56 in FIG. 12, needs to be used.

As has been described, in the second embodiment, magnitude comparison is performed between the reference value obtained from each local region in the input image and the peripheral pixels in the same local region, and the ternary comparison codes T(s, t) obtained as the results of the comparison are combined to generate the ternary pattern code Pnb, and the ternary pattern code Pnb is used as the selection code to read the coefficient data. In comparison with the case where the binary pattern code Pna is used as explained in connection with the first embodiment, the features of the image can be classified more finely, and it is possible to obtain an enlarged image with a higher sense of sharpness.

Third Embodiment

The second embodiment described above is associated with a problem explained below. That is, the number of the coefficient data is as large as 6561, and the coefficient data storage unit 57b of a large capacity is required.

The third embodiment is to solve this problem, and the coefficient data storage unit stores coefficient data corresponding to the binary pattern codes, and coefficient data corresponding to those ternary pattern codes which are generated when no high-frequency component is contained in the local region, and the binary pattern code is used as the selection code when a high-frequency component is contained in the local region, and the ternary pattern code is used as the selection code when a high-frequency component is not contained in the local region.

Spatial high-frequency components in the image are, in many cases, due to noise, or due to fine patterns of a lawn, sandstorm or the like, and do not cause uncomfortable feeling even if they are not faithfully reproduced in the enlargement of the image. Based on this observation, the third embodiment uses the binary pattern code for the local region containing a high-frequency component. By this scheme, the capacity of the coefficient data storage unit can be reduced in comparison with the second embodiment, and yet the degradation in the picture quality in the enlarged image can be restrained.

Figure 29:
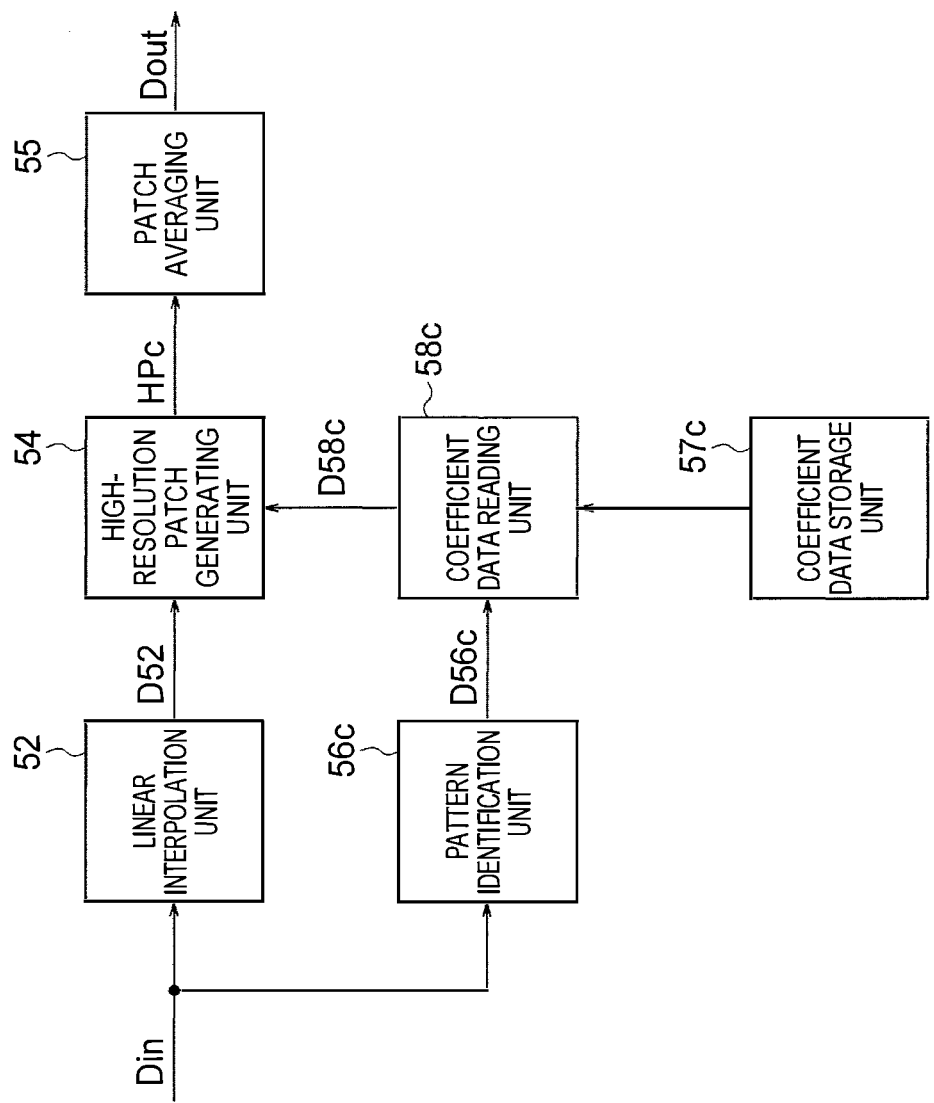
FIG. 29 is a block diagram showing a configuration of an image enlarging apparatus of the third embodiment of the present invention.

FIG. 29 shows an image enlarging apparatus of the third embodiment. The illustrated image enlarging apparatus 50c can be used in place of the image enlarging apparatus 50 of the first embodiment, and includes a linear interpolation unit 52, a high-resolution patch generating unit 54, a pattern identification unit 56c, a coefficient data storage unit 57c, a coefficient data reading unit 58c, and a patch averaging unit 55.

The linear interpolation unit 52, the high-resolution patch generating unit 54, and the patch averaging unit 55 are identical to those in the first embodiment.

Figure 30:
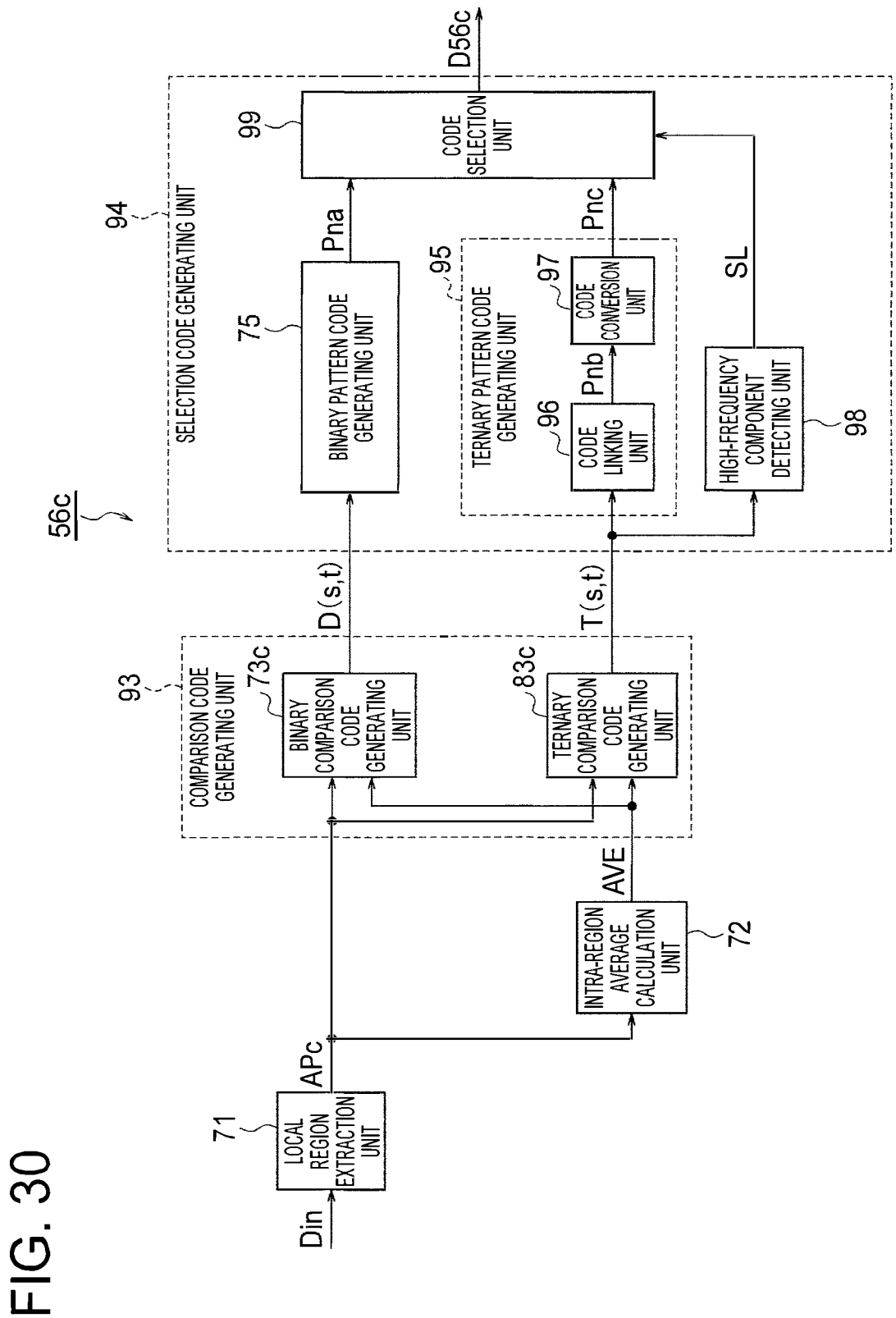
FIG. 30 is a block diagram showing a configuration of a pattern identification unit used in the image enlarging apparatus of the third embodiment.

As shown in FIG. 30, the pattern identification unit 56c includes a local region extraction unit 71, an intra-region average calculation unit 72, a comparison code generating unit 93, and a selection code generating unit 94. The selection code generating unit 94 includes a binary pattern code generating unit 75, a ternary pattern code generating unit 95, a high-frequency component detecting unit 98 and a code selection unit 99.

The ternary pattern code generating unit 95 includes a code linking unit 96, and a code conversion unit 97.

The binary pattern code generating unit 75 is identical to the binary pattern code generating unit 75 in the first embodiment.

The local region extraction unit 71, and the intra-region average calculation unit 72 are identical to those described with reference to FIG. 12 in connection with the first embodiment.

The comparison code generating unit 93 compares the magnitudes of the pixel values IN(s, t) of the eight peripheral pixels in each local region output from the local region extraction unit 71, with the magnitude of the average value AVE of the pixel values of the pixels in the same local region output from the intra-region average calculation unit 72, and outputs binary comparison codes D(s, t) and ternary comparison codes T(s, t) indicating the results of the comparison pertaining to the respective peripheral pixels.

To implement such a process, the comparison code generating unit 93 includes a binary comparison code generating unit 73c and a ternary comparison code generating unit 83c. The comparison code generating units 73c and 83c respectively perform the same processes as the comparison code generating unit 73 in FIG. 12, and the comparison code generating unit 83 in FIG. 26.

That is, like the comparison code generating unit 73 in the first embodiment, the comparison code generating unit 73c compares the magnitudes of the pixel values IN(s, t) of the peripheral pixels in each local region output from the local region extraction unit 71 with the magnitude of the average value AVE of the pixel values of the pixels in the same local region, output from the intra-region average calculation unit 72, and outputs binary comparison codes D(s, t) indicating the results of the comparison pertaining to the respective pixels.

For instance, when the pixel value IN(s, t) is smaller than the average value AVE, the comparison code D(s, t) is set to "0b" and output; when the pixel value IN(s, t) is not smaller than the average value AVE, the comparison code D(s, t) is set to "1b" and output.

The above process of generating the comparison code D(s, t) is represented by the above equation (6).

In the above example, when the pixel value IN(s, t) is equal to the average value AVE, the comparison code D(s, t) is set to "0b". The comparison code D(s, t) in this case may alternatively be set to "1b". In summary, it is satisfactory if the comparison code generating unit 73 performs one of a decision as to whether the pixel value IN(s, t) is not smaller than the average value AVE, and a decision as to whether the pixel value IN(s, t) is not larger than the average value AVE.

The allocation of the codes "0b" and "1b" may be opposite to that described above. In summary, it is satisfactory if the comparison code generating unit 73 outputs a first value or a second value depending on the result of the decision.

Like the comparison code generating unit 83 in the second embodiment, the comparison code generating unit 83c compares the magnitudes of the pixel values IN(s, t) of the peripheral pixels in each local region output from the local region extraction unit 71, with the average value AVE of the pixel values of the pixels in the same local region, output from the intra-region average calculation unit 72, and outputs ternary comparison codes T(s, t) indicating the results of the comparison pertaining to the respective peripheral pixels.

Each comparison code T(s, t) is represented by two bits.

For instance, when the pixel value IN(s, t) is smaller than the average value AVE and the absolute value of the difference from the average value AVE is not smaller than the threshold value $\alpha$, then the comparison code T(s, t) is set to "00b"; when the pixel value IN(s, t) is larger than the average value AVE and the absolute value of the difference from the average value AVE is not smaller than the threshold value $\alpha$, then the comparison code T(s, t) is set to "10b"; and when the absolute value of the difference between the pixel value IN(s, t) and the average value AVE is smaller than the threshold value $\alpha$, then the comparison code T(s, t) is set to "01b".

The above process of generating the comparison code T(s, t) is represented by the above mathematical expression (9).

The allocation of the comparison code is not limited to that of the above example, and "11b" may be used as the comparison code. The allocation of the code "0b" and "1b" may be opposite to that described above. In summary, it is satisfactory if the comparison code generating unit 83c outputs a first value, a second value or a third value depending on the result of the decision.

As in the first embodiment, the binary pattern code generating unit 75 links the comparison codes D(s, t) pertaining to the eight peripheral pixels generated for each local region by the comparison code generating unit 73c, to generate the binary pattern code Pna.

Like the ternary pattern code generating unit 85 in the second embodiment, the code linking unit 96 links the comparison codes T(s, t) for the eight peripheral pixels generated by the comparison code generating unit 83c for each local region, to generate a linked code Pnb.

The code conversion unit 97 converts the linked code Pnb output from the code linking unit 96 into a code with a smaller range of assumable values (a code which can be expressed by a smaller number of bits), and outputs the generated code as a ternary pattern code Pnc. The output of the code conversion unit 97 is the output of the ternary pattern code generating unit 95.

The high-frequency component detecting unit 98 decides, based on the results of the comparison by the comparison code generating unit 83c for the pixels in each local region, whether the local region contains a high-frequency component, that is, whether the local region contains a component having a spatial frequency which is not lower than a predetermined spatial frequency, and outputs a signal SL indicating the result of the decision. This signal SL assumes a first value, e.g., "1" when a high-frequency component is contained, and assumes a second value, e.g., "0" when no high-frequency component is contained.

For instance, the high-frequency component detecting unit 98 compares the pixel values of the plurality of pixels belonging to each of a plurality of groups, each consisting of pixels arranged in the row direction or in the column direction in each local region, by using the ternary comparison codes pertaining to the respective pixels, and finds that a high-frequency component is contained in the local region if, with regard to any of the plurality of groups, the pixel value of the pixel positioned at the midpoint of the group takes a local maximum value or a local minimum value. In this case, with respect to the pixel positioned at the center of the local region, it is assumed that the absolute value of the difference of the pixel value from the reference value is smaller than the threshold value α, and a ternary comparison code for such a situation is generated.

"Comparing the pixel values of the pixels by using the ternary comparison codes" means performing comparison among classes to which the pixel values belong, after identifying the classes from the ternary comparison codes, based on whether the ternary comparison code T(s, t) indicates:

that the pixel value is smaller than the reference value AVE and the absolute value of its difference from the average value AVE is not smaller than the threshold value α, so that the pixel value belongs to the range (class) of the smallest values;

that the pixel value is larger than the reference value AVE and the absolute value of its difference from the average value AVE is not smaller than the threshold value α, so that the pixel value belongs to the range (class) of the largest values; or that the absolute value of the difference between the pixel value and the average value AVE is smaller than the threshold value α, so that the pixel value belongs to the intermediate range (class).

When it is so arranged that the ternary comparison code T(s, t) for the pixel whose pixel value belongs to the class of the smallest values assumes a first value, the ternary comparison code T(s, t) for the pixel whose pixel value belongs to the intermediate class assumes a second value, and the ternary comparison code T(s, t) for the pixel whose pixel value belongs to the class of the largest values assumes a third value, and the second value (01b) is larger than the first value (00b), and the third value (10b) is larger than the second value, as in the example described above, then it is possible to perform the "comparison among the pixel values using the ternary comparison codes", and hence the decision as to whether the pixel value of the pixel positioned at the midpoint takes either of a local maximum value and a local minimum value, by magnitude comparison among the values of the ternary comparison codes T(s, t) pertaining to the pixels belonging to each group.

Also in a case opposite to that described above, that is, when the second value is smaller than the first value, and the third value is smaller than the second value, it is also possible to perform the "comparison among the pixel values using the ternary comparison codes", and hence the decision as to whether the pixel value of the pixel positioned at the midpoint takes either of a local maximum value and a local minimum value by magnitude comparison among the values of the ternary comparison codes T(s, t) pertaining to the pixels belonging to each group.

In summary, if the values of the ternary comparison codes T(s, t) generated according to the classes to which the pixel values belong are progressively increased in the order of magnitude (order of largeness or order of smallness) of the pixel values belonging to the respective classes, it is possible to perform the "comparison among the pixel values using the ternary comparison codes", and hence the decision as to whether the pixel value of the pixel positioned at the midpoint takes either of a local maximum value and a local minimum value, by magnitude comparison among the values of the ternary comparison codes T(s, t) pertaining to the pixels belonging to each group.

The code selecting unit 99 selects either of the binary pattern code Pna output from the binary pattern code generating unit 75 and the ternary pattern code Pnc output from the ternary pattern code generating unit 95, and outputs the selected code as a selection code D56*c*.

The selection at the code selecting unit 99 is made depending on the selection signal SL output from the high-frequency component detecting unit 98. That is, when the value of the signal SL is "1", the binary pattern code Pna output from the binary pattern code generating unit 75 is selected, while when the value of the signal SL is "0", the ternary pattern code Pnc output from the ternary pattern code generating unit 95 is selected.

The order of input of the data indicating the pixel values of the pixels in each local region to the comparison code generating unit 93 is the same as that described with reference to FIGS. 14(*a*) and (*b*) in connection with the first embodiment. The comparison by the comparison code generating unit 73*c*, and the generation of the binary pattern code Pna by the binary pattern code generating unit 75 are performed in the same manner as that described with reference to FIGS. 15(*a*) to (*c*) in connection with the first embodiment. This process is represented by the above equation (7).

FIGS. 31(*a*) to (*d*) show an example of the comparison by the comparison code generating unit 83*c*, and the generation of the ternary pattern code Pnc, performed for a local region.

The comparison code generating unit 83*c* compares the pixel values IN(s, t) of the eight peripheral pixels in each local region shown in FIG. 31(*a*) output from the local region extraction unit 71, with the average value AVE of the same local region output from the intra-region average calculating unit 72, and generates the ternary comparison codes T(s, t) pertaining to the peripheral pixels, namely, T(−1, −1), T(−1, 0), T(−1, 1), T(0, −1), T(0, 1), T(1, −1), T(1, 0), and T(1, 1) shown in FIG. 31(*b*).

Next, the code linking unit 96 in the ternary pattern code generating unit 95 arranges and links the ternary comparison codes T(s, t) pertaining to the eight peripheral pixels in the order indicated by an arrow-headed line ARd, to generate the linked code Pnb of 16 bits, shown in FIG. 31(*c*). This process is represented by the above equation (10).

Next, the code conversion unit 97 in the ternary pattern code generating unit 95 converts the linked code Pnb into the code of a smaller range of assumable values shown in FIG. 31(*d*). The converted code is output as the ternary pattern code Pnc.

As will be understood from the following explanation, the comparison code generating unit 83*c* does not necessarily perform the generation of the comparison codes T(s, t) for all of the eight pixels. If a high frequency component is found to be contained before the successive comparison for the eight pixels is completed, the subsequent comparison and generation of the comparison code T(s, t), i.e., the comparison and the generation of the comparison code T(s, t) for the remaining pixels are omitted. In such a case, the ternary pattern code Pnc is not generated.

The high-frequency component detecting unit 98 decides whether or not a high-frequency component is contained (presence or absence of a high-frequency component) in each local region based on the outputs of the comparison code generating unit 83c.

This decision is made based on the following consideration. For instance, in the case of an image with fine patterns such as those of a lawn, or sandstorm, there is a high probability that, in each of the groups consisting of the pixels (three pixels in the illustrated example) arranged in the row direction or in the column direction in the local region, the comparison code of the pixel at the midpoint differs from both of the comparison codes of the pixels at both ends, and the pixel value of the pixel at the midpoint is either of a local maximum and a local minimum. Accordingly, in such a case, it is found that a high-frequency component is contained. This condition is met when the comparison code of the pixel at the midpoint is "01b" and the comparison codes of the pixels at both ends are both "00b". This condition is also met when the comparison code of the pixel at the midpoint is "00b" and the comparison codes of the pixels at both ends are "01b", "10b", respectively.

The operation of the third embodiment is, on the whole, identical to that described with reference to FIG. 16 in connection with the first embodiment. However, as the step S14 in FIG. 16, the process shown in FIG. 32 to FIG. 34 is performed in place of the process shown in FIG. 17.

Figure 32:
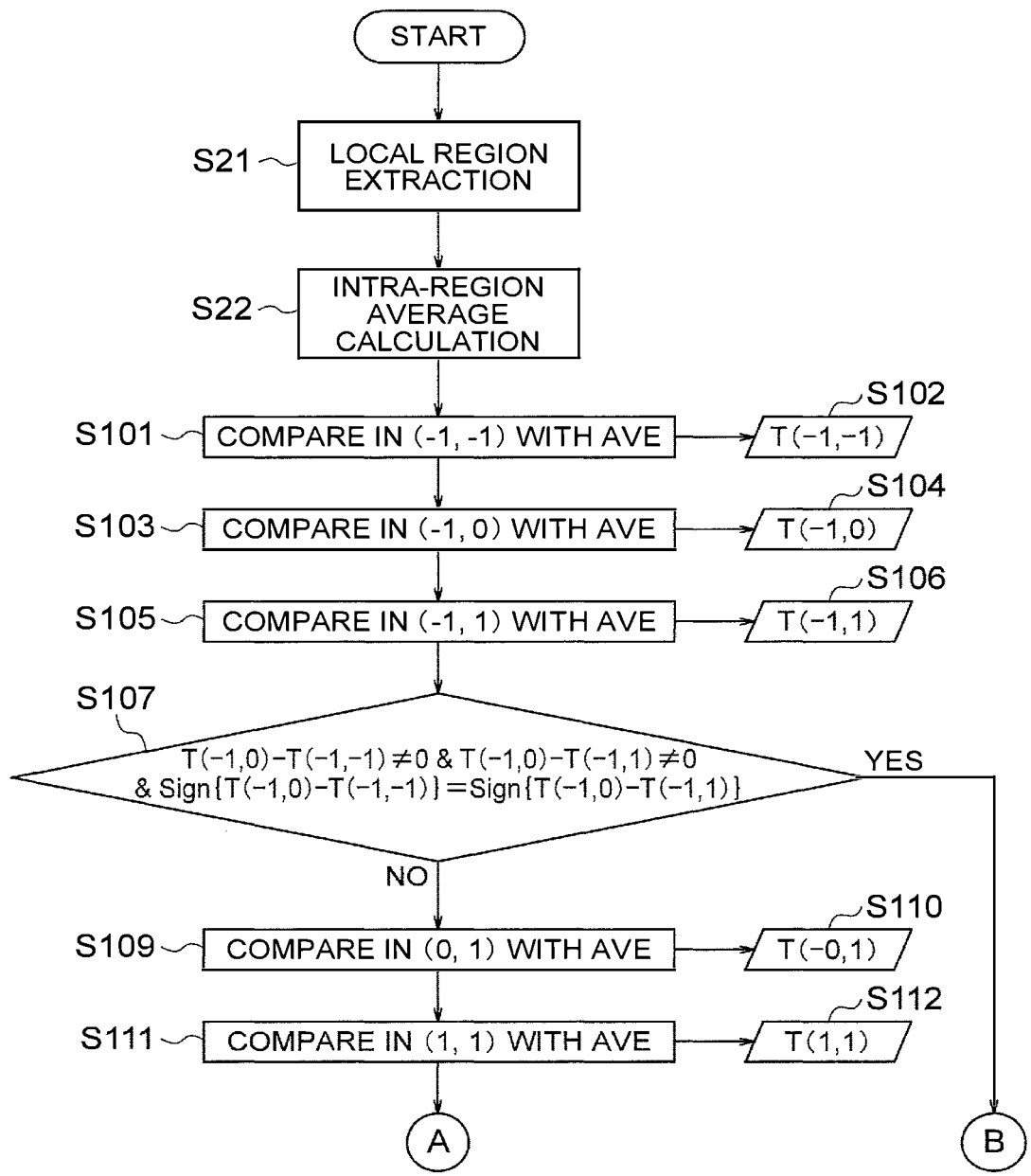
FIG. 32 is a flowchart showing details of a part of the process performed in the pattern identification step in FIG. 16, in the third embodiment.
Figure 33:
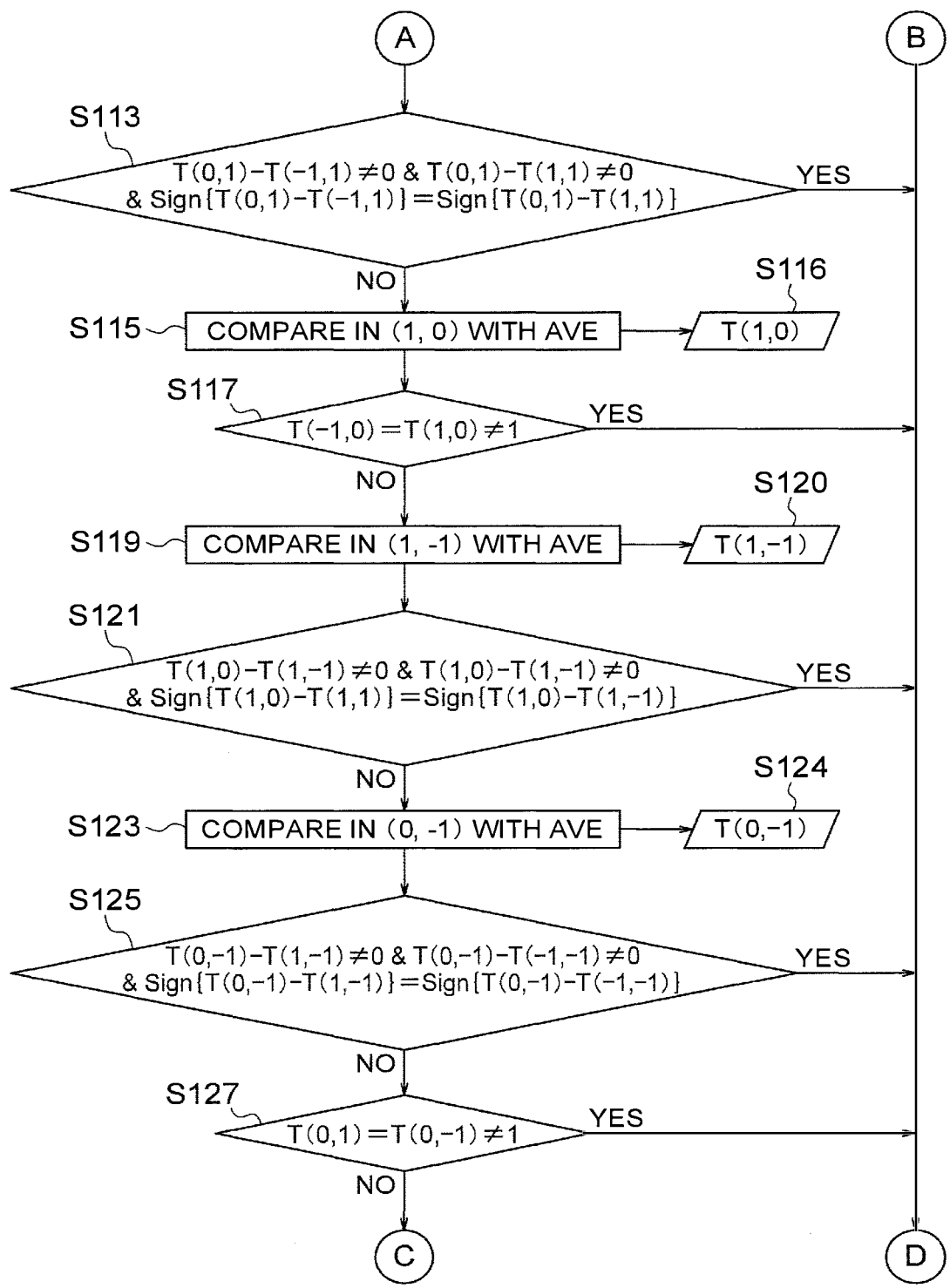
FIG. 33 is a flowchart showing details of another part of the process performed in the pattern identification step in FIG. 16, in the third embodiment.
Figure 34:
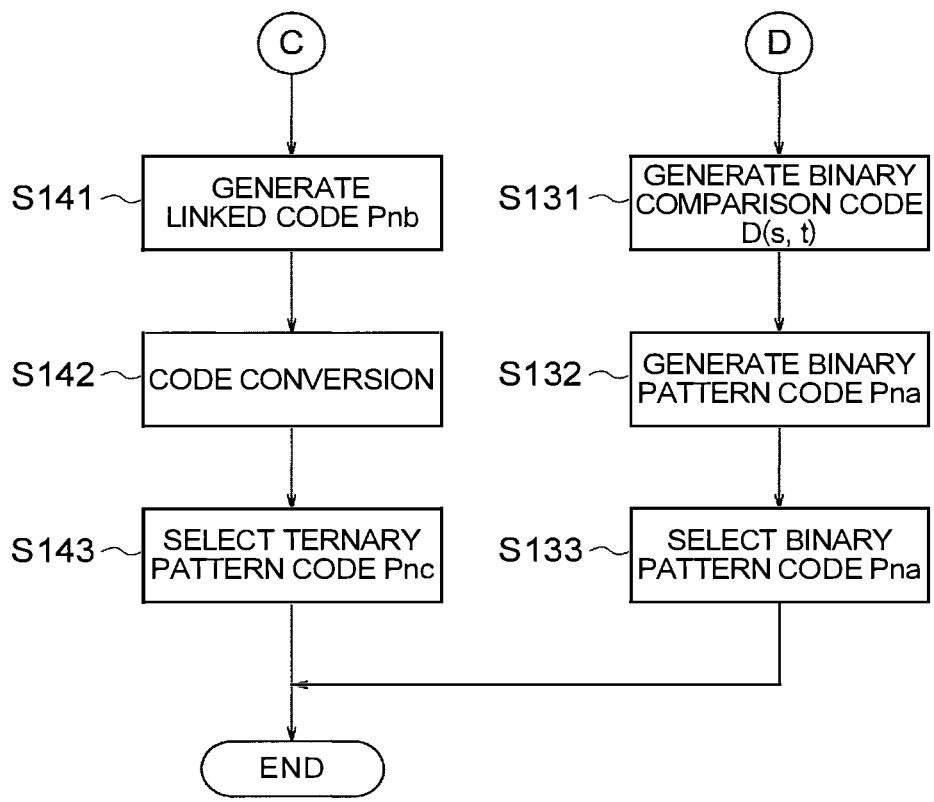
FIG. 34 is a flowchart showing details of another part of the process performed in the pattern identification step in FIG. 16, in the third embodiment.

The steps S21, S22 in FIG. 32 to FIG. 34 are identical to those in FIG. 17.

Following the step S22, the comparison code generating unit 83c compares the pixel value IN(−1, −1) of the pixel in the first column, in the first row with the average value AVE (S101), and generates the ternary comparison code T(−1, −1) depending on the result of the comparison (S102). The generated ternary comparison code T(−1, −1) is supplied to the code linking unit 96 and the high-frequency component detecting unit 98.

Next, the comparison code generating unit 83c compares the pixel value IN(−1, 0) of the pixel in the first column, in the second row with the average value AVE (S103), and generates the ternary comparison code T(−1, 0) depending on the result of the comparison (S104). The generated comparison code T(−1, 0) is supplied to the code linking unit 96 and the high-frequency component detecting unit 98.

Next, the comparison code generating unit 83c compares the pixel value IN(−1, 1) of the pixel in the first column, in the third row with the average value AVE (S105), and generates the ternary comparison code T(−1, 1) depending on the result of the comparison (S106). The generated comparison code T(−1, 1) is supplied to the code linking unit 96 and the high-frequency component detecting unit 98.

By the processes up to this point, all of the ternary comparison codes T(−1, −1), T(−1, 0), and T(−1, 1) pertaining to the three pixels in the first column GC1 shown in FIG. 35(*a*) are obtained. At this stage, the high-frequency component detecting unit 98 performs the decision as to the presence or absence of a high-frequency component based on the ternary comparison codes T(−1, −1), T(−1, 0), and T(−1, 1) pertaining to the three pixels in the first column GC1 (S107).

The high-frequency component detecting unit 98 finds that a high-frequency component is contained when the following mathematical expression (11) holds with regard to the pixels in the first column GC1.

[Mathematical Expression 11]

$T(-1,0)-T(-1,-1) \neq 00b$, and $T(-1,0)-T(-1,1) \neq 00b$, and $$\text{Sign}\{T(-1,0)-T(-1,-1)\}=\text{Sign}\{T(-1,0)-T(-1,1)\} \quad (11)$$

In the above mathematical expression, Sign {A} indicates the sign of A.

If, in the above decision, it is found that a high-frequency component is contained (YES in S107), the process of a step S131 is next performed.

If it is found that no high-frequency component is contained (NO in the step S107), the comparison code generating unit 83c compares the pixel value IN(0, 1) of the pixel in the third row, in the second column with the average value AVE (S109), and generates the ternary comparison code T(0, 1) depending on the result of the comparison (S110). The generated ternary comparison code T(0, 1) is supplied to the code linking unit 96 and the high-frequency component detecting unit 98.

Next, the comparison code generating unit 83c compares the pixel value IN(1, 1) of the pixel in the third row, in the third column with the average value AVE (S111), and generates the ternary comparison code T(1, 1) depending on the result of the comparison (S112). The generated ternary comparison code T(1, 1) is supplied to the code linking unit 96 and the high-frequency component detecting unit 98.

By the processes up to this point, all of the ternary comparison codes T(−1, 1), T(0, 1), and T(1, 1) pertaining to the three pixels in the third row GR3 shown in FIG. 35(*a*) are obtained. At this stage, the high-frequency component detecting unit 98 performs the decision as to the presence or absence of a high-frequency component based on the ternary comparison codes T(−1, 1), T(0, 1), and T(1, 1) pertaining to the three pixels in the third row GR3 (S113).

The high-frequency component detecting unit 98 finds that a high-frequency component is contained if the following mathematical expression (12) holds with regard to the pixels in the third row GR3.

[Mathematical Expression 12]

$T(0,1)-T(-1,1) \neq 00b$, and $T(0,1)-T(1,1) \neq 00b$, and $$\text{Sign}\{T(0,1)-T(-1,1)\}=\text{Sign}\{T(0,1)-T(1,1)\} \quad (12)$$

If, in the above decision, it is found that a high-frequency component is contained (YES in S113), the process of the step S131 is next performed.

If it is found that no high-frequency component is contained (NO in the step S113), the comparison code generating unit 83c compares the pixel value IN(1, 0) of the pixel in the third column, in the second row with the average value AVE (S115), and generates the ternary comparison code T(1, 0) depending on the result of the comparison (S116). The generated ternary comparison code T(1, 0) is supplied to the code linking unit 96 and the high-frequency component detecting unit 98.

By the processes up to this point, all of the ternary comparison codes pertaining to the two pixels (pixels at both ends) other than the pixel at the midpoint in the second row GR2 shown in FIG. 35(*b*), namely the ternary comparison codes T(−1, 0), and T(1, 0) pertaining to the pixels in the second row, in the first column and in the third column are obtained.

Figure 35A:
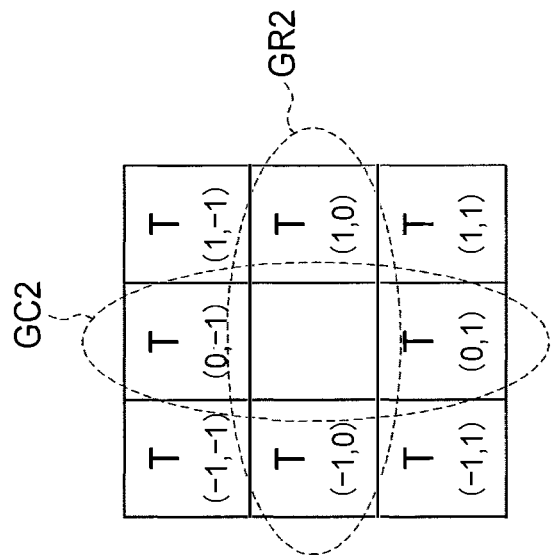
FIGS. 35(a) and (b) are diagrams showing configurations of groups of pixels aligned in the row direction or the column direction.
Figure 35B:
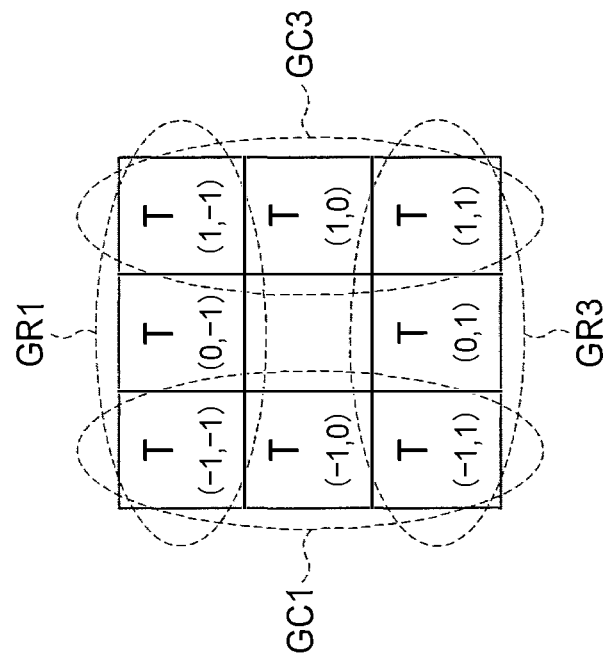

At this stage, the high-frequency component detecting unit 98 performs the decision as to the presence or absence of a high-frequency component based on the ternary comparison codes T(−1, 0), and T(1, 0) pertaining to the pixels at both ends in the second row GR2 in FIG. 35(b) (S117). This decision is made on the assumption that the difference of the pixel value for the pixel at the midpoint (i.e., the central pixel in the local region) from the average value AVE is small, and the ternary comparison code T(0, 0) pertaining to the pixel at the midpoint is "01b", as was noted above.

With such an assumption, it can be determined that, if the comparison codes of the pixels at both ends are equal to each other, and the comparison codes T(s, t) are other than "01b", then the comparison code pertaining to the pixel at the midpoint is a local maximum or a local minimum, and a high-frequency component is contained. Accordingly, the high-frequency component detecting unit 98 finds that a high-frequency component is contained if the following mathematical expression (13) is satisfied.

[Mathematical Expression 13]

$$T(-1,0)=T(1,0)\neq 01b \quad (13)$$

If, in the above decision, it is found that a high-frequency component is contained (YES in S117), the process of the step S131 is next performed.

If it is found that no high-frequency component is contained (NO in the step S117), the comparison code generating unit 83c compares the pixel value IN(1, −1) of the pixel in the third column, in the first row, with the average value AVE (S119), and generates the ternary comparison code T(1, −1) depending on the result of the comparison (S120). The generated ternary comparison code T(1, −1) is supplied to the code linking unit 96 and the high-frequency component detecting unit 98.

By the processes up to this point, all of the ternary comparison codes T(1, −1), T(1, 0), and T(1,1) pertaining to the three pixels in the third column GC3 shown in FIG. 35(a) are obtained. At this stage, the high-frequency component detecting unit 98 performs the decision as to the presence or absence of a high-frequency component based on the ternary comparison codes T(1, −1), T(1, 0), and T(1, 1) pertaining to the three pixels in the third column GC3 (S121).

That is, the high-frequency component detecting unit 98 finds that a high-frequency component is contained if the following mathematical expression (14) is satisfied.

[Mathematical Expression 14]

$$T(1,0)-T(1,1)\neq 00b, \text{ and}$$

$$T(1,0)-T(1,-1)\neq 00b, \text{ and}$$

$$\text{Sign}\{T(1,0)-T(1,1)\}=\text{Sign}\{T(1,0)-T(1,-1)\} \quad (14)$$

If, in the above decision, it is found that a high-frequency component is contained (YES in S121), the process of the step S131 is next performed.

If it is found that no high-frequency component is contained (NO in the step S121), the comparison code generating unit 83c compares the pixel value IN(0, −1) of the pixel in the first row, in the second column with the average value AVE (S123), and generates the ternary comparison code T(0, −1) depending on the result of the comparison (S124). The generated ternary comparison code T(0, −1) is supplied to the code linking unit 96 and the high-frequency component detecting unit 98.

By the processes up to this point, all of the ternary comparison codes T(−1, −1), T(0, −1), and T(1, −1) pertaining to the three pixels in the first row GR1 shown in FIG. 35(a) are obtained. At this stage, the high-frequency component detecting unit 98 performs the decision as to the presence or absence of a high-frequency component based on the ternary comparison codes T(−1, −1), T(0, −1), and T(1, −1) pertaining to the three pixels in the first row GR1 (S125).

That is, the high-frequency component detecting unit 98 finds that a high-frequency component is contained if the following mathematical expression (15) is satisfied.

[Mathematical Expression 15]

$$T(0,-1)-T(1,-1)\neq 00b, \text{ and}$$

$$T(0,-1)-T(-1,-1)\neq 00b, \text{ and}$$

$$\text{Sign}\{T(0,-1)-T(1,-1)\}=\text{Sign}\{T(0,-1)-T(-1,-1)\} \quad (15)$$

Also, at this stage, the high-frequency component detecting unit 98 performs the decision as to the presence or absence of a high-frequency component based on the ternary comparison codes T(0, −1), and T(0, 1) pertaining to the pixels other than the pixel at the midpoint in the second column GC2 in FIG. 35(b) (the pixels in the second column GC2, in the first row and in the third row) (S127). This decision is made on the assumption that the difference of the pixel value for the pixel at the midpoint (i.e., the central pixel in the local region) from the average value AVE is small, and the ternary comparison code T(0, 0) pertaining to the pixel at the midpoint is "01b", as in the step S117.

That is, the high-frequency component detecting unit 98 finds that a high-frequency component is contained if the following mathematical expression (16) is satisfied.

[Mathematical Expression 16]

$$T(0,1)=T(0,-1)\neq 01b \quad (16)$$

If, in either of the steps S126 and S127, it is found that a high-frequency component is contained (YES in at least one of S125 and S127), the process of the step S131 is next performed.

If, in both of the steps S125 and S127, it is found that no frequency component is contained, the process of a step S141 is next performed.

In the step S131, the binary code generating unit 73c generates the binary comparison code D(s, t). Next, in a step S132, the binary pattern code generating unit 75 generates the binary pattern code Pna. Next, in a step S133, the code selecting unit 99 selects the binary pattern code Pna, and outputs it as the selection code D56c.

In the step S141, the code linking unit 96 links the ternary comparison codes T(s, t) to generate the linked code Pnb. Next, in a step S142, the code conversion unit 97 converts the linked code to generate the ternary pattern code Pnc. Next, in a step S143, the code selection unit 99 selects the ternary pattern code Pnc, and outputs it as the selection code D56c.

In the above example, after performing the decision as to whether or not a high-frequency component is contained in the local region, the generation of the binary comparison codes (S131), and the generation of the binary pattern code Pna (S132), or the generation of the linked code Pnb (S141) and the code conversion (S142) are performed. Alternatively, it is possible to perform the generation of the binary comparison codes (S131) and the generation of the binary pattern code Pna (S132), as well as the generation of the linked code Pnb (S141) and the code conversion (S142), in parallel with the decision as to whether or not a high-frequency component is contained in the local region, and perform the selection (S133, S143) of the binary pattern code Pna or the ternary pattern code Pnc depending on the result of the decision as to whether or not a high-frequency component is contained in the local region.

In the above step S117, the decision as to whether or not a high-frequency component is contained is made according to the mathematical expression (13), on the assumption that the difference of the pixel value of the pixel at the midpoint from the average value AVE is small and the ternary comparison code T(0, 0) pertaining to the pixel at the midpoint is "01b". Alternatively, it may be so arranged that the ternary comparison code T(0, 0) is generated based on the result of comparison of the pixel value of the pixel at the midpoint with the average value AVE, and a high-frequency component is found to be contained if the following mathematical expression (17), which is similar to the mathematical expression (12) or the like holds.

[Mathematical Expression 17]

$T(0,0)-T(-1,0) \neq 00b$, and $T(0,0)-T(1,0) \neq 00b$, and $\text{Sign}\{T(0,0)-T(-1,0)\}=\text{Sign}\{T(0,0)-T(1,0)\}$  (17)

Also in the step S127, a high-frequency component may be found to be contained if the following mathematical expression (18), instead of the mathematical expression (16), holds.

[Mathematical Expression 18]

$T(0,0)-T(0,-1) \neq 00b$, and $T(0,0)-T(0,1) \neq 00b$, and $\text{Sign}\{T(0,0)-T(0,-1)\}=\text{Sign}\{T(0,0)-T(0,1)\}$  (18)

As has been described, the code conversion unit 97 converts the linked code output from the code linking unit 96, into the code having a smaller range of assumable values, and outputs the converted code as the ternary pattern code Pnc. The linked code output from the code linking unit 96 assumes one of 6561 values, as was described in the second embodiment. When the linked code Pnb output from the code linking unit 96 assumes one of predetermined 5776 values among the 6561 values mentioned above, the code conversion unit 97 does not output any ternary pattern code Pnc. When the linked code Pnb output from the code linking unit 96 assumes one of predetermined 785 values among the 6561 values mentioned above, the code conversion unit 97 outputs the corresponding ternary pattern code Pnc after the conversion.

A part of the correspondence relations between the values of the linked code before the conversion by the code conversion unit 97 and the values of the ternary pattern code after the conversion are shown in FIGS. 36(*a*) to (*c*). The linked code Pnb before the conversion is indicated by a code (FIG. 36(*b*)) obtained by linking the ternary comparison codes Ta to Th (respectively having relations shown in FIG. 36(*e*)) pertaining to the eight pixels A to H (FIG. 36(*d*)), and by a corresponding decimal number (FIG. 36(*a*)), whereas the ternary pattern code Pnc generated by the conversion is indicated only by a decimal number (FIG. 36(*c*)).

The ternary pattern code Pnc is made to assume values which are different from those assumed by the binary pattern code Pna.

The converted codes Pnc output from the code conversion unit 97 correspond, in a one-to-one relation, to the linked codes Pnb which are generated when no high-frequency component is contained, and the number of the values which can be assumed by the converted ternary pattern codes Pnc output from the code conversion unit 97 is identical to the number of values which can be assumed by the linked codes Pnb generated when no high-frequency component is contained, and the differences between the values which are next to each other when all the values which can be assumed by the converted codes Pnc are arranged in the ascending or descending order are "1".

The frames formed of the dotted lines surrounding the values of the ternary comparison codes Ta to Th in FIG. 36(*b*) indicate that a high-frequency component is detected in the decision using those ternary comparison codes.

With regard to the linked codes of No. 1 to No. 13, No. 15, No. 16, No. 19 to No. 25 in FIG. 36(*a*), no ternary pattern code after the conversion is present, and no ternary pattern code is output from the code conversion unit 97.

This is because, with regard to the linked codes Pnb (FIG. 36(*b*)) corresponding to these numbers, a high-frequency component is found to be contained, and the code selection unit 99 selects the binary pattern code Pna, and does not select the ternary pattern code Pnc. That is, because the ternary pattern code Pnc is not selected in these cases, it is so arranged that the code conversion unit 97 does not output any code after the conversion.

As a result of these processes, when the ternary pattern code Pnc is selected by the code selection unit 99, the ternary pattern code Pnc assuming one of the 785 values is supplied as the selection code D56*c* to the coefficient data reading unit 58*c*. When the binary pattern code Pna is selected by the code selection unit 99, the binary pattern code Pna assuming one of the 256 values is supplied as the selection code D56*c*. Accordingly, 256+785=1041 coefficient data are stored in the coefficient storage unit 57*c*.

The values assumed by the selection code D56*c* when the binary pattern code Pna is selected as the selection code D56*c* and the values assumed by the selection code D56*c* when the ternary pattern code Pnc is selected as the selection code D56*c* are different. For instance, the selection code D56*c* assumes a value of from 0 to 255 when the binary pattern code Pna is selected, and the selection code D56*c* assumes a value equal to or larger than 256, for instance from 256 to 1041, when the ternary pattern code Pnc is selected, as shown in FIG. 36(*c*).

In the above example, the ternary pattern code Pnc is made to assume values which are different from the values assumed by the binary pattern code Pna, and the selection code D56*c* assumes different values between when the binary pattern code Pna is selected as the selection code D56*c* and when the ternary pattern code Pnc is selected as the selection code D56*c*. Alternatively, it may be so arranged that the coefficient data is read from different areas of the coefficient data storage unit 57*c* or from different storage units, between when the binary pattern code Pna is selected as the selection code D56*c* and when the ternary pattern code Pnc is selected as the selection code D56*c*. That is, it may be so arranged that the coefficient data storage unit 57*c* has a first storage area or storage unit, and a second storage area or storage unit, the first storage area or storage unit stores the coefficient data to be read when the binary pattern code Pna is selected as the selection code D56*c*, the second storage area or storage unit stores the coefficient data to be read when the ternary pattern code Pnc is selected as the selection code D56*c*, the first storage area or storage unit is selected when the binary pattern code Pna is selected as the selection code D56*c*, and the second storage area or storage unit is selected when the ternary pattern code Pnc is selected as the selection code D56c. For this selection, the storage data reading unit 58c may be adapted to generate a signal for the selection based on the signal SL indicating the result of the decision by the high-frequency component detecting unit 98.

As in the first embodiment, the high-resolution patch generating unit 54 generates a high-resolution patch HPc by using the coefficient data D58c read by the coefficient data reading unit 58c for each patch LPc in the interpolated image D52.

The patch averaging unit 55, as in the first embodiment, averages the pixel values in a plurality of high-resolution patches HPc pertaining to each pixel in the high-resolution image D54 to determine the pixel value Dout(x, y) in the output image Dout.

For the generation of the coefficient data stored in the coefficient data storage unit 57c, an apparatus similar to that shown in FIG. 18 may be used. However, as the pattern identifying unit 105, one similar to the pattern identifying unit 56c in FIG. 30 needs to be used instead of the one similar to the pattern identifying unit 56 in FIG. 12.

As has been described, in the third embodiment, the coefficient data storage unit stores the coefficient data corresponding to the binary pattern codes and the coefficient data corresponding to those ternary pattern codes which are generated when no high-frequency component is contained in the local region, and the coefficient data is selected by using the binary pattern code as the selection code D56c when a high-frequency component is contained in the local region, and using the ternary pattern code as the selection code D56c when no high-frequency component is contained in the local region. By this scheme, the capacity of the coefficient data storage unit can be reduced in comparison with the second embodiment, and yet the degradation in the picture quality in the enlarged image can be restrained.

In addition, the high-frequency component detecting unit 98 finds that a high-frequency component is contained when, with regard to any of the groups each consisting of pixels aligned in the row direction or in the column direction in the local region, the pixel value of the pixel at the midpoint is a local maximum or a local minimum, and performs the decision as to whether the pixel value is either of a local maximum and a local minimum by using the ternary comparison codes, so that the decision as to whether or not a high-frequency component is contained can be implemented with a circuit of a small size.

Fourth Embodiment

The third embodiment described above is associated with two problems explained below. The first problem is that when the arrangement of the ternary comparison codes pertaining to a local region is as shown in FIG. 37(a) or FIG. 38(a), the third embodiment does not find that a high-frequency component is contained. However, when pixels or groups of pixels which are in a local region and which have the same comparison code are separated by a pixel or a group of pixels having a different comparison code as shown in FIG. 37(a) or FIG. 38(a), it is more appropriate to find that a high-frequency component is contained. The fourth embodiment is configured to find that a high-frequency component is contained in such cases.

The second problem is that the process for the conversion from the linked code Pnb to the ternary pattern code Pnc is complicated and the size of the circuit for implementing the process is large. The fourth embodiment makes it possible to reduce the size of the circuit for the generation of the ternary pattern code.

Figure 39:
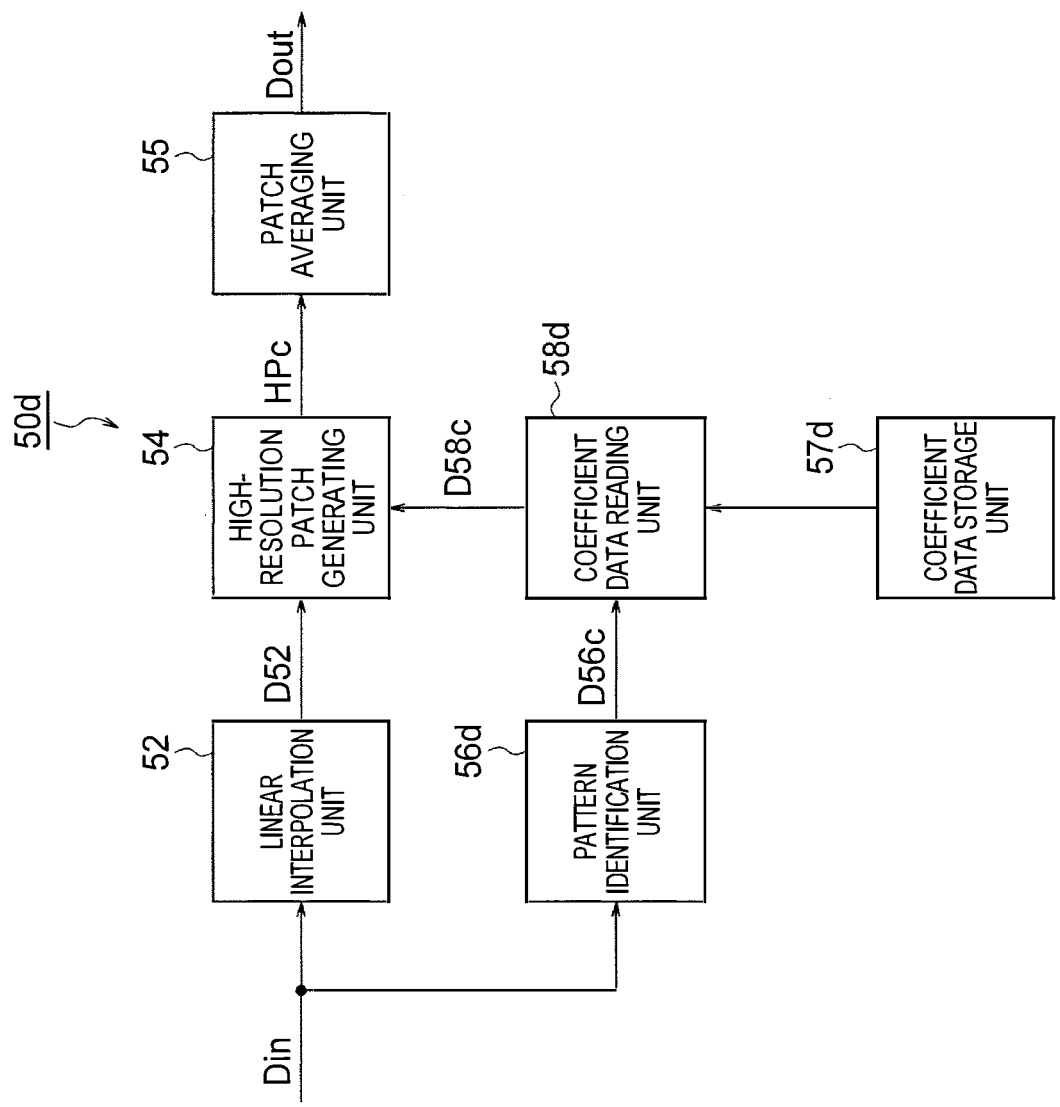
FIG. 39 is a block diagram showing a configuration of an image enlarging apparatus of the fourth embodiment of the present invention.

FIG. 39 shows an image enlarging apparatus 50d of the fourth embodiment. The illustrated image enlarging apparatus 50d is generally identical to the image enlarging apparatus 50c of the third embodiment, but it is provided with a pattern identification unit 56d, a coefficient data storage unit 57d, and a coefficient data reading unit 58d in place of the pattern identification unit 56c, the coefficient data storage unit 57c, and the coefficient data reading unit 58c.

Figure 40:
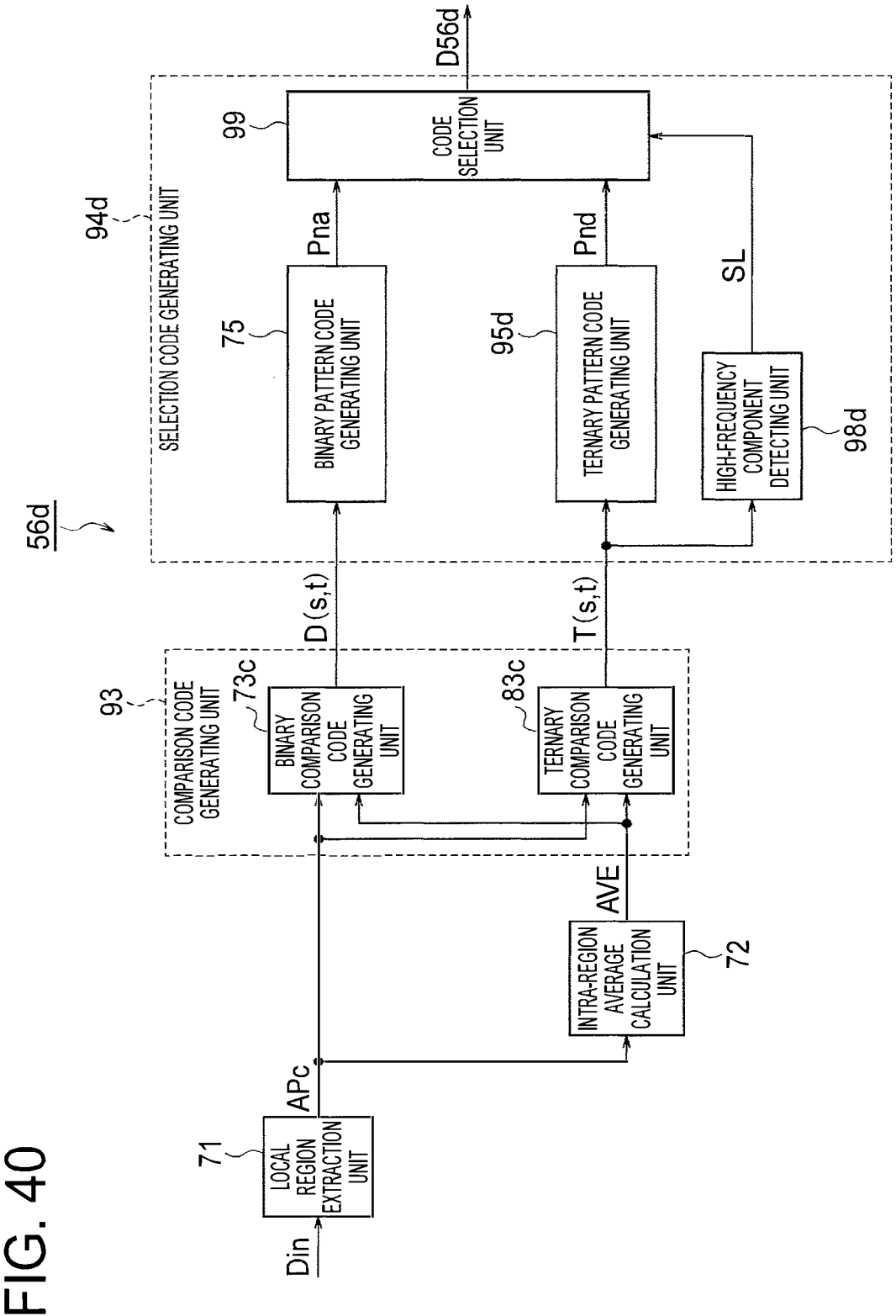
FIG. 40 is a block diagram showing a configuration of a pattern identification unit used in the image enlarging apparatus of the fourth embodiment.

The pattern identifying unit 56d is as shown in FIG. 40, and is generally identical to the pattern identifying unit 56c in FIG. 30, but is provided with a selection code generating unit 94d in place of the selection code generating unit 94 in FIG. 30. The selection code generating unit 94d is generally identical to the selection code generating unit 94, but is provided with a ternary pattern code generating unit 95d and a high-frequency component detecting unit 98d in place of the ternary pattern code generating unit 95 and the high-frequency component detecting unit 98 in FIG. 30.

Figure 41:
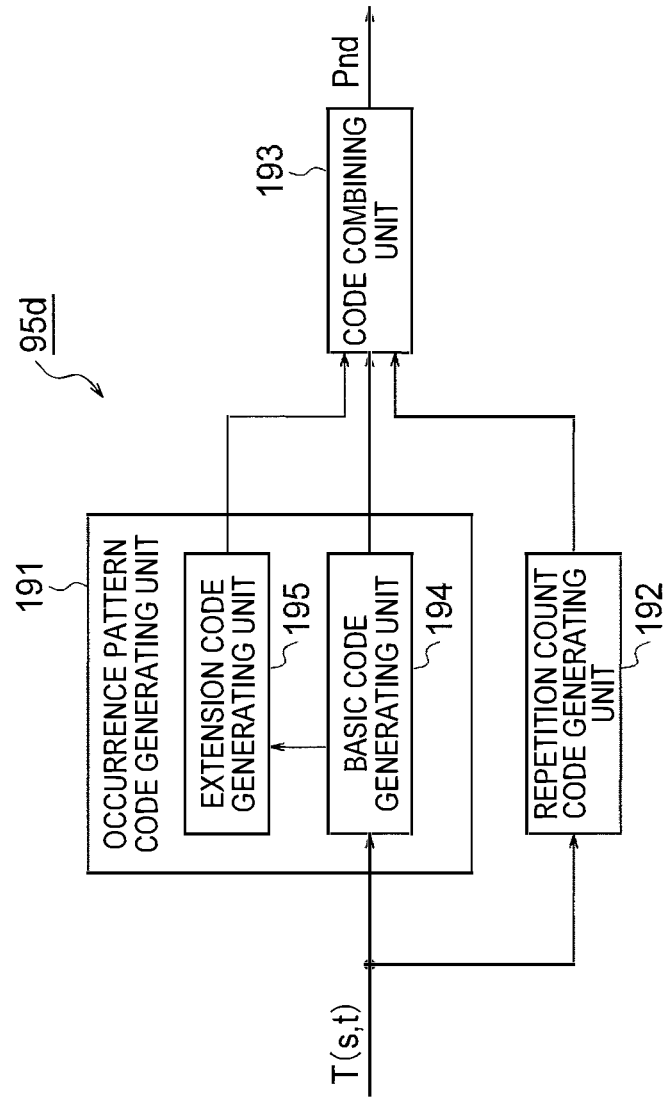
FIG. 41 is a block diagram showing a configuration of a ternary pattern code generating unit in FIG. 40.

As shown in FIG. 41, the ternary pattern code generating unit 95d includes an occurrence pattern code generating unit 191, a repetition count code generating unit 192, and a code combining unit 193. The occurrence pattern code generating unit 191 includes a basic code generating unit 194 and an extension code generating unit 195.

In the fourth embodiment, the condition for detecting a high-frequency component (finding that a high-frequency component is contained) at the high-frequency component detecting unit 98d is more lenient than in the third embodiment. Conversely speaking, the condition for finding that no high-frequency component is contained is stricter than in the third embodiment. That is, the high-frequency component detecting unit 98d in the fourth embodiment finds that a high-frequency component is contained not only when the condition on which the high-frequency component detecting unit in the third embodiment finds that a high-frequency component is contained is satisfied, but also when another condition is satisfied. "Another condition" mentioned here is for finding that a high-frequency component is contained when the arrangement of the comparison codes T(s, t) is as shown in FIG. 37(a) or FIG. 38(a), and finding that no high-frequency component is contained when the arrangement of the comparison codes T(s, t) is as shown in FIG. 37(b) or FIG. 38(b).

Specifically, the fourth embodiment adds two conditions for detecting a high-frequency component to the conditions in the third embodiment.

Figure 42:
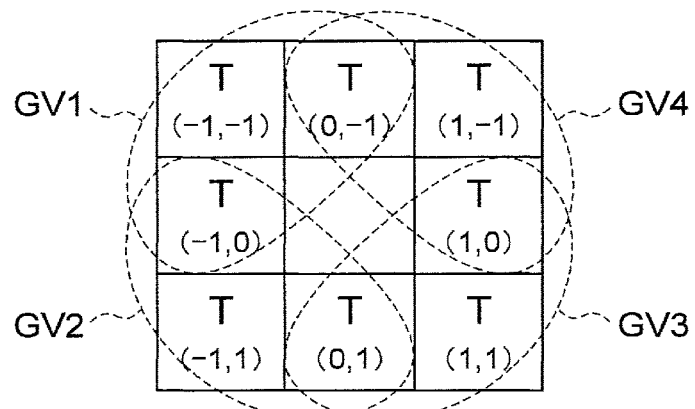
FIG. 42 is a diagram showing an arrangement of pixels in a local region for explaining a condition for detecting a high-frequency component.

The first condition is explained with reference to FIG. 42. A decision as to whether or not a high-frequency component is contained is made, by comparing the pixel values of a plurality of pixels which belong to each of groups GV1, GV2, GV3, and GV4 each consisting of three pixels including one of the pixels positioned at the vertexes of the rectangular local region consisting of 3×3 pixels, and two pixels adjacent thereto (pixel adjacent in the row direction and pixel adjacent in the column direction), by using the ternary comparison codes pertaining to the respective pixels. That is, a high-frequency component is found to be contained when, with regard to any of the above-mentioned plurality of groups GV1, GV2, GV3 and GV4, the pixel value of the pixel at the vertex included in the group takes a local maximum value or a local minimum value, and the pixel values of the two pixels adjacent thereto and included in the group are not of a value close to the reference value AVE (the difference from the reference value AVE is not smaller than the threshold value α).

In the case where the ternary comparison codes T(s, t) are generated by the process represented by the above mathematical expression (9), and the ternary comparison code pertaining to the pixel at the center of the local region is assumed to be "01b", a high-frequency component is found to be contained when, with regard to any of the above-mentioned plurality of groups GV1, GV2, GV3 and GV4, the ternary comparison code pertaining to the pixel at the vertex included in the group takes a local maximum value or a local minimum value, and neither of the ternary comparison codes pertaining to the two pixels adjacent thereto and included in the group is "01b".

That is, when any of the mathematical expressions (19A) to (19D) is satisfied, a high-frequency component is found to be contained.

[Mathematical Expression 19]

For Group GV1, $T(-1,0)=T(0,-1)T(-1,-1)$ $\&T(-1,0)=T(0,-1)\neq 01b$ (19A)

For Group GV2, $T(0,1)=T(-1,0)\neq T(-1,1)$ $\&T(0,1)=T(-1,0)\neq 01b$ (19B)

For Group GV3, $T(1,0)=T(0,1)\neq T(1,1)$ $\&T(1,0)=T(0,1)\neq 01b$ (19C)

For Group GV4, $T(0,-1)=T(1,0)\neq T(1,-1)$ $\&T(0,-1)=T(1,0)\neq 01b$ (19D)

Figure 43:
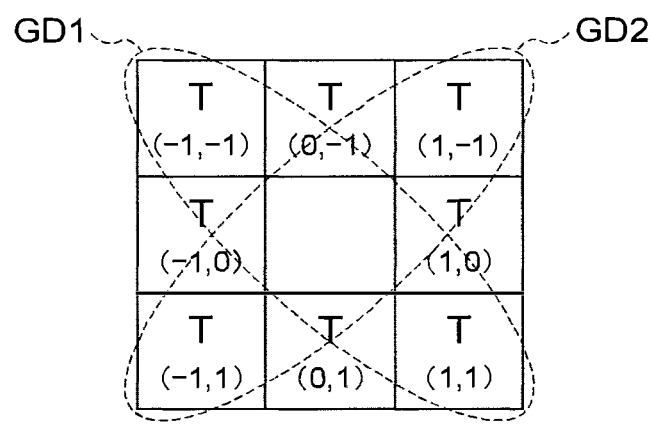
FIG. 43 is a diagram showing an arrangement of pixels in a local region for explaining another condition for detecting a high-frequency component.

The second condition is explained with reference to FIG. 43. Decision as to whether or not a high-frequency component is contained is made, by comparing the pixel values of the pixels which belong to each of groups GD1 and GD2, each consisting of three pixels aligned along a diagonal line of a rectangular local region consisting of 3×3 pixels, and the pixels which do not belong to the group and are positioned at the vertexes of the local region, by using the ternary comparison codes pertaining to the respective pixels. That is, a high-frequency component is found to be contained if, with regard to any of the above-mentioned plurality of groups GD1 and GD2, that the pixel value of the pixel at the midpoint (the pixel at the center of the rectangular region) takes a local maximum value or a local minimum value, and the differences between the pixel values of the pixels which do not belong to the group (which are not positioned on the diagonal line) and which are positioned at the two vertexes of the local region, and the pixel values of the pixels which belong to the group and which are positioned at the two vertexes of the local region are large (the pixel values belong to different classes).

In the case where the ternary comparison codes T(s, t) are generated by the process represented by the above mathematical expression (9), and the ternary comparison code of the pixel at the center of the local region is assumed to be "01b", a high-frequency component is found to be contained when, with regard to any of the above-mentioned plurality of groups GD1 and GD2, the ternary comparison code pertaining to the pixel at the midpoint (the pixel at the center of the rectangular local region) takes a local maximum value or a local minimum value, and the ternary comparison codes pertaining to the pixels which do not belong to the group (which are not positioned on the diagonal line) and which are positioned at the two vertexes of the local region are different from the ternary comparison codes pertaining to the pixels which belong to the group and which are positioned at the two vertexes of the local region.

That is a high-frequency component is found to be contained if either of the following mathematical expressions (20A) and (20B) is satisfied.

[Mathematical Expression 20]

For Group GD1, $T(-1,-1)=T(1,1)\neq 01b$ $\&T(-1,-1)=T(1,1)\neq T(-1,1)$ $\&T(-1,-1)=T(1,1)\neq T(1,-1)$ (20A)

For Group GD2, $T(-1,1)=T(1,-1)\neq 01b$ $\&T(-1,1)=T(1,-1)\neq T(-1,-1)$ $\&T(-1,1)=T(1,-1)\neq T(1,1)$ (20B)

If the ternary comparison code T(0, 0) pertaining to the pixel at the center of the local region is assumed to be "01b" as was explained above, the above conditions are satisfied only when the comparison codes of the two vertexes positioned on the diagonal line are both "00b" or both "10b".

Figure 44:
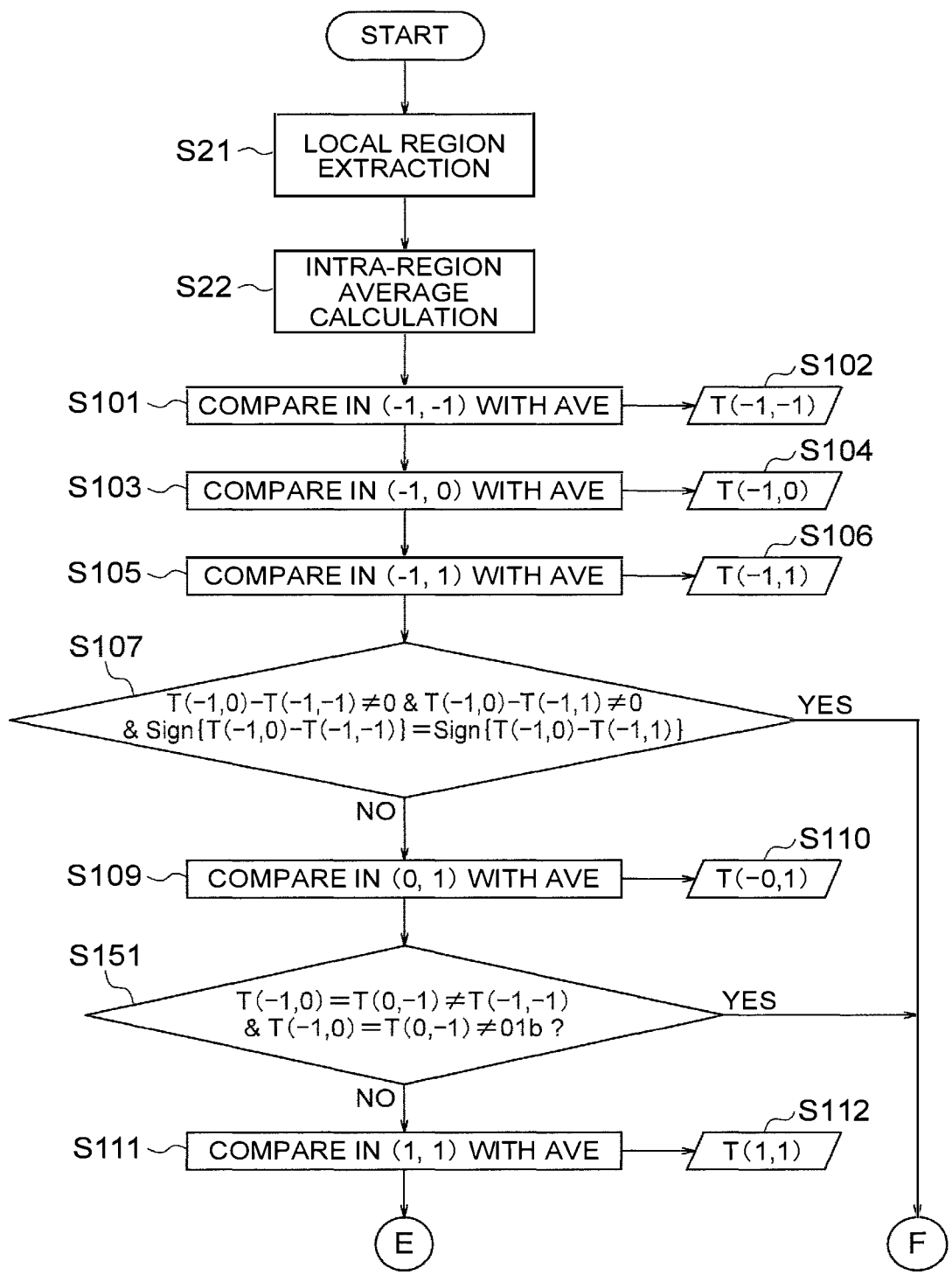
FIG. 44 is a flowchart showing details of a part of the process performed in the pattern identification step in FIG. 16, in the fourth embodiment.
Figure 45:
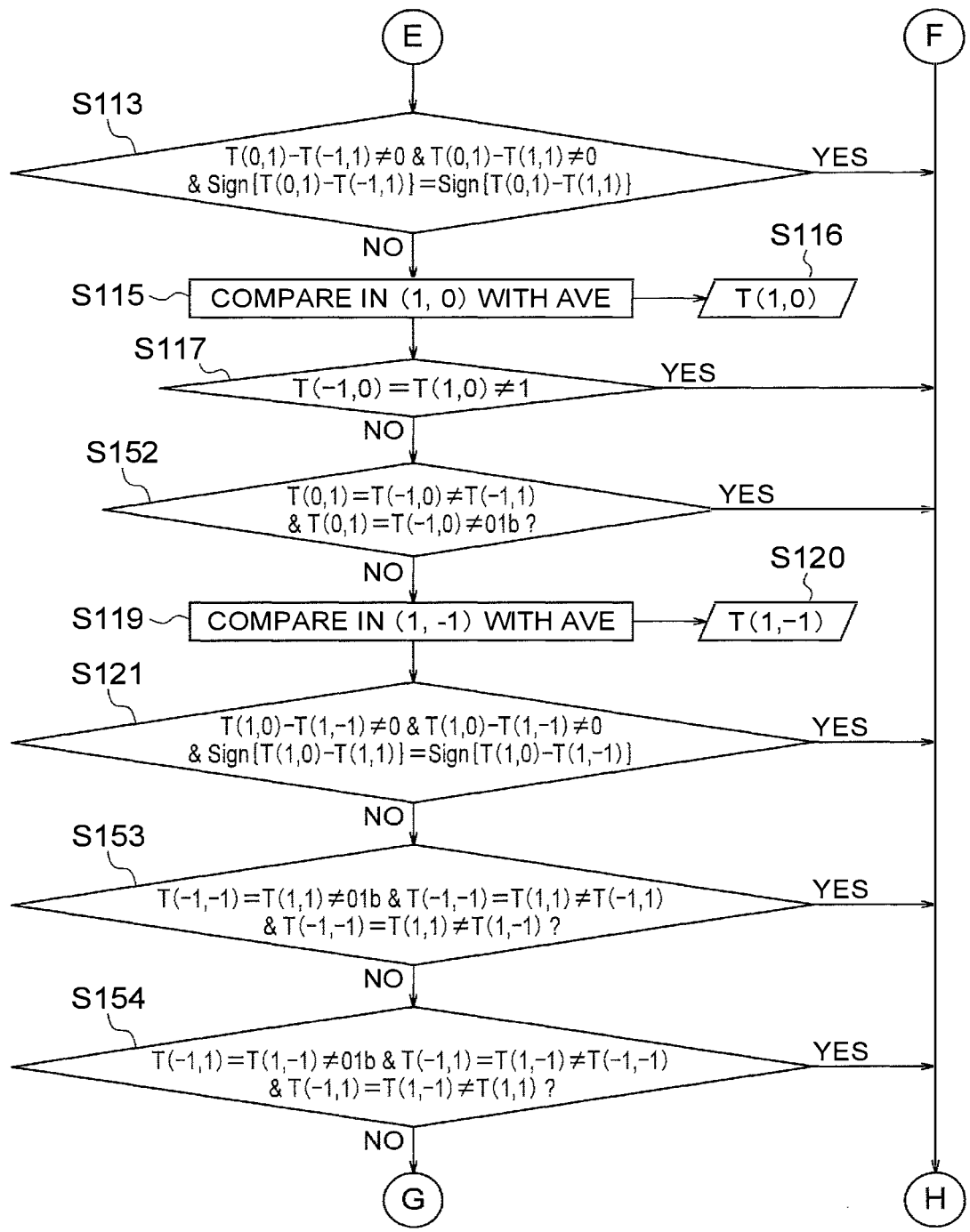
FIG. 45 is a flowchart showing details of another part of the process performed in the pattern identification step in FIG. 16, in the fourth embodiment.
Figure 46:
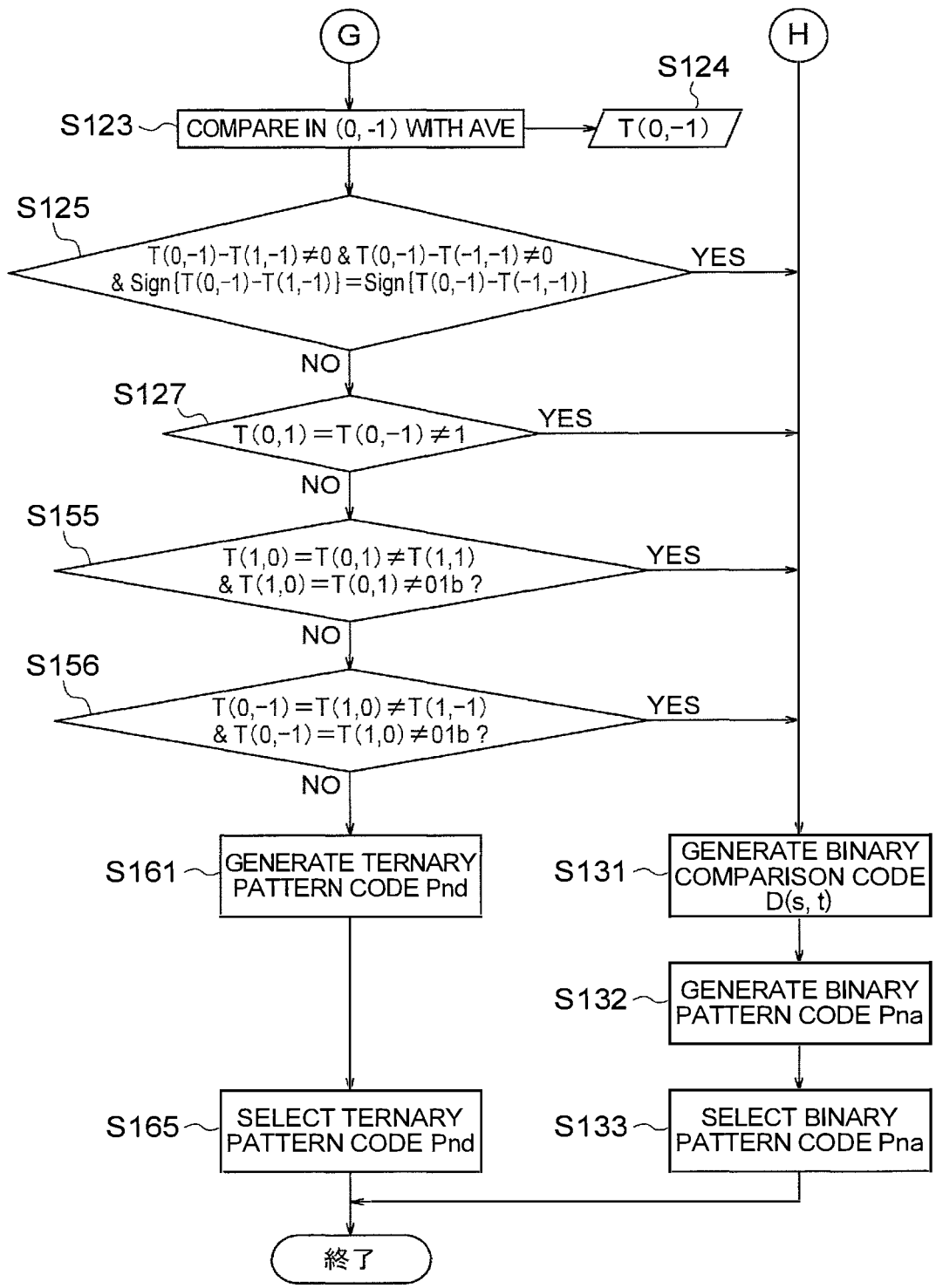
FIG. 46 is a flowchart showing details of another part of the process performed in the pattern identification step in FIG. 16, in the fourth embodiment.

The pattern identification process for the case where the above-mentioned two detection conditions are added is shown in FIG. 44 to FIG. 46. FIG. 44 to FIG. 46 are similar to FIG. 32 to FIG. 34 in the third embodiment, but differ in that steps S151 to S156 are inserted, and the steps S141 to S143 are replaced with steps S161 and S162. The steps S151, S152, S155, and S156 are for the decision as to whether the first condition mentioned above is satisfied, and the steps S153 and S154 are for the decision as to whether the second condition mentioned above is satisfied.

Specifically, the step S151 performs the decision as to whether the condition of the above mathematical expression (19A) is satisfied.

The step S152 performs the decision as to whether the condition of the above mathematical expression (19B) is satisfied.

The step S153 performs the decision as to whether the condition of the above mathematical expression (20A) is satisfied.

The step S154 performs the decision as to whether the condition of the above mathematical expression (20B) is satisfied.

The step S155 performs the decision as to whether the condition of the above mathematical expression (19C) is satisfied.

The step S156 performs the decision as to whether the condition of the above mathematical expression (19D) is satisfied.

In the step S161, the ternary pattern code generating unit 95d generates the ternary pattern code Pnd.

In the step S162, the code selecting unit 99 selects the ternary pattern code Pnd and outputs it as a selection code D56d.

In the above example, the generation of the binary comparison codes (S131) and the generation of the binary pattern code Pna (S132) or the generation of the ternary pattern code Pnd (S161) are performed after the decision as to whether or not a high-frequency component is contained in the local region. Alternatively, it is possible to perform the generation of the binary comparison codes (S131) and the generation of the binary pattern code Pna (S132) as well as the generation of the ternary pattern code Pnd (S161), in parallel with the decision as to whether or not a high-frequency component is contained in the local region, and perform the selection (S133, S162) of the binary pattern code Pna or the ternary pattern code Pnd depending on the result of the decision as to whether or not a high-frequency component is contained in the local region.

By adding the two detection conditions as described above, the ternary pattern code Pnd output by the ternary pattern code generating unit 95d assumes one of 445 values, and it is satisfactory if the coefficient data storage unit 57d stores 445 coefficient data as the coefficient data corresponding to the ternary pattern codes Pnd. The number of the coefficient data corresponding to the binary pattern codes Pna is 256, as in the third embodiment.

In the third embodiment, the number of the values which can be assumed by the ternary pattern code Pnc output by the pattern code generating unit 95 is 785, whereas in the fourth embodiment, the number of values which can be assumed by the ternary pattern code Pnd output by the pattern code generating unit 95d is 445.

In the third embodiment, a conversion table circuit of a large size is required in the code conversion unit 97 for the conversion from the linked code Pnb which assumes one of 6561 values to the ternary pattern code Pnc which assumes one of 785 values. As a result, despite the reduction in the capacity of the coefficient storage unit 57c, the reduction in the size of the circuit is achieved only to a smaller degree. The fourth embodiment is to solve this problem as well. In the fourth embodiment, an occurrence pattern of the comparison codes and a sequence of the numbers of times (repetition counts) the comparison codes of the same value occur consecutively are determined, from the arrangement of the comparison codes for the local region, and the code conversion is performed using conversion tables based on the occurrence pattern and the sequence of the repetition counts, to generate the ternary pattern code Pnd, thereby to restrain the size of the circuit for the code generation.

Specifically, in this embodiment, the occurrence pattern code corresponding to the above-mentioned occurrence pattern and the sequence of repetition count codes corresponding to the sequence of the repetition counts are generated, and combined to generate the ternary pattern code Pnd.

First, the generation of the occurrence pattern code is explained. The generation of the occurrence pattern code is performed by the occurrence pattern code generating unit 191.

The occurrence pattern (transition pattern) of the ternary comparison codes T(s, t) pertaining to the peripheral pixels in the local region occurring when they are arranged in the order indicated by the arrow-headed line ARd in FIG. 31(b) is one of 17 patterns shown in FIG. 47, for the local regions which are not found, by the pattern identification process of FIG. 44 to FIG. 46, to contain a high-frequency component (the local regions for which the generation of the ternary pattern code Pnd is required). Here, the occurrence pattern represents how the values of the comparison codes vary when the comparison codes are arranged in the order indicated by the arrow-headed line ARd in FIG. 31(b). No variation is found to have occurred, as long as the values of the comparison codes maintain the same value. In FIG. 47, the comparison code which occurs last in the occurrence pattern is enclosed in parentheses, for the reason which will be explained later.

For instance, "00b→01b→(00b)" at No. 1 in FIG. 47 means that one or more pixels whose comparison code has a value "00b" occur consecutively, then one or more pixels whose comparison code has a value "01b" occur consecutively, and then one or more pixels whose comparison code has a value "00b" occur consecutively.

In FIG. 47, the occurrence patterns are classified into three categories.

The first category is a case where the comparison codes assume just one of the three values, and "No. 0" is assigned as the occurrence pattern number for this case. In this case, the comparison codes all assume "01b".

The second category is the case where the comparison codes assume just two of the three values, and includes patterns No. 1 to No. 6.

The third category is the case where the comparison codes assume all of the three values, and includes patterns No. 7 to No. 16.

FIG. 47 also shows the occurrence pattern codes generated for the respective occurrence patterns. The occurrence pattern code consists of a basic code and an extension code. The basic code is generated by the basic code generating unit 194, while the extension code is generated by the extension code generating unit 195.

In the case of the pattern No. 0, the occurrence pattern code which is identical to that for the pattern No. 5 is generated. The reason therefor will be explained later.

The pattern No. 1 and the pattern No. 2 are in a relation in which "00b" and "10b" are replaced with each other, and the basic code is "1110b" for both patterns, but the extension code differs. That is, the extension code for the pattern No. 1 is "0b" whereas the extension code for the pattern No. 2 is "1b".

Similarly, the pattern No. 3 and the pattern No. 4 are in a relation in which "00b" and "10b" are replaced with each other. The basic code is "1101b" for both patterns, but the extension code differs. That is, the extension code for the pattern No. 3 is "0b" whereas the extension code for the pattern No. 4 is "1b".

Similarly, the pattern No. 5 and the pattern No. 6 are in a relation in which "00b" and "10b" are replaced with each other. The basic code is "1100b" for both patterns, but the extension code differs. That is, the extension code for the pattern No. 5 is "0b" whereas the extension code for the pattern No. 6 is "1b".

The same is true for the third category. That is, the pattern No. 7 and the pattern No. 8 are in a relation in which "00b" and "10b" are replaced with each other. The basic code is "1010b" for both patterns, but the extension code differs. That is, the extension code for the pattern No. 7 is "0b" whereas the extension code for the pattern No. 8 is "1b".

Similarly, the pattern No. 9 and the pattern No. 10 are in a relation in which "00b" and "10b" are replaced with each other. The basic code is "1001b" for both patterns, but the extension code differs. That is, the extension code for the pattern No. 9 is "0b" whereas the extension code for the pattern No. 10 is "1b".

Similarly, the pattern No. 11 and the pattern No. 12 are in a relation in which "00b" and "10b" are replaced with each other. The basic code is "1000b" for both patterns, but the extension code differs. That is, the extension code for the pattern No. 11 is "0b" whereas the extension code for the pattern No. 12 is "1b".

Similarly, the pattern No. 13 and the pattern No. 14 are in a relation in which "00b" and "10b" are replaced with each other. The basic code is "01b" for both patterns, but the extension code differs. That is, the extension code for the pattern No. 13 is "0b" whereas the extension code for the pattern No. 14 is "1b".

Similarly, the pattern No. 15 and the pattern No. 16 are in a relation in which "00b" and "10b" are replaced with each other. The basic code is "00b" for both patterns, but the extension code differs. That is, the extension code for the pattern No. 15 is "0b" whereas the extension code for the pattern No. 16 is "1b".

As has been described, in this embodiment, two patterns (e.g., No. 1 and No. 2) between which there is a relation that the comparison codes "00b" and "10b" are replaced with each other are taken as one set, and a basic code is assigned to each set, and an extension code is assigned for distinction between the two patterns within the set.

The occurrence pattern codes for the pattern No. 0, and patterns No. 1 to No. 12 are of five bits, whereas the occurrence pattern codes for the patterns No. 13 to No. 16 are of three bits.

Figures 48A, 48B:
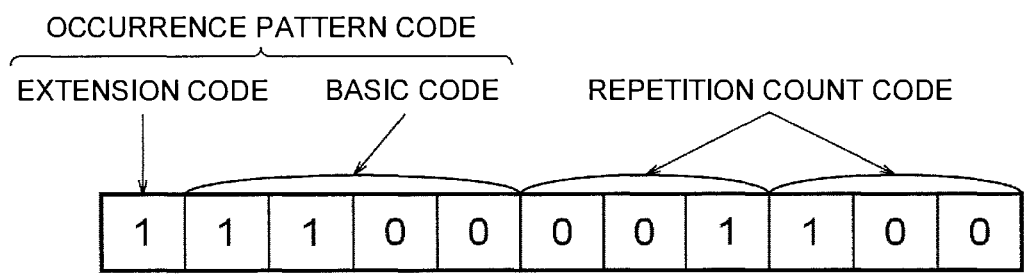
FIGS. 48(a) and (b) are diagrams showing an example of arrangement of comparison codes and a ternary pattern code generated therefrom.

For instance, when the arrangement of the comparison codes is as shown in FIG. 48(*a*), the sequence of occurrences of the comparison codes is "01b"→"10b"→"01b" ("01b" occurs twice consecutively, "10b" occurs five times consecutively, and "01b" occurs once), and this sequence corresponds to the pattern No. 6 in FIG. 47. In this case, "1b" is generated as the extension code, and "1100b" is generated as the basic code, as shown in FIG. 48(*b*).

Figures 49A, 49B:
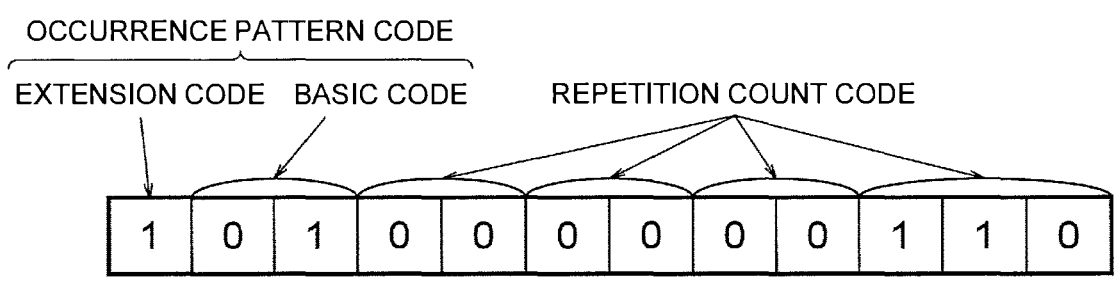
FIGS. 49(a) and (b) are diagrams showing another example of arrangement of comparison codes and a ternary pattern code generated therefrom.

When the arrangement of the comparison codes is as shown in FIG. 49(*a*), the sequence of occurrences of the comparison codes is "10b"→"01b"→"00b"→"01b"→"10b" (each of "10b", "01b", "00b" occurs once, and then "01b" occurs four times consecutively, and finally, "10b" occurs once), and this sequence corresponds to the pattern No. 14 in FIG. 47. In this case, "1b" is generated as the extension code, and "01b" is generated as the basic code, as shown in FIG. 49(*b*).

Next, the generation of the repetition count codes is explained. The repetition count codes are generated by the repetition count code generating unit 192.

The repetition count codes corresponding to the numbers of times (repetition counts, or run lengths) the comparison codes of the same value occur consecutively when the ternary comparison codes T(s, t) for the peripheral pixels in the local region are arranged in the order indicated by the arrow-headed line ARd in FIG. 31(*b*) are generated, and the generated repetition count codes are output in succession. The generation of the repetition count codes is performed by the repetition count code generating unit 192.

The repetition count code corresponding to each repetition count is generated using separate conversion tables which are respectively provided for the case where the number of the values of the comparison codes which occur is two, and the case where the number of the values of the occurring comparison codes is three. For the run (sequence of the same value) which occurs last, no repetition count code is generated. This is because the length of the run which occurs last is determined, as a matter of course, from the length(s) of the run(s) which occur(s) earlier.

The parentheses enclosing the last comparison code in the occurrence pattern in FIG. 47 indicate that no repetition count code based on the repetition count is generated for such comparison code. The repetition count of the last comparison code may become 0.

When the number of the values of the occurring comparison codes is two, the repetition count codes are generated using the conversion table in FIG. 50(*a*), whereas when the number of the values of the occurring comparison codes is three, the repetition count codes are generated using the conversion table in FIG. 50(*b*).

As shown in FIG. 50(*a*), when the number of the values of the occurring comparison codes is two, the repetition count code corresponding to each repetition count is of three bits. That is, the conversion table shown in FIG. 50(*a*) is a fixed-length table in which the output repetition count code is fixed at three bits.

As shown in FIG. 50(*b*), when the number of the values of the occurring comparison codes is three, the repetition count code corresponding to each repetition count up to three is of two bits, and the repetition count code corresponding to each repetition count of four or more is of three bits. That is, the conversion table shown in FIG. 50(*b*) is a variable-length table in which the output repetition count code is of two bits or three bits.

Incidentally, when the number of the values of the occurring comparison codes is three, the maximum value of the repetition count in the arrangement in which no high-frequency component is contained is five. That is, if the number of the values of the occurring comparison codes is three and the repetition count is six, a high-frequency component is found to be contained. When the repetition count is seven, the number of the values of the occurring comparison codes is two; and when the repetition count is eight, the number of the values of the occurring comparison codes is one.

The generated repetition count codes are output in the order of occurrence of the corresponding runs.

For instance, if the arrangement of the comparison codes is as shown in FIG. 48(*a*), the number of the values of the occurring comparison codes is two; "01" is repeated twice, and "10" is repeated five times, so that "001b" and "100b" are generated as repetition count codes, and output in succession. The sequence generated by linking the repetition count codes which are output in succession will be "001100b" as shown in FIG. 48(*b*).

If the arrangement of the comparison codes is as shown in FIG. 49(*a*), the number of the values of the occurring comparison codes is three; "10" occurs once, "01" occurs once, and "00" occurs once, after which "01" is repeated four times, and "10" occurs last, so that "00b" is generated three times, and then "110b" is generated, as the repetition counts, and they are output in succession. The sequence generated by linking the repetition count codes which are output in succession is "000000110b" as shown in FIG. 49(*b*).

The ternary pattern code Pnd is generated by linking the extension code, the basic code and the sequence of the repetition count codes generated in the manner described above. The linking is performed by the code combining unit 193.

For instance, in the case of FIG. 48(*b*), the occurrence pattern code "11100b" and the repetition pattern codes "001b" and "100b" are linked to generate a combination code "11100001100b" of 11 bits.

In the case of FIG. 49(*b*), the occurrence pattern code "101b" and the repetition count codes "00b", "00b", "00b", and "110b" are linked to generate a combination code "101000000110b" of 12 bits.

When a combination code of 12 bits is generated, it is output as the ternary pattern code Pnd without modification. When a combination code of 11 bits is generated, "0b" or "1b" is appended to the least significant bit, and the result is output as the ternary pattern code Pnd.

In the case of the occurrence pattern (No. 0) in which the comparison codes assume just one value, the values of the comparison codes are all "01b". In this case, the repetition count code will be "111b", so that it is possible to make a distinction from any of the patterns No. 1 to No. 6 regardless of how the occurrence pattern code is determined. However, in view of the fact that the value of the occurring comparison code is "01b", it is desirable that the occurrence pattern code identical to that of the pattern No. 5 or the pattern No. 6 be used. In the present embodiment, the occurrence pattern code identical to that of the pattern No. 5 is generated.

When the number of the values of the occurring comparison codes is three, the repetition count code may become "111b", but as the occurrence pattern code is different, it is possible to make a distinction.

The code selection unit 99 selects and outputs either of the ternary pattern code Pnd generated in the manner described above, and the binary pattern code Pna generated by the binary pattern code generating unit 75, and outputs the selected pattern code. That is, when a high-frequency component is found to be contained by the high-frequency component detecting unit 98d, the binary pattern code Pna is selected and output, whereas when a high-frequency component is not found to be contained by the high-frequency component detecting unit 98d, the ternary pattern code Pnd is selected and output.

In the present embodiment, the bit length of the ternary pattern code Pnd obtained by the variable-length table and the like is 12 bits at most, and the minimum value of the ternary pattern code Pnd generated in the manner described above is "000000100000b", which is smaller than the maximum value "11111111b" of the binary pattern code Pna. As a result, when the values from "00000000b" to "11111111b" is used for the binary pattern code Pna, there will be an overlap between the range of values which may be taken by the binary pattern code Pna and the range of values which may be taken by the ternary pattern code Pnd. In such a case, it is possible to use a coefficient data storage unit 57d having separate areas which are used as a memory area for storing the coefficient data corresponding to the binary pattern code Pna, and a memory area for storing the coefficient data corresponding to the ternary pattern code Pnd, and which can be accessed by the same address values. Alternatively, a code (converted binary pattern code) Pna' obtained by adding a predetermined value to the binary pattern code Pna generated by the binary pattern code generating unit 75 may be used in place of the binary pattern code Pna. For instance, in view of the fact that "1111b" and "1011b" are not used for the occurrence pattern code in FIG. 47, a code obtained by appending "1111" or "1011" to the most significant bit of the binary pattern code Pna may be used as the converted binary pattern code Pna'. When such a scheme is adopted, it is satisfactory if the capacity of the memory of the coefficient data storage unit 57d is one for the address width of 12 bits (4096 addresses).

If the combination codes are address-converted in the same way as in the third embodiment, into the ternary pattern codes Pnd which are arranged in an ascending order or descending order, there will be 445 values. Addition of the number of these values to the number (256) of the values which may be taken by the binary pattern code will result in 701, which will be the total number of the values which may be taken by the selection code D56d. It is therefore sufficient if the number of the addresses provided in the coefficient data storage unit is 701 or is equal to the minimum power of two that is not smaller than 701, that is, 1024 (10th power of 2). In contrast, in the present embodiment, the number of addresses used is four times that, and a memory of a corresponding capacity is used.

On the other hand the generation of the ternary pattern code Pnd based on the arrangement of the comparison codes can be achieved by use of a conversion table for generating one of the 16 occurrence patterns codes shown in FIG. 47, a conversion table for generating one of the eight repetition count codes shown in FIG. 50($a$), a conversion table for generating one of the five repetition count codes shown in FIG. 50($b$), and their peripheral circuits, so that it can be implemented by circuits of a small size.

In the first to fourth embodiments, description was made on an enlargement process in which the interpolated pixel is not more than one, i.e., the enlargement factor is greater than one, and not greater than two. The enlargement process in which the enlargement factor is more than two, that is, the interpolated pixel is more than 1, can be realized by repeating the method disclosed in the first to fourth embodiments a plurality of times.

The present invention has been described as an image enlarging apparatus, but an image enlarging method implemented in the image enlarging apparatus also forms a part of the present invention. A part or the entirety of the elements constituting the above-described image enlarging apparatus, or a part or the entirety of the processes in the above-mentioned image enlarging method can be implemented by software, that is, by a programmed computer. Accordingly, a program for causing a computer to implement a part or the entirety of the elements of the above-described image enlarging apparatus, or a part or the entirety of the processes in the above-mentioned image enlarging method, and a computer-readable recording medium in which the above program is recorded also form a part of the present invention.

As has been described above, according to the present invention, the circuit size and the memory capacity can be reduced, and the noise immunity is improved, and it is possible to achieve high-quality conversion to a high-resolution, which is suitable for implementation by hardware.

REFERENCE CHARACTERS

52: linear interpolation unit; 54: high-resolution patch generating unit; 55: patch averaging unit; 56: pattern identification unit; 57, 57b, 57c: coefficient data storage unit; 58, 58b, 58c: coefficient data reading unit; 62: feature component separating unit; 64: high-resolution conversion unit; 66: feature component combining unit; 71: local region extraction unit; 72: intra-region average calculation unit; 73, 83, 93: comparison code generating unit; 73c: binary comparison code generating unit; 74, 84, 94: selection code generating unit; 75: binary pattern code generating unit; 83c: ternary comparison code generating unit; 85: ternary pattern code generating unit; 95: ternary pattern code generating unit; 96: code linking unit; 97: code conversion unit; 98: high-frequency component detecting unit; 99: code selection unit; 101: image reducing unit; 102: linear interpolation unit; 103: feature component separating unit; 105: pattern identification unit; 104: feature component separating unit; 106: classification unit; 107: computation unit; 108: coefficient data extraction unit; 191: occurrence pattern code generating unit; 192: repetition count code generating unit; 193: code combining unit; S11: linear interpolation; S12: patch extraction; S14: pattern identification; S15: coefficient data reading; S16: high-resolution conversion; S17: combining; S18: decision; S19: patch averaging; S21: local region extraction; S22: intra-region average calculation; S23: binary comparison code generation; S24: binary pattern code generation; S33: ternary comparison code generation; S34: ternary pattern code generation.

What is claimed is:

1. An image enlarging apparatus comprising:
a linear interpolation unit for enlarging an input image by linear interpolation to generate an interpolated image;
a high-resolution patch generating unit for performing high-resolution conversion on each of a plurality of patches respectively forming parts of the interpolated image, to generate a high-resolution patch;
a pattern identification unit for identifying a pattern of a local region in the input image which corresponds to each patch in the interpolated image, to output a selection code;
a coefficient data storage unit for storing a plurality of coefficient data respectively corresponding to a plurality of values which can be assumed by the selection code; and
a coefficient data reading unit for reading a coefficient data corresponding to the selection code, from among the plurality of coefficient data stored in said coefficient data storage unit; wherein
said high-resolution patch generating unit generates the high-resolution patch using the coefficient data read from said coefficient data storage unit; and
said pattern identification unit comprises:
a comparison code generating unit for using an average value of pixel values of pixels in the local region or the pixel value of the pixel positioned at a center of the local region as a reference value, comparing the pixel values of a plurality of peripheral pixels other than the pixel positioned at the center of the local region with the reference value, and generating comparison codes indicating results of the comparison; and
a selection code generating unit for generating the selection code based on the comparison codes generated for the plurality of peripheral pixels in the local region.

2. The image enlarging apparatus as set forth in claim 1, wherein said comparison code generating unit generates binary comparison codes indicating the results of the comparison.

3. The image enlarging apparatus as set forth in claim 1, wherein said comparison code generating unit generates ternary comparison codes indicating the results of the comparison.

4. The image enlarging apparatus as set forth in claim 1, wherein said comparison code generating unit generates binary and ternary comparison codes indicating the results of the comparison.

5. The image enlarging apparatus as set forth in claim 2, wherein said comparison code generating unit makes, for each of the peripheral pixels in the local region, a decision as to whether the pixel value of the pixel is not smaller than the reference value, or a decision as to whether the pixel value of the pixel is not larger than the reference value, and
generates the binary comparison code depending on the result of the decision.

6. The image enlarging apparatus as set forth in claim 3, wherein said comparison code generating unit
makes a decision, for each of the peripheral pixels in the local region, as to whether
the pixel value of the pixel is larger than the reference value, and an absolute value of a difference of the pixel value from the reference value is not smaller than a predetermined threshold value,
the pixel value of the pixel is smaller than the reference value, and the absolute value of the difference of the pixel value from the reference value is not smaller than the threshold value, or
the absolute value of the difference of the pixel value from the reference value is smaller than the threshold value, and
generates the ternary comparison code depending on the result of the decision.

7. The image enlarging apparatus as set forth in claim 6, wherein said selection code generating unit generates the selection code based on the binary comparison codes and the ternary comparison codes generated for the plurality of peripheral pixels in the local region, and
said selection code generating unit comprises
a binary pattern code generating unit for generating a binary pattern code based on the binary comparison codes generated for the plurality of peripheral pixels in the local region;
a ternary pattern code generating unit for generating a ternary pattern code based on the ternary comparison codes generated for the plurality of peripheral pixels in the local region;
a high-frequency component detecting unit for making a decision as to whether a high-frequency component is contained in the local region, based on the ternary comparison codes generated for the plurality of peripheral pixels in the local region; and
a code selection unit for selecting the binary pattern code when said high-frequency component detecting unit finds that a high-frequency component is contained, selecting the ternary pattern code in other cases, and outputting the selected pattern code as the selection code.

8. The image enlarging apparatus as set forth in claim 7, wherein the ternary pattern code generating unit comprises
a code linking unit for linking the ternary comparison codes generated for the plurality of peripheral pixels in the local region to generate a linked code; and
a code conversion unit for converting the linked code generated by the code linking unit into a code having a smaller range of assumable values, and outputting a converted code as said ternary pattern code.

9. The image enlarging apparatus as set forth in claim 7, wherein
said high-frequency component detecting unit
assumes that the ternary pattern code of a value for the case when an absolute value of a difference between the pixel value of the pixel and the reference value is smaller than the threshold value is generated for the pixel positioned at the center of the local region; and
compares the pixel values of the plurality of pixels belonging to each of groups, each consisting of a plurality of pixels which are in the local region and are aligned in a row direction or a column direction, using the ternary comparison codes pertaining to the respective pixels; and
finds that a high-frequency component is contained in the local region, when, with regard to any of the plurality of groups, the pixel value of the pixel positioned at a midpoint of the group takes a local maximum value or a local minimum value, among the pixels belonging to the group.

10. The image enlarging apparatus as set forth in claim 7, wherein
said local region is a rectangular region,
said high-frequency component detecting unit compares the pixel values of the pixels belonging to each of a plurality of groups of pixels consisting of a pixel at a vertex of the local region and pixels adjacent to the pixel at the vertex in a row direction and a column direction, using the ternary comparison codes pertaining to the respective pixels, and
finds that a high-frequency component is contained in the local region, if, with regard to any of the plurality of groups, the pixel value of the pixel positioned at the vertex takes a local maximum value or a local minimum value, and, for both of the adjacent pixels, an absolute value of a difference of the pixel value of the pixel from the reference value is not smaller than the threshold value.

11. The image enlarging apparatus as set forth in claim 7, wherein
said local region is a rectangular region;
said high-frequency component detecting unit
assumes that the ternary pattern code of a value for the case when an absolute value of a difference between the pixel value of the pixel and the reference value is smaller than the threshold value is generated for the pixel positioned at the center of the local region;
compares the pixel values of the pixels belonging to each of a plurality of groups consisting of a plurality of pixels which are positioned in the local region and which are aligned in a direction of a diagonal line, using the ternary comparison codes; and
finds that a high-frequency component is contained in the local region if, with regard to any of the plurality of groups, the pixel value of the pixel positioned in a middle of the group takes a local maximum value or a local minimum value among the plurality of pixels belonging to the group, and the comparison codes of the pixels at vertexes positioned on the diagonal line differ from both of the comparison codes of the pixels at two vertexes which are not positioned on the diagonal line.

12. The image enlarging apparatus as set forth in claim 7, wherein
the ternary pattern code generating unit
generates an occurrence pattern code corresponding to an occurrence pattern of the ternary comparison codes generated for the plurality of the peripheral pixels in the local region, and arranged in a predefined order,
generates a sequence of repetition count codes corresponding to a sequence of repetition counts of the ternary comparison codes having the same value, and
links the occurrence pattern code and the sequence of the repetition count codes to generate the ternary pattern code.

13. The image enlarging apparatus as set forth in claim 1, wherein
said high-resolution patch generating unit comprises
a feature component separating unit for separating a feature component of a low resolution and a non-feature component, from the pixel values of each of the plurality of patches in the interpolated image;
a high-resolution conversion unit for converting the feature component of the low resolution to a feature component of a high resolution; and a feature component combining unit for combining the feature component of the high resolution with the non-feature component to generate the high-resolution patch; wherein
said high-resolution conversion unit converts the feature component of the low resolution to the feature component of the high resolution using the coefficient data selected by said coefficient data reading unit.

14. A surveillance camera comprising:
an image shooting unit for shooting a target area to be surveyed to obtain an image; and
an image enlarging apparatus for enlarging the image obtained by the image shooting unit to output an enlarged image;
wherein the image enlarging apparatus is the one set forth in claim 1.

15. An image enlarging method comprising:
a linear interpolation step for enlarging an input image by linear interpolation to generate an interpolated image;
a high-resolution patch generating step for performing high-resolution conversion on each of a plurality of patches respectively forming parts of the interpolated image, to generate a high-resolution patch;
a pattern identification step for identifying a pattern of a local region in the input image which corresponds to each patch in the interpolated image, to output a selection code; and
a coefficient data reading step for reading a coefficient data corresponding to the selection code, from among a plurality of coefficient data stored in a coefficient data storage unit, said plurality of coefficient data respectively corresponding to a plurality of values which can be assumed by the selection code; wherein
said high-resolution patch generating step generates the high-resolution patch using the coefficient data read from said coefficient data storage unit; and
said pattern identification step comprises:
a comparison code generating step for using an average value of pixel values of pixels in the local region or the pixel value of the pixel positioned at a center of the local region as a reference value, comparing the pixel values of a plurality of peripheral pixels other than the pixel positioned at the center of the local region with the reference value, and generating comparison codes indicating results of the comparison; and
a selection code generating step for generating the selection code based on the comparison codes generated for the plurality of peripheral pixels in the local region.

16. The image enlarging apparatus as set forth in claim 4, wherein said comparison code generating unit makes, for each of the peripheral pixels in the local region, a decision as to whether the pixel value of the pixel is not smaller than the reference value, or a decision as to whether the pixel value of the pixel is not larger than the reference value, and generates the binary comparison code depending on the result of the decision.

17. The image enlarging apparatus as set forth in claim 4, wherein said comparison code generating unit
makes a decision, for each of the peripheral pixels in the local region, as to whether
the pixel value of the pixel is larger than the reference value, and an absolute value of a difference of the pixel value from the reference value is not smaller than a predetermined threshold value, the pixel value of the pixel is smaller than the reference value, and the absolute value of the difference of the pixel value from the reference value is not smaller than the threshold value, or the absolute value of the difference of the pixel value from the reference value is smaller than the threshold value, and generates the ternary comparison code depending on the result of the decision.

18. A surveillance camera comprising:

an image shooting unit for shooting a target area to be surveyed to obtain an image; and an image enlarging apparatus for enlarging the image obtained by the image shooting unit to output an enlarged image;

wherein the image enlarging apparatus is the one set forth in claim 2.

19. A surveillance camera comprising:

an image shooting unit for shooting a target area to be surveyed to obtain an image; and an image enlarging apparatus for enlarging the image obtained by the image shooting unit to output an enlarged image;

wherein the image enlarging apparatus is the one set forth in claim 3.

20. A surveillance camera comprising:

an image shooting unit for shooting a target area to be surveyed to obtain an image; and an image enlarging apparatus for enlarging the image obtained by the image shooting unit to output an enlarged image;

wherein the image enlarging apparatus is the one set forth in claim 4.

\* \* \* \* \*